(12) United States Patent
Oga et al.

(10) Patent No.: US 9,723,308 B2
(45) Date of Patent: Aug. 1, 2017

(54) IMAGE PROCESSING APPARATUS AND IMAGE PROCESSING METHOD

(71) Applicant: Panasonic Corporation, Osaka (JP)

(72) Inventors: Kenji Oga, Osaka (JP); Hiroshi Amano, Osaka (JP); Takeshi Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 390 days.

(21) Appl. No.: 13/976,746

(22) PCT Filed: Dec. 5, 2012

(86) PCT No.: PCT/JP2012/007805
§ 371 (c)(1),
(2) Date: Jun. 27, 2013

(87) PCT Pub. No.: WO2013/128526
PCT Pub. Date: Sep. 6, 2013

(65) Prior Publication Data
US 2014/0169479 A1    Jun. 19, 2014

(30) Foreign Application Priority Data

Feb. 28, 2012  (JP) ................................ 2012-041638

(51) Int. Cl.
*H04N 7/12*       (2006.01)
*H04N 19/60*     (2014.01)
(Continued)

(52) U.S. Cl.
CPC ..... *H04N 19/00775* (2013.01); *H04N 19/426* (2014.11); *H04N 19/44* (2014.11); *H04N 19/91* (2014.11)

(58) Field of Classification Search
CPC ............. H04N 19/91; H04N 19/00775; H04N 19/426; H04N 19/44; H04N 19/176; H04N 19/105; H04N 19/587; H04N 19/147
(Continued)

(56) References Cited

U.S. PATENT DOCUMENTS 4,654,697 A * 3/1987 Sasson .................. H04N 11/12
                                                       348/489
5,311,308 A * 5/1994 Bernard ............... H04N 7/0155
                                                       348/E7.006
(Continued)

FOREIGN PATENT DOCUMENTS

| CN | 103098463 | 5/2013 |
|----|-----------|--------|
| JP | 10-164584 | 6/1998 |

(Continued)

OTHER PUBLICATIONS

"Advanced video coding for generic audiovisual services", ITU-T Recommendation H.264, Mar. 2005.
(Continued)

*Primary Examiner* — Gims Philippe
*Assistant Examiner* — Richard Carter
(74) *Attorney, Agent, or Firm* — Wenderoth, Lind & Ponack, L.L.P.

(57) ABSTRACT

An image processing apparatus capable of reducing a capacity of a storage element includes: a first variable-length decoding unit that sequentially outputs, for each first unit of processing, one or more components included in the first unit of processing, by performing a first process on a coded stream; a reordering unit that sequentially outputs, for each second unit of processing different from the first unit of processing, one or more components included in the second unit of processing, by reordering the components outputted (Continued)

from the first variable-length decoding unit; and a second inverse quantization unit that performs a second process on the components outputted from the reordering unit, for each second unit of processing.

20 Claims, 42 Drawing Sheets

(51) Int. Cl.
    *H04N 19/91*     (2014.01)
    *H04N 19/44*     (2014.01)
    *H04N 19/426*     (2014.01)

(58) Field of Classification Search
    USPC ........ 375/240.18, 240.24; 382/166, 232, 238
    See application file for complete search history.

(56) References Cited

U.S. PATENT DOCUMENTS

| | | | |
|---|---|---|---|
| 5,497,246 A * | 3/1996 | Abe | H04N 11/044 375/240.03 |
| 5,963,260 A | 10/1999 | Bakhmutsky | |
| 7,701,365 B2 | 4/2010 | Fukuhara et al. | |
| 8,320,693 B2 | 11/2012 | Fukuhara et al. | |
| 8,422,772 B2 | 4/2013 | Imanaka | |
| 2003/0123555 A1* | 7/2003 | Kim | H04N 19/423 375/240.25 |
| 2004/0017949 A1* | 1/2004 | Lin | H04N 19/587 382/232 |
| 2006/0182181 A1* | 8/2006 | Lee | H04N 19/176 375/240.24 |
| 2006/0215920 A1* | 9/2006 | Yokose | H04N 19/105 382/238 |
| 2007/0242892 A1* | 10/2007 | Sugimoto | H04N 19/176 382/238 |
| 2009/0102686 A1 | 4/2009 | Fukuhara et al. | |
| 2009/0274378 A1 | 11/2009 | Fukuhara et al. | |
| 2009/0304073 A1* | 12/2009 | Usman | H04N 19/91 375/240.03 |
| 2010/0215263 A1 | 8/2010 | Imanaka | |
| 2010/0232691 A1* | 9/2010 | Sekiguchi | H04N 19/147 382/166 |
| 2011/0249721 A1 | 10/2011 | Karczewicz et al. | |
| 2011/0249754 A1 | 10/2011 | Karczewicz et al. | |
| 2013/0089149 A1 | 4/2013 | Hayashi et al. | |

FOREIGN PATENT DOCUMENTS

| | | |
|---|---|---|
| JP | 2000-511738 | 9/2000 |
| JP | 2002-84493 | 3/2002 |
| JP | 2005-295526 | 10/2005 |
| JP | 2012-147293 | 8/2012 |
| WO | 98/42138 | 9/1998 |
| WO | 2007/058294 | 5/2007 |
| WO | 2009/150801 | 12/2009 |
| WO | 2011/161949 | 12/2011 |
| WO | 2012/096179 | 7/2012 |

OTHER PUBLICATIONS

Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d6, 6th Meeting: Torino, IT, Jul. 14-22, 2011, http://phenix.int-evry.fr/jct/doc_end_user/documents/6_Torino/wg11/JCTVC-F803-v8.zip.

Tim Hellman and Yong Yu, Changing Luma/Chroma Coefficient Interleaving from CU to TU level, Joint Collaborative Team on Video Coding (JCT-VC) of ITU-T SG16 WP3 and ISO/IEC JTC1/SC29/WG11, JCTVC-G112, 7th Meeting: Geneva, CH, 2011.11, pp. 1-10.

Youji Shibahara et al., Nearest placement of Y/Cb/Cr transform coefficients locating at same spatial position, Joint Collaborative Team on Video Coding (JCT-VC) of ITU-T SG16 WP3 and ISO/IEC JTC1/SC29/WG11, JCTVC-G381, 7th Meeting: Geneva, CH, 2011.11, pp. 1-15.

Chinese Office Action issued on Dec. 19, 2016 in Chinese Patent Application No. 201280004339.8 with partial English translation.

\* cited by examiner

FIG. 13

| Writing order | | Reading order |
|---|---|---|
| 1 | Y0 area | 1 |
| 5 | Cb0 area | 2 |
| 9 | Cr0 area | 3 |
| 2 | Y1 area | 4 |
| 6 | Cb1 area | 5 |
| 10 | Cr1 area | 6 |
| 3 | Y2 area | 7 |
| 7 | Cb2 area | 8 |
| 11 | Cr2 area | 9 |
| 4 | Y3 area | 10 |
| 8 | Cb3 area | 11 |
| 12 | Cr3 area | 12 |

IMAGE PROCESSING APPARATUS AND IMAGE PROCESSING METHOD

TECHNICAL FIELD

The present invention relates to an image processing apparatus which performs image processing on a coded stream generated by coding an image for each coding unit block.

BACKGROUND ART

A conventional image coding apparatus for coding a video sequence divides each picture included in the video sequence into a plurality of blocks. Then, the conventional image coding apparatus performs coding for each of the blocks in the raster scan order. As a result, the conventional image coding apparatus generates a coded stream (a bit stream) by coding and compressing the video sequence. Then, a conventional image decoding apparatus decodes this coded stream on a block-by-block basis in the raster scan order to reproduce the pictures of the original video sequence.

The conventional image coding methods include the International Telecommunication Union Telecommunication Standardization Sector (ITU-T) H.264 standard (see Non Patent Literature 1, for example). When the images coded according to the H.264 standard are to be decoded, the conventional image decoding apparatus firstly reads the coded stream. After decoding each piece of header information, the conventional image decoding apparatus performs variable-length decoding. Then, the conventional image decoding apparatus performs inverse quantization and inverse frequency transform on coefficient information obtained by the variable-length decoding. As a result, a difference image is generated.

Next, according to a block type obtained by the variable-length decoding, the conventional image decoding apparatus performs intra-picture prediction (which may also be referred to as intra prediction) or inter-picture prediction (which may also be referred to as inter prediction). As a result, the conventional image decoding apparatus generates a prediction image. After this, the conventional image decoding apparatus performs an image reconstruction process by adding the difference image to the prediction image. Then, the conventional image decoding apparatus decodes the current image to be decoded (i.e., the coded image) by performing deblocking filtering on the reconstructed image obtained by the image reconstruction process.

According to the H.264 standard, the size of each block is always 16 by 16 pixels. In general, each of the decoding processes is performed for each 16-by-16-pixel block as well.

In recent years, super high resolution displays of, for example, 4K2K (3840 pixels by 2160 pixels) have been developed. For this reason, the number of pixels included in images to be processed is expected to be increasingly higher. Thus, the image coding apparatus that performs coding and decoding always on a 16-by-16-pixel block basis according to the H.264 standard needs to code a larger number of blocks and, as a result, the coding efficiency is reduced.

With this being the situation, techniques proposed as next-generation image coding standards include a technique that solves the stated problem (see Non Patent Literature 2, for example). With this technique, the size of a coding unit block according to the conventional H.264 standard is made variable. Thus, the image coding apparatus employing this technique can code an image for each block that is larger than the conventional 16-by-16-pixel unit block. Therefore, the coding efficiency increases.

Moreover, a pipeline processing technique is also available that increases the decoding efficiency by performing, in parallel, the processes for decoding the coded stream (see Patent Literature 1, for example). It should be noted that an apparatus which processes a coded stream, such as an image coding apparatus and an image decoding apparatus, is referred to as the image processing apparatus hereafter.

CITATION LIST

Patent Literature

[PTL 1]
Japanese Unexamined Patent Application Publication No. 2005-295526

Non Patent Literature

[NPL 1]
ITU-T H.264 standard: Advanced video coding for generic audiovisual services, March 2005
[NPL 2]
"Working Draft 4 of High-Efficiency Video Coding", [online], Joint Collaborative Team on Video Coding (JCT-VC), Nov. 20, 2011, [searched on Dec. 6, 2011], URL: http://phenix.int-evry.fr/jct/doc_end_user/documents/6_Torino/wg 11/JCTVC-F803-v8.zip

SUMMARY OF INVENTION

Technical Problem

However, because of the increased size of the block included in an image, each of the image processing apparatuses disclosed in Non Patent Literature 2 and Patent Literature 1 described above needs more capacity for a storage element used for processing the image.

The present invention is conceived to solve the aforementioned problem, and has an object to provide an image processing apparatus capable of reducing a capacity of a storage element used for processing an image.

Solution to Problem

The image processing apparatus in an aspect according to the present invention is an image processing apparatus which performs a predetermined process on a coded stream generated by coding an image and includes: a first processing unit which sequentially outputs, for each first unit of processing, one or more components included in the first unit of processing, by performing a first process on the coded stream; a reordering unit which sequentially outputs, for each second unit of processing different from the first unit of processing, one or more components included in the second unit of processing, by reordering the components outputted from the first processing unit; and a second processing unit which performs a second process on the components outputted from the reordering unit, for each second unit of processing.

This general and specific aspect may be implemented using a system, a method, an integrated circuit, a computer program, or a computer-readable recording medium such as a CD-ROM. Alternatively, the aspect may be implemented by any combination of systems, methods, integrated circuits, computer programs, and recording media.

Advantageous Effects of Invention

The image processing apparatus according to the present invention can reduce a capacity of a storage element used for processing an image.

BRIEF DESCRIPTION OF DRAWINGS

FIG. 13 is a diagram showing an order in which the pieces of coefficient information are written into the memory and an order in which the pieces of coefficient information are read, in Embodiment 1.

DESCRIPTION OF EMBODIMENTS

Underlying Knowledge Forming Basis of Present Invention

The present inventors found that the image processing apparatuses described in "Background Art" had the following problem.

To be more specific, Non Patent Literature 2 defines a coding unit (referred to as the "CU" hereafter) as a data unit of coding. This CU corresponds to the aforementioned coding unit block. Moreover, as with a macroblock (referred to as the "MB" hereafter) according to the conventional coding standard, the CU is a data unit (as the smallest unit) in which the prediction method is allowed to be switched between intra prediction and inter prediction. Thus, the size of the CU is defined as the most basic size of block for coding. The size of the CU for luma is 8 by 8 pixels, 16 by 16 pixels, 32 by 32 pixels, or 64 by 64 pixels. When the size of the CU is 64 by 64 pixels, this size is 16 times larger than the size of an MB in the H.264 standard. More specifically, the apparatus disclosed in Non Patent Literature 2 needs the amount of data 16 times larger at the maximum as compared to the case based on the H.264 standard. As a unit for performing frequency transform on this CU, a frequency transform unit (referred to as the "TU" hereafter) is defined. This TU corresponds to the aforementioned frequency transform unit block. Moreover, the size of the TU for luma is 4 by 4 pixels, 8 by 8 pixels, 16 by 16 pixels, 32 by 32 pixels, 4 by 16 pixels, 16 by 4 pixels, 8 by 32 pixels, or 32 by 8 pixels.

Figure 1A:
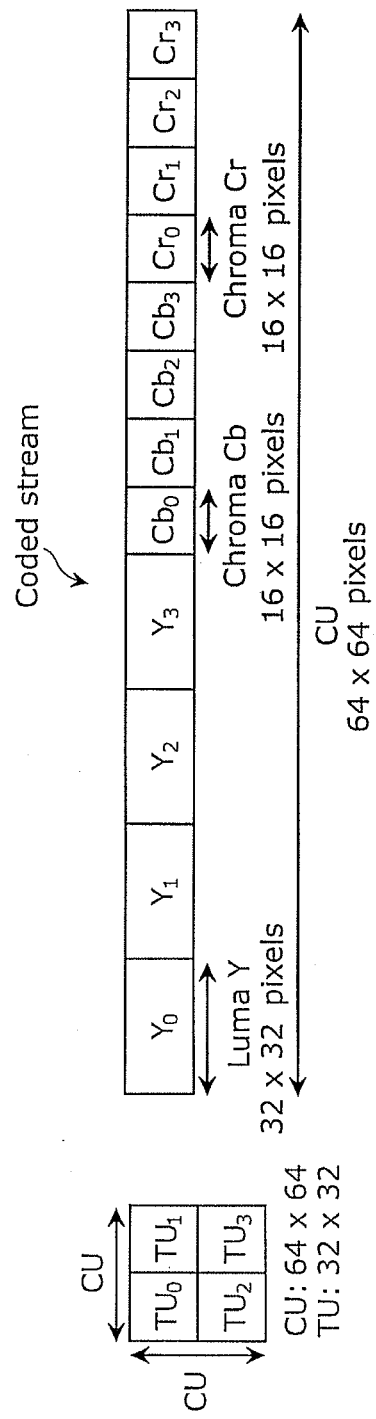
FIG. 1A is a diagram showing an order in which coefficient information pieces are stored, corresponding to a CU having a predetermined size and a TU.
Figure 1B:
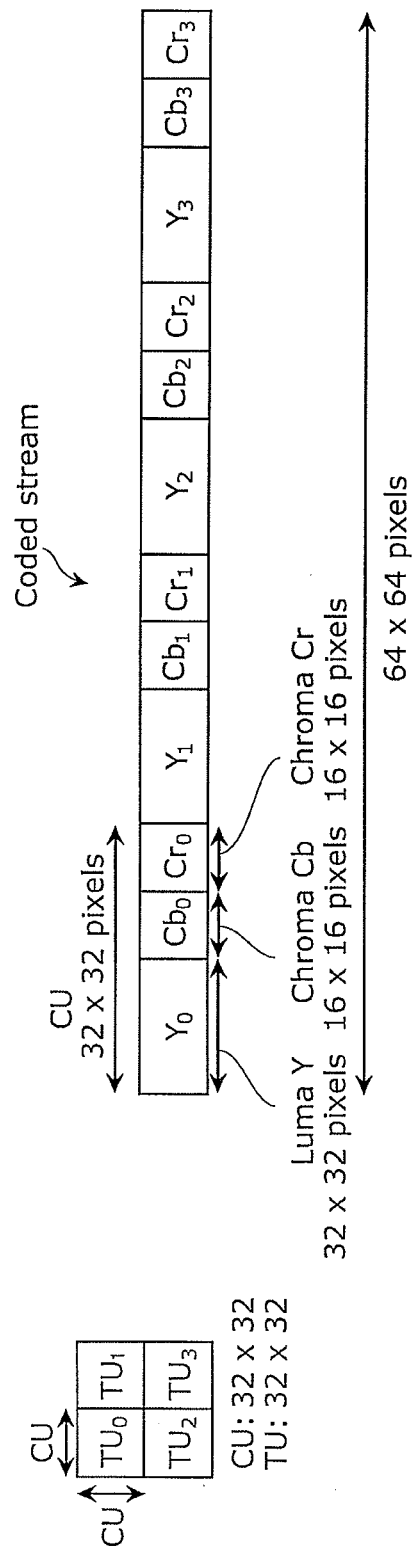
FIG. 1B is a diagram showing an order in which pieces of coefficient information are stored, corresponding to a CU having another size and a TU.

Each of FIG. 1A and FIG. 1B is a diagram showing an example of a bitstream coded (a coded stream) according to the standard of Non Patent Literature 2. An image is coded on a CU-by-CU basis. In a CU, pieces of coefficient information to be decoded are arranged in the following order: at least one piece of coefficient information on luma (luma information); and then at least one piece of coefficient information on chroma (chroma information). Moreover, the TU is smaller than or equal to the CU in size. Therefore, the CU includes pieces of luma information (Y) and pieces of chroma information (Cb/Cr) as many as the number of TUs included in the CU. This case is explained by taking a coded stream representing 64 by 64 pixels as an example, with reference to FIG. 1A and FIG. 1B. It should be noted that "Y0", "Cb0", and "Cr0" in the coded stream represent coefficient information on luma Y, chroma Cb, and chroma Cr of a TU0, respectively. More specifically, Yn, Cbn, and Crn represent luma Y, chroma Cb, and chroma Cr of a TUn, respectively (where n=0, 1, 2, or 3). In the following description, luma Y (or simply "Y"), chroma Cb (or simply "Cb"), and chroma Cr (or simply "Cr") refer to coefficient information (color components) of respective types.

As shown in FIG. 1A, when the CU size is 64 by 64 pixels and the TU size is 32 by 32 pixels, four luma Y components each having the size of 32 by 32 pixels, four chroma Cb components each having the size of 16 by 16 pixels, and four chroma Cr components each having the size of 16 by 16 pixels are stored in the following order: Y0, Y1, Y2, Y3, Cb0, Cb1, Cb2, Cb3, Cr0, Cr1, Cr2, and Cr3. On the other hand, as shown in FIG. 1B, when the CU size is 32 by 32 pixels and the TU size is 32 by 32 pixels, Y (32 by 32 pixel), Cb (16 by 16 pixels), and Cr (16 by 16 pixels) are stored in this order in one TU or one CU. In a 64-by-64-pixel block, four CUs or TUs are arranged in the order as shown in FIG. 1B. In the coded stream, four luma Y components, four chroma Cb components, and four chroma Cr components are stored in the following order: Y0, Cb0, Cr0, Y1, Cb1, Cr1, Y2, Cb2, Cr2, Y3, Cb3, and Cr3.

In the stream structure according to the conventional H.264 standard (Non Patent Literature 1), the sizes of luma information and chroma information are 16 by 16 pixels and 8 by 8 pixels, respectively. Moreover, the luma information and the chroma information are stored for each 8-by-8-pixel block, and the order in which these pieces of information are stored (arranged) is fixed. However, in the coded stream based on the standard according to Non Patent Literature 2, the sizes of luma information and chroma information are variable (32 by 32 pixels at the maximum and 4 by 4 pixels at the minimum) as described above. Moreover, the order in which these pieces of luma information and chroma information are stored (arranged) is different according to these sizes.

In this way, Non Patent Literature 2 improves the coding efficiency by making the size of the coding unit (CU), i.e., the size of a coding unit block, variable and by increasing the maximum size to 64 by 64 pixels that is 16 times larger than the size according to the H.264 standard.

Moreover, as described above, Patent Literature 1 discloses the image processing apparatus (the image decoding apparatus) that employs the pipeline processing technique to improve the decoding efficiency by performing, in parallel, the processes to decode such a coded stream.

Figure 2:
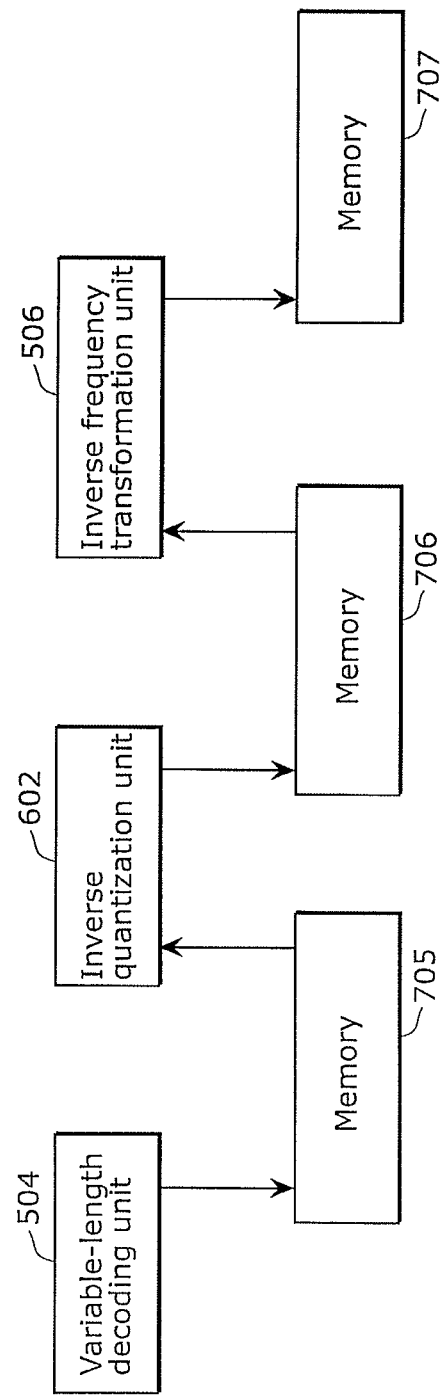
FIG. 2 is a block diagram showing a configuration of a conventional image processing apparatus.

FIG. 2 is a block diagram showing a configuration of the image processing apparatus in Patent Literature 1.

As shown in FIG. 2, according to the pipeline processing technique employed by this image processing apparatus, an inverse quantization unit 602 reads data from a memory 705 and writes the result into a memory 706, for example. At the same time, an inverse frequency transformation unit 506 reads the data from the memory 706 and writes the result into a memory 707. The memory 706 between the inverse quantization unit 602 and the inverse frequency transformation unit 506 needs to hold data necessary at one time for each of the inverse quantization unit 602 and the inverse frequency transformation unit 506 to perform the corresponding process. The same applies between the other processing units (such as between a variable-length decoding unit 504 and the inverse quantization unit 602).

Figure 3:
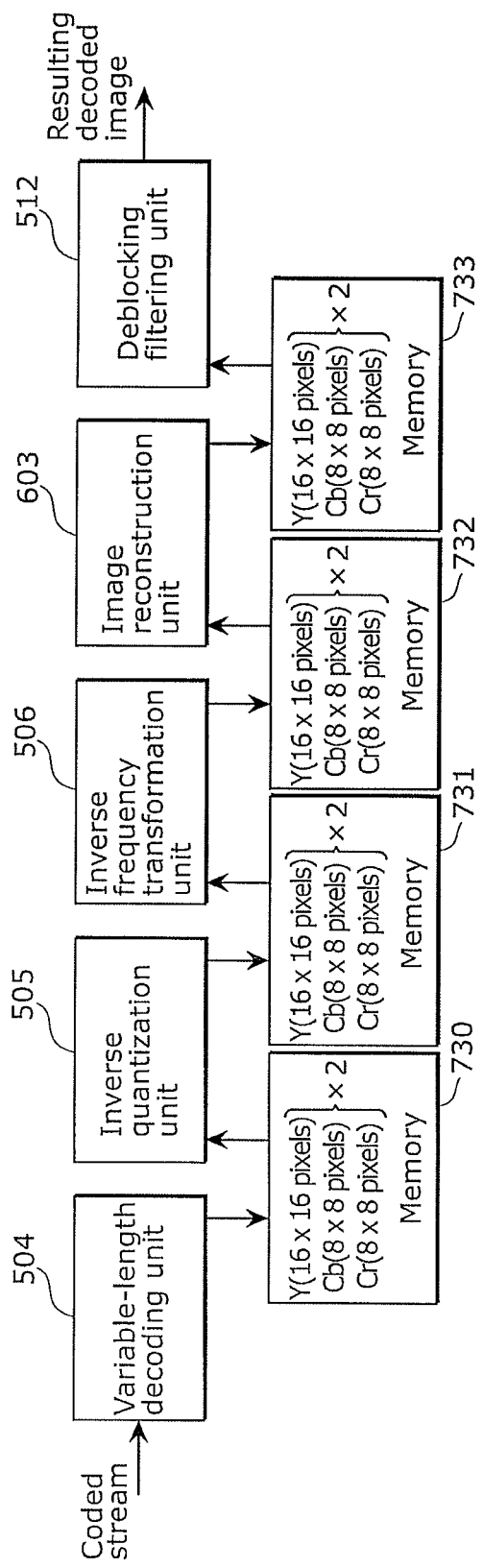
FIG. 3 is a block diagram showing a configuration of an assumed image processing apparatus.

FIG. 3 is a block diagram showing a configuration of an image processing apparatus assumed from Non Patent Literature 1 and Patent Literature 1.

When Patent Literature 1 is applied to the H.264 standard, each of memories 730 to 733 needs to hold data (coefficient information) on at least 768 pixels, for example, as shown in FIG. 3. To be more specific, the memory 731 needs to hold two sets of 384-pixel data, each set including: luma information formed from 256 pixels=16×16; and two pieces of chroma information each formed from 64 pixels=8×8.

Figure 4:
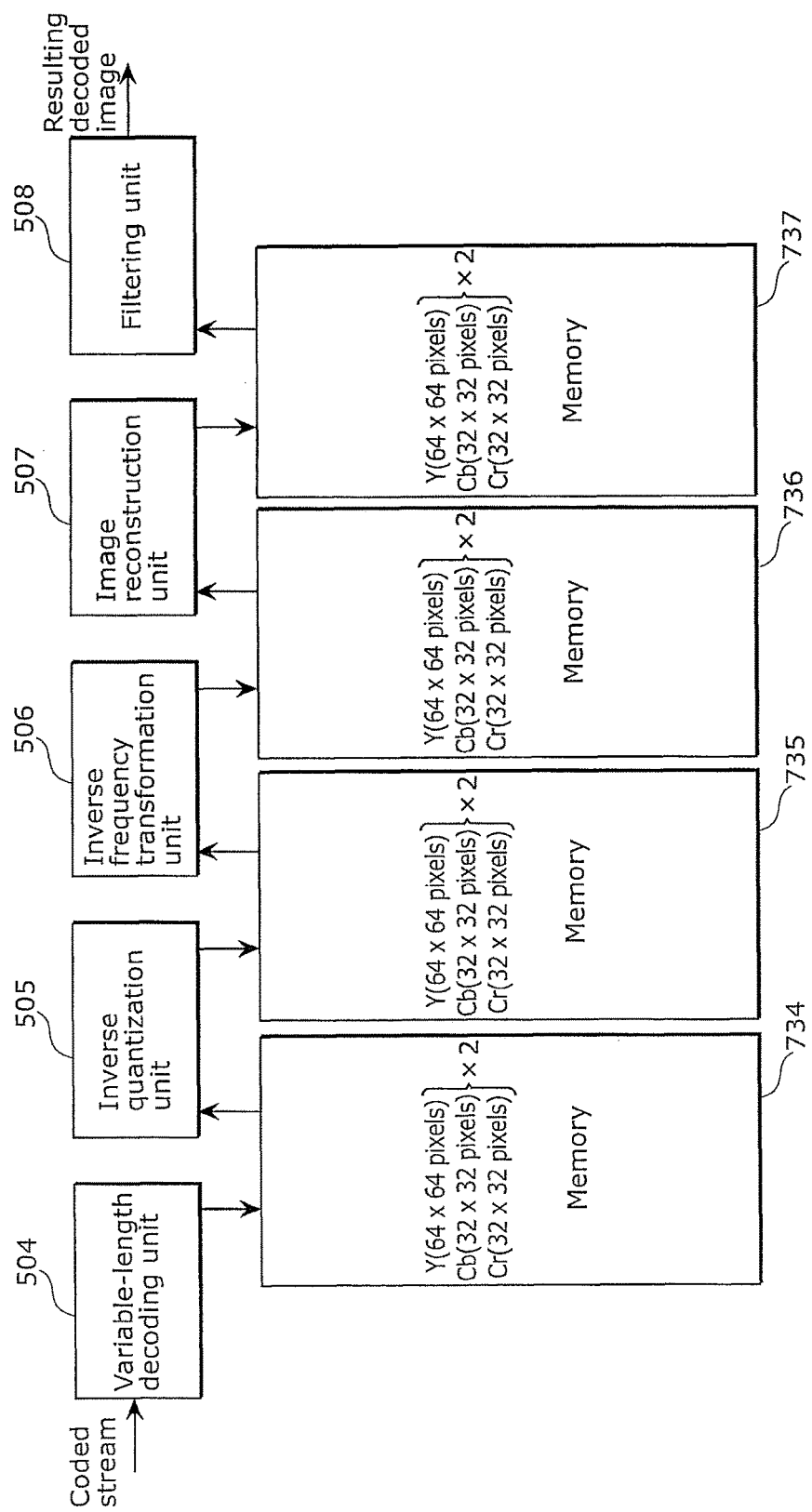
FIG. 4 is a block diagram showing a configuration of another assumed image processing apparatus.

FIG. 4 is a block diagram showing a configuration of an image processing apparatus assumed from Non Patent Literature 2 and Patent Literature 1.

When the technique of Patent Literature 1 is applied to Non Patent Literature 2, a problem arises as follows. As shown in FIG. 4, each of memories 734 to 737 needs a capacity to hold 12288-pixel data that is 16 times larger than the capacity of the memory 731. Such a memory is extremely large, thereby increasing the cost. Moreover, a large memory increases power consumption. It should be noted here that the memory refers to a storage element capable of storing data.

Here, to reduce the capacity of the storage element existing between the processing units of the pipeline is to reduce the size of data to be processed. However, in Non Patent Literature 2, the order in which the data is to be stored and the data size are different according to the size of the coding unit (CU). On account of this, the data size cannot simply be reduced.

In each of the coded streams shown in FIG. 1A and FIG. 1B, the size of the frequency transform unit (TU) corresponds to the size of a 32-by-32-pixel block. However, the CU sizes are different in FIG. 1A and FIG. 1B. Luma Y, chroma Cb, and chroma Cr are stored in this order in the CU. Thus, even when the TUs have the same size, the order in which the TU appears in the stream is different for each of the coded streams.

In the present examples, both of the first 32-by-32-pixel blocks are for luma Y0 corresponding to the upper left TU0. Then, in the case of the coded stream shown in FIG. 1A, a next pixel belongs to luma Y1 of the 32-by-32-pixel block corresponding to the upper right TU1. On the other hand, in the case of the coded stream shown in FIG. 1B, a next pixel belongs to chroma Cb0 of the 16-by-16-pixel block corresponding to the upper left TU0. In this way, not only the sizes of Y, Cb, and Cr but also the positions of the corresponding TUs are different between the two different coded streams, according to the respective CU and TU sizes. For this reason, the original coded stream cannot simply be divided into smaller-size blocks to perform the processing.

Thus, an image processing apparatus and an image processing method according to the present invention are conceived that are capable of performing processing for each smaller unit block by reordering coefficient information pieces included in a coded stream and of reducing a capacity of a storage element. To be more specific, the present invention provides an image processing apparatus capable of reducing, while preventing a decrease in processing efficiency (coding efficiency or decoding efficiency), a capacity of a storage element used for processing an image.

In order to solve the aforementioned problem, the image processing apparatus in an aspect according to the present invention is an image processing apparatus which performs a predetermined process on a coded stream generated by coding an image, the image processing apparatus including: a first processing unit which sequentially outputs, for each first unit of processing, one or more components included in the first unit of processing, by performing a first process on the coded stream; a reordering unit which sequentially outputs, for each second unit of processing different from the first unit of processing, one or more components included in the second unit of processing, by reordering the components outputted from the first processing unit; and a second processing unit which performs a second process on the components outputted from the reordering unit, for each second unit of processing.

Here, the reordering unit may sequentially output, for each second unit of processing, the one or more components included in the second unit of processing that is smaller than the first unit of processing.

With this, even when the components are outputted for each first unit of processing by the first process, the order of the components is changed and the components are outputted for each second unit of processing. Since the second process is performed on the components for each second unit of processing, the components on which the second process has been performed can be stored into the storage element for each second unit of processing. Thus, when the second unit of processing is smaller than the first unit of processing, the capacity of the storage element for storing the components on which the second process has been performed can be reduced. More specifically, the capacity of the storage element used for, for example, pipeline processing can be reduced. Moreover, the reduction in the capacity of the storage element allows the cost and power consumption to be reduced. Furthermore, the larger first unit of processing can prevent a decrease in the processing efficiency of the first process.

It should be noted that when the second unit of processing is larger than the first unit of processing, the second process is performed for each larger unit of processing. Therefore, the efficiency of processing the coded stream can be increased.

For example, the first unit of processing is a coding unit used for coding the image. Here, the second unit of processing may be one of (i) a frequency transform unit used for frequency transform performed for the coding unit and (ii) a unit of processing smaller than the frequency transform unit. Moreover, the first processing unit may sequentially output, for each first unit of processing, the one or more components included in the first unit of processing that is variable in size according to a structure of the coded stream. Similarly, the reordering unit may sequentially output, for each second unit of processing, the one or more components included in the second unit of processing that is variable in size according to a structure of the coded stream. Furthermore, the image processing apparatus may further include a third processing unit which performs a third process on a stream generated by the second process, to decode the coded stream. The first unit of processing may be a smallest unit in which a prediction method used for coding the image is allowed to be switched between an intra prediction method and an inter prediction method.

With this, when the first unit of processing is a coding unit, the capacity of the storage element used for decoding (by the pipeline processing, for example) the coded stream including the coding unit can be reduced even when the size of the coding unit is large. Moreover, since the size of the coding unit does not need to be reduced, the coding efficiency of generating the coded stream by the image coding apparatus can be prevented from decreasing. Furthermore, the processing can be appropriately performed for the first unit of processing and the second unit of processing which are variable in size.

Moreover, the first processing unit may sequentially output color components as the components included in the first unit of processing. The reordering unit may sequentially output color components included in the second unit of processing, by reordering the color components outputted from the first processing unit.

With this, not only can the capacity of the storage element be reduced, but also the color components expressing the same coordinates on a screen can be processed at the same time. This can increase the operating efficiency.

Furthermore, the first processing unit may sequentially store the color components into a storage unit by sequentially outputting the color components. The reordering unit may reorder the color components by sequentially reading the color components in an order different from an order in which the color components are stored in the storage unit. Alternatively, the reordering unit may reorder the color components by sequentially writing the color components into a storage unit in an order different from an order in which the color components are outputted from the first processing unit. The second processing unit may sequentially read the color components in the order in which the color components are stored in the storage unit.

With this, not only can the capacity of the storage element be reduced, but also the components expressing the same coordinates on the screen can be appropriately processed at the same time using, for example, a storage unit such as a memory. This can increase the operating efficiency.

Moreover, the second processing unit may reconstruct, as a process included in the second process, an image corresponding to the second unit of processing using the color components included in the second unit of processing.

With this, not only can the capacity of the storage element be reduced, but also the operating efficiency of the reconstruction process performed on the image where the color components expressing the same coordinates on the screen need to be processed at the same time can be increased.

Furthermore, the first processing unit may perform variable-length decoding as the first process, and the second processing unit may perform inverse quantization as a process included in the second process.

This can reduce the capacity of the storage element required between the processing units used in and after the inverse quantization in the pipeline processing.

Moreover, the first processing unit may perform variable-length decoding as the first process and sequentially output color components as the one or more components included in the first unit of processing. The reordering unit may reorder the color components outputted from the first processing unit. The second processing unit may perform variable-length coding as a process included in the second process.

With this, variable-length decoding is performed on the coded stream, and then variable-length coding is performed again on the stream in which the components are reordered. As a result, the coded stream can be transcoded. Moreover, the second process can employ a variable-length coding method whereby variable-length decoding is easier than the variable-length coding method used in generating the coded stream. As a result, the load required to decode the transcoded coded stream including the color components outputted by the second process can be reduced as compared with the load required to decode the coded stream that has yet to be transcoded. To be more specific, the processing load required of the image decoding apparatus to decode the coded stream can be reduced and, at the same time, the performance of the image decoding apparatus can be easily ensured.

Furthermore, the first processing unit may perform variable-length decoding as the first process and sequentially output color components as the one or more components included in the first unit of processing, the reordering unit may include: a division unit which classifies each of the color components outputted from the first processing unit according to a color component type; a variable-length coding unit which performs, for each of the color component types, variable-length coding on the color components belonging to the color component type, and stores a stream generated by the variable-length coding into a storage unit; and a stream reconstruction unit which generates a reordered coded stream in which the color components are reordered, by sequentially reading, in an order different from an order in which the color components are outputted from the first processing unit, the color components from the stream generated and stored in the storage unit for each of the color component types, the variable-length coding unit may perform variable-length coding for the color component types in parallel, and the reordered coded stream may include a coding unit having a same size as the second unit of processing. Alternatively, the first processing unit may perform variable-length decoding as the first process and sequentially output color components as the one or more components included in the first unit of processing, the reordering unit may include: a marker insertion unit which adds a marker identifying a color component type for each of the color components outputted from the first processing unit; a variable-length coding unit which (i) identifies, based on the marker added by the marker insertion unit, each of the color component types of the color components outputted from the first processing unit, (ii) performs, for each of the color component types, variable-length coding on the color components belonging to the color component type, and (iii) stores a stream generated by the variable-length coding into a storage unit; and a stream reconstruction unit which generates a reordered coded stream in which the color components are reordered, by sequentially reading, in an order different from an order in which the color components are outputted from the first processing unit, the color components from the stream generated and stored in the storage unit for each of the color component types, and the variable-length coding unit may perform variable-length coding for the color component types in parallel.

With this, variable-length coding for a luma color component and variable-length coding for chroma color component, for example, are performed in parallel. Accordingly, the speed of variable-length coding can be enhanced, and the operating efficiency can be thus increased.

Moreover, the stream reconstruction unit may generate the reordered coded stream including the marker for each of the color components, by sequentially reading the color components together with the markers added to the color components, the second processing unit may include: a variable-length decoding unit which performs, for each of the color component types, variable-length decoding on the color components belonging to the color component type, based on the markers included in the reordered coded stream; an inverse quantization unit which performs, for each of the color component types, inverse quantization on the variable-length decoded color components belonging to the color component type; an inverse frequency transformation unit which generates color component data including the markers by performing, for each of the color component types, inverse frequency transform on the inverse-quantized color components belonging to the color component type; and a color component reconstruction unit which (i) identifies the color component data generated for each of the color component types, based on the markers included in the color component data and (ii) performs reconstruction to allow the inverse-frequency-transformed color components to be arranged in the order obtained as a result of the reordering by the reordering unit, and each of the variable-length decoding unit, the inverse quantization unit, and the inverse frequency transform unit may perform the corresponding process for the color component types in parallel.

With this, in each of variable-length decoding, inverse quantization, and inverse frequency transform performed on the reordered coded stream, a process for a luma color component and a process for a chroma color component, for example, are performed in parallel. Accordingly, the speeds of variable-length decoding, inverse quantization, and inverse frequency transform can be enhanced, and the operating efficiency can be thus increased.

Here, to be more specific, the first processing unit may output, for each first unit of processing, a plurality of components included in the first unit of processing in the following order: four luma components, four first chroma components (Cb), and four second chroma components (Cr). Then, the reordering unit may reorder the components to output, for each second unit of processing, the components included in the second unit of processing in the following order: one luma component, one first chroma component, and one second chroma component.

The following is a description of image processing apparatuses in Embodiments, with reference to the drawings.

It should be noted that each of Embodiments described below shows a general or specific example. The numerical values, shapes, materials, structural elements, the arrangement and connection of the structural elements, steps, the processing order of the steps, and so forth described in Embodiments below are only examples, and are not intended to limit the present invention. Thus, among the structural elements in Embodiments below, structural elements not recited in any one of the independent claims indicating top concepts according to the present invention are described as arbitrary structural elements.

The terms such as "64×64 pixels" and "32×32 pixels" refer to "the size of 64 pixels by 64 pixels" and "the size of 32 pixels by 32 pixels", respectively.

Moreover, in the following description, the terms such as "block", "data unit", and "coding unit (CU)" each refer to a region having a certain size. Each of these terms may refer to an image region. Alternatively, each of these terms may refer to a data region included in a coded stream.

Furthermore, the term "image" may refer to video, a still image, a plurality of pictures included in video, one picture included in video, or a part of a picture.

Embodiment 1

An image decoding apparatus which is an image processing apparatus in Embodiment 1 includes an inverse quantization unit that has a reordering unit for changing the order of coefficient information pieces (components) included in a coded stream.

1.1 Overview

Firstly, an overview of the image decoding apparatus in Embodiment 1 is described. The image decoding apparatus in Embodiment 1 performs variable-length decoding on a coded stream. After this, the image decoding apparatus performs processes subsequent to the variable-length decoding for each unit size smaller than the CU, by causing the reordering unit to reorder coefficient information pieces stored for each coding unit (CU). To be more specific, after performing variable-length decoding on the coded stream for each CU of 64×64 pixels, the image decoding apparatus performs inverse quantization and the subsequent processes for each TU having the size of 32-by-32 pixels (the TU includes luma Y of 32×32 pixels, chroma Cb of 16×16 pixels, and chroma Cr of 16×16 pixels).

1-2. Configuration

Next, a configuration of the image decoding apparatus in Embodiment 1 is described.

Figure 5:
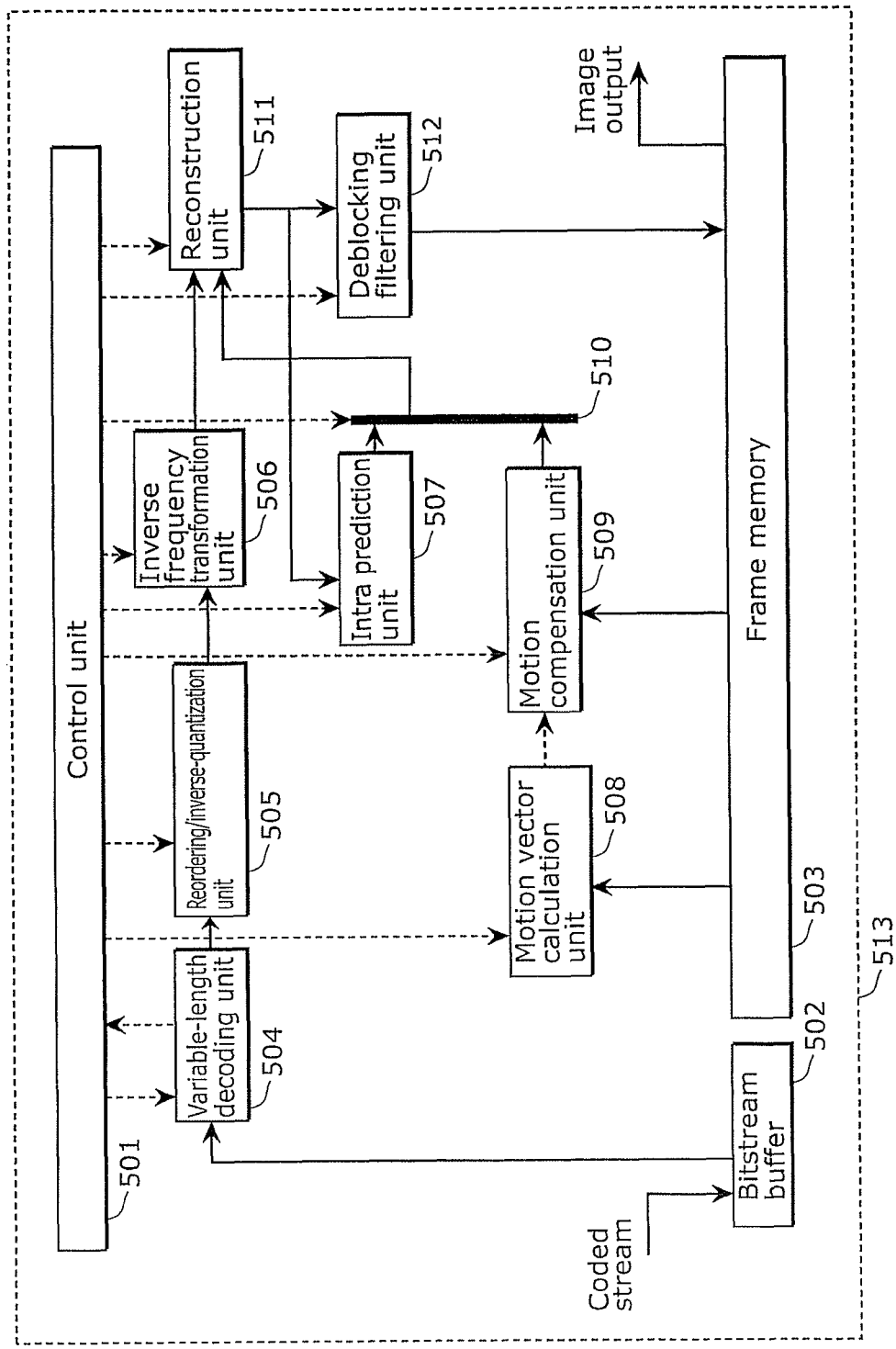
FIG. 5 is a block diagram showing a configuration of an image decoding apparatus in Embodiment 1.

FIG. 5 is a block diagram showing the configuration of the image decoding apparatus in Embodiment 1. An image decoding apparatus 513 in Embodiment 1 includes a control unit 501, a bitstream buffer 502, a frame memory 503, a variable-length decoding unit 504, a reordering/inverse-quantization unit 505, an inverse frequency transformation unit 506, an intra prediction unit 507, a motion vector calculation unit 508, a motion compensation unit 509, a switch 510, a reconstruction unit 511, and a deblocking filtering unit 512. Note that the image decoding apparatus 513 includes a memory 701, a memory 702, a memory 703, and a memory 704 which are not illustrated in FIG. 5 (see FIG. 6).

Figure 6:
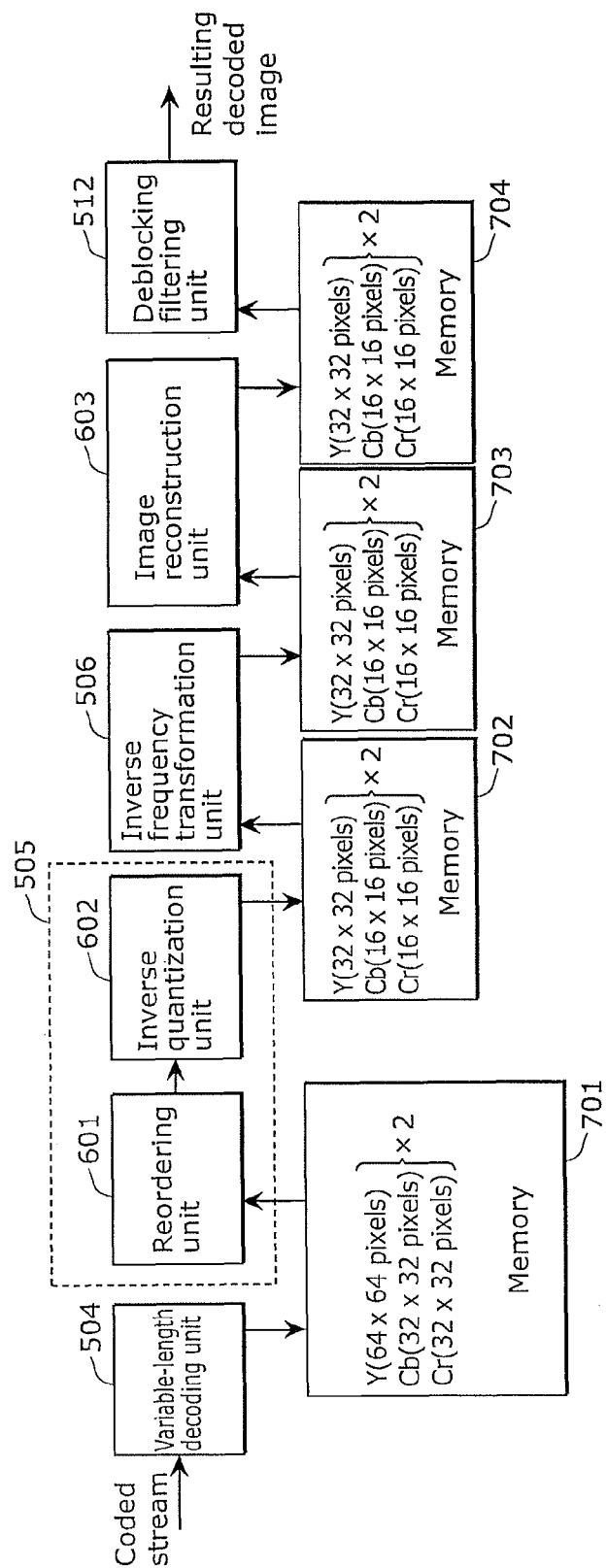
FIG. 6 is a block diagram showing the configuration of the image decoding apparatus in Embodiment 1 from a different point of view.

FIG. 6 is a block diagram showing the configuration of the image decoding apparatus 513 in Embodiment 1 from a different point of view. To be more specific, the image decoding apparatus 513 includes the variable-length decoding unit 504, the reordering/inverse-quantization unit 505, the inverse frequency transformation unit 506, an image reconstruction unit 603, the deblocking filtering unit 512, and the four memories 701 to 704. Here, the reordering/inverse-quantization unit 505 includes a reordering unit 601 and an inverse quantization unit 602. It should be noted that, in FIG. 6, the control unit 501, the bitstream buffer 502, and the frame memory 503 are omitted for convenience of explanation. Moreover, the image reconstruction unit 603 includes the intra prediction unit 507, the motion vector calculation unit 508, the motion compensation unit 509, the switch 510, and the reconstruction unit 511.

The control unit 501 controls the whole of the image decoding apparatus 513. The bitstream buffer 502 stores a received coded stream. The frame memory 503 stores decoded image data.

The variable-length decoding unit 504 reads the coded stream from the bitstream buffer 502, and generates a plurality of quantized values by performing variable-length decoding on the coded stream. Then, the variable-length decoding unit 504 outputs the quantized values to the reordering/inverse-quantization unit 505. The reordering/inverse-quantization unit 505 reorders at least some of the quantized values (coefficient information pieces). Moreover, the reordering/inverse-quantization unit 505 generates a plurality of frequency coefficients by performing inverse quantization on the quantized values in the changed order. Then, the reordering/inverse-quantization unit 505 outputs the frequency coefficients to the inverse frequency transformation unit 506. The inverse frequency transformation unit 506 generates a difference image by performing inverse frequency transform on the frequency coefficients. The intra prediction unit 507 generates a prediction image by performing intra-picture prediction (also referred to as intra prediction) on an image to be decoded. The motion vector calculation unit 508 calculates a motion vector and outputs the motion vector to the motion compensation unit 509. The motion compensation unit 509 generates a prediction image by performing, using the motion vector, motion compensation on the image to be decoded. The switch 510 switches a destination for obtaining the prediction image between the intra prediction unit 507 and the motion compensation unit 509, and then outputs the prediction image obtained from the destination to the reconstruction unit 511. The reconstruction unit 511 performs an image reconstruction process (a process of reconstructing an image) to generate a decoded image from the difference image generated by the inverse frequency transform and the prediction image. The deblocking filtering unit 512 increases the image quality of the decoded image by removing a block noise from the decoded image generated by the image reconstruction process.

1-3. Operation

Next, an operation performed by the image decoding apparatus 513 shown in FIG. 5 is described.

Figure 7A:
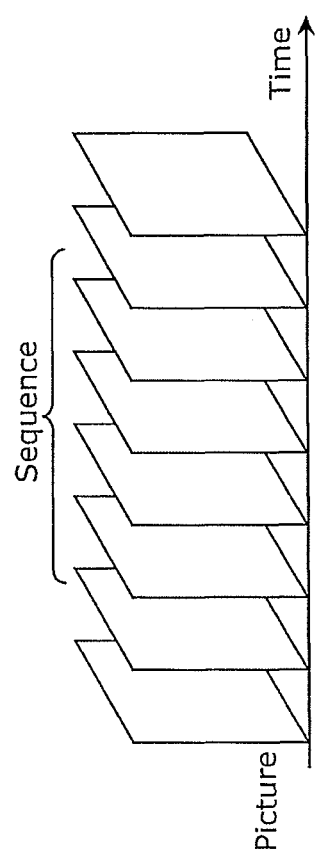
FIG. 7A is a diagram showing a structure of a stream.
Figure 7B:
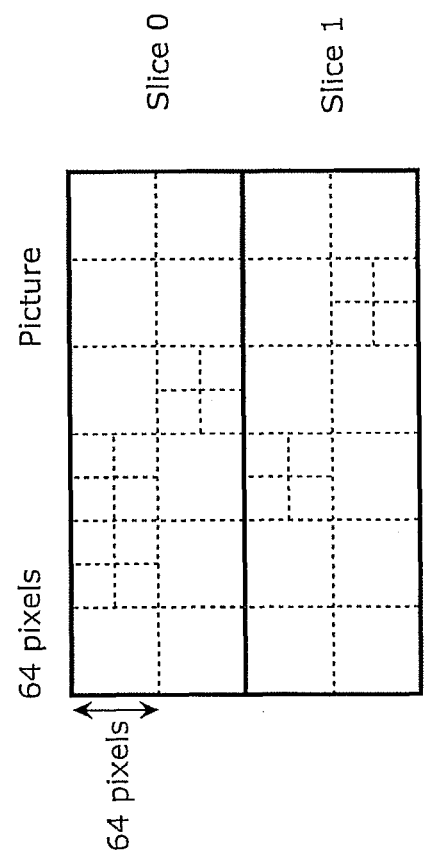
FIG. 7B is a diagram showing a structure of a picture.

Each of FIG. 7A and FIG. 7B is a diagram showing a hierarchical structure of a coded stream. A group of pictures is referred to as a sequence. Each picture is divided into slices. Moreover, each slice is divided into coding units (CUs). The CU includes a frequency transform unit (TU) and a prediction unit (PU). Note that the picture may not be divided into slices. The size of the coding unit (CU) is set between 64×64 pixels and 8×8 pixels. The CU is a data unit (as the smallest unit) in which the prediction method employed for coding an image is allowed to be switched between intra prediction and inter prediction. The size of the frequency transform unit (TU) is set between 32-by-32 pixels and 4-by-4 pixels within the coding unit (CU). The size of the prediction unit (PU) is set between 64×64 pixels and 4×4 pixels within the coding unit (CU). The PU has an intra prediction mode or a motion vector for inter prediction.

Figure 7C:
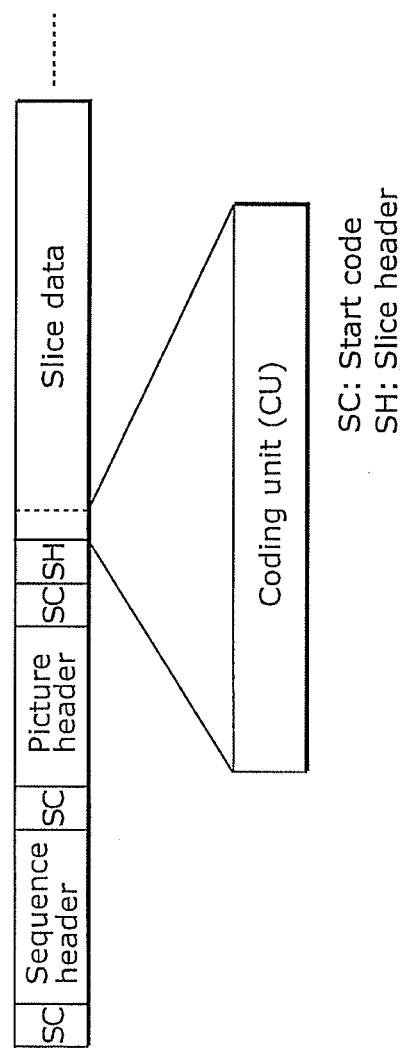
FIG. 7C is a diagram showing a data array in a stream.

FIG. 7C is a diagram showing an arrangement of pieces of data in the coded stream.

The coded stream is structured as shown in FIG. 7C by coding an image hierarchically. The coded stream includes:

a sequence header for controlling the sequence; a picture header for controlling the picture; a slice header for controlling the slice; and a coding unit (CU). According to the H.264 standard, the sequence header is referred to as a sequence parameter set (SPS) and the picture header is referred to as a picture parameter set (PPS).

Figure 8:
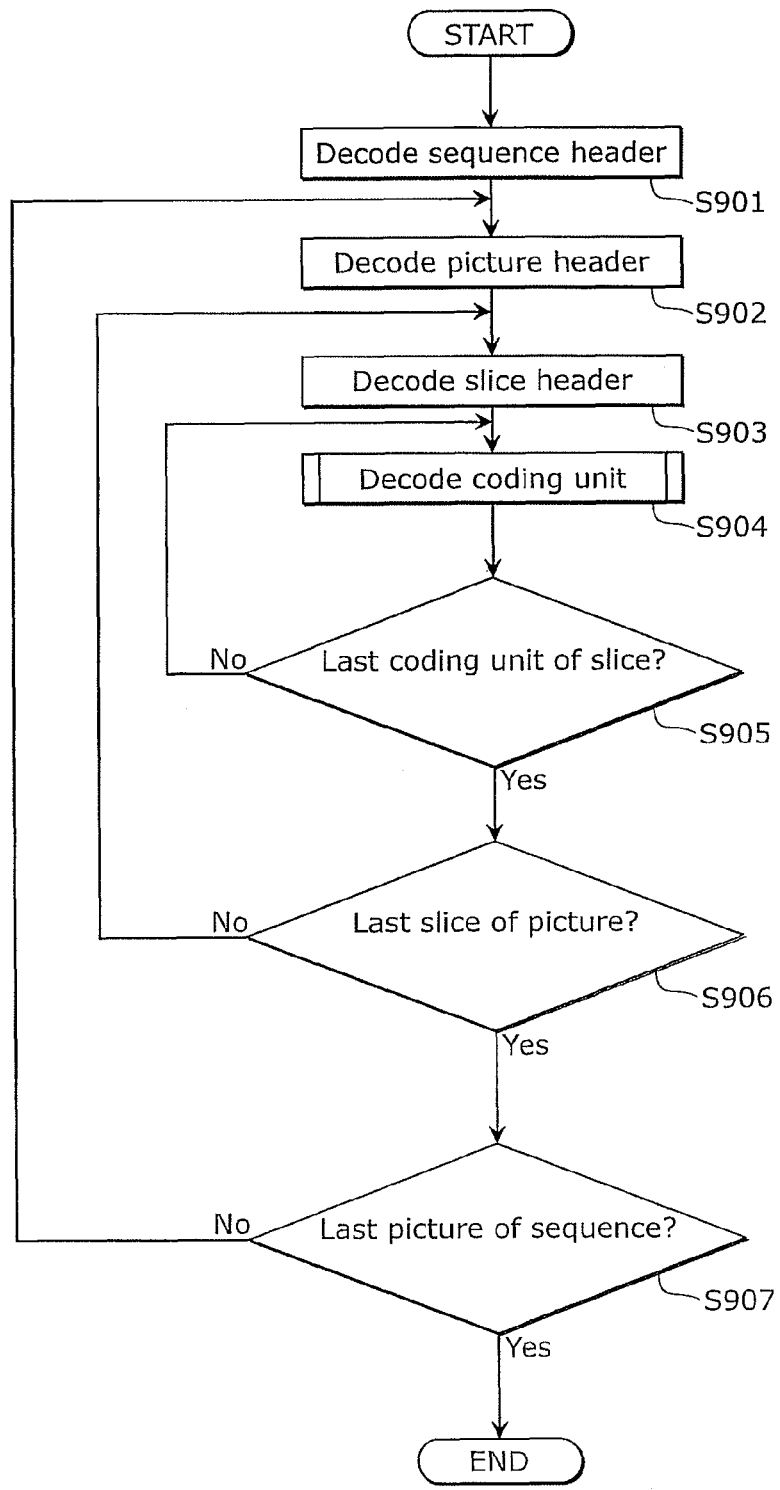
FIG. 8 is a flowchart showing a decoding operation performed by the image decoding apparatus in Embodiment 1.

FIG. 8 is a flowchart showing a decoding operation performed on one sequence of the coded stream by the image decoding apparatus 513. As shown in FIG. 8, the image decoding apparatus 513 firstly decodes the sequence header (S901). Under the control of the control unit 501, the variable-length decoding unit 504 performs sequence header decoding (S901) by decoding the coded stream stored in the bitstream buffer 502. Similarly, the image decoding apparatus 513 next decodes the picture header (S902) and the slice header (S903).

Following this, the image decoding apparatus 513 decodes the CU (S904). This CU decoding is described in detail later. When decoding of one CU is finished, the image decoding apparatus 513 determines whether or not the current CU is the last CU of the slice (S905). When the current CU is not the last CU of the slice, the image decoding apparatus 513 performs the process of S904 again to decode a next CU. When the current CU is the last CU of the slice, the image decoding apparatus 513 performs a process of S906.

More specifically, the image decoding apparatus 513 determines in S906 whether or not the current decoded slice is the last slice of the picture. When the current decoded slice is not the last slice of the picture, the image decoding apparatus 513 performs the processes from S903 again to decode a next slice header. When the current decoded slice is the last slice of the picture, the image decoding apparatus 513 performs a process of S907.

To be more specific, the image decoding apparatus 513 determines in S907 whether or not the current decoded picture is the last picture of the sequence. When the current decoded picture is not the last picture of the sequence, the image decoding apparatus 513 performs the processes from S902 again to decode a next picture header. When decoding is finished for all the pictures included in the sequence, the image decoding apparatus 513 terminates the series of decoding processes.

Figure 9:
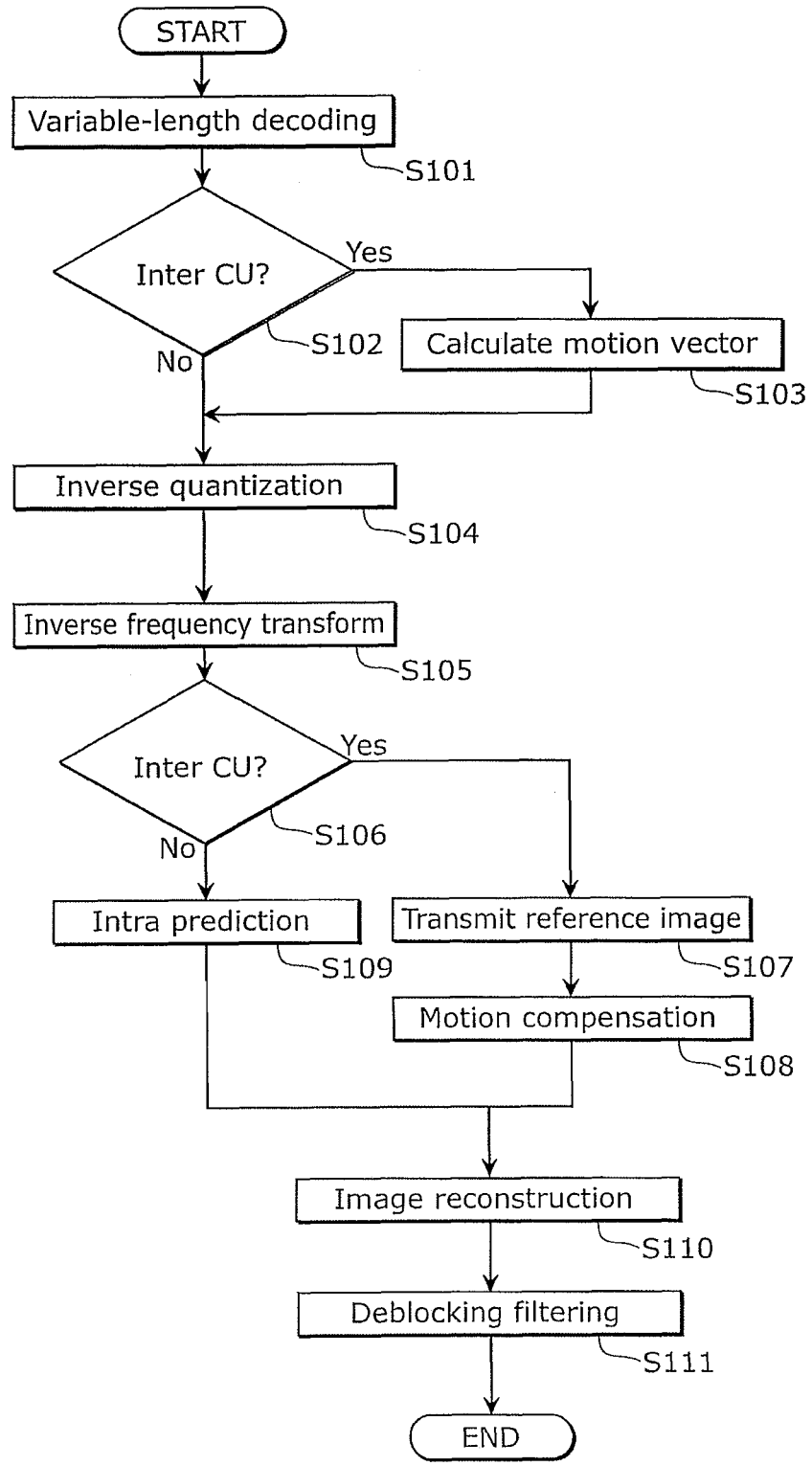
FIG. 9 is a flowchart showing a decoding operation performed on a coding unit (CU) by the image decoding apparatus in Embodiment 1.

FIG. 9 is a flowchart showing a decoding operation performed on one CU by the image decoding apparatus 513. More specifically, FIG. 9 shows the process of decoding the coding unit that is performed in S904 shown in FIG. 8. The image decoding apparatus 513 firstly causes the variable-length decoding unit 504 to perform variable-length decoding on the received coded stream (S101). The variable-length decoding unit 504 outputs coding information (such as a CU type, an intra prediction mode, motion vector information, and a quantization parameter) and coefficient information for each pixel data (the quantized values of luma Y, chroma Cb, and chroma Cr).

Next, the motion vector calculation unit 508 determines whether or not the current CU to be decoded is an inter CU coded by motion compensation or an intra CU coded by intra prediction (S102). Here, when the current CU is an inter CU, the motion vector calculation unit 508 calculates a motion vector using the coding information (S103). More specifically, the motion vector calculation unit 508 calculated a motion vector predictor, and then calculates the motion vector by adding the motion vector predictor to motion vector information (a motion vector difference value) included in the coded stream. It should be noted that the coding information is outputted from the variable-length decoding unit 504 to the control unit 501 and is then received by the processing units (the structural elements of the image decoding apparatus 513). The coefficient information is outputted to the reordering/inverse-quantization unit 505. Next, the reordering/inverse-quantization unit 505 performs inverse quantization (S104). Operations performed by the variable-length decoding unit 504 and the reordering/inverse-quantization unit 505 are described in detail later. Next, the inverse frequency transformation unit 506 performs inverse frequency transform (S105).

After this, the control unit 501 determines whether or not the current CU to be decoded is an inter CU or an intra CU (S106). When the current CU is an inter CU, the control unit 501 causes the motion vector calculated by the motion vector calculation unit 508 to be transmitted to the motion compensation unit 509. Then, the control unit 501 causes a reference image indicated by the motion vector to be transmitted from the frame memory 503 to the motion compensation unit 509 (S107). The motion compensation unit 509 generates a prediction image with half pixel precision or quarter pixel precision (S108). In other words, the motion compensation unit 509 performs motion compensation.

On the other hand, when the current CU is not an inter CU, that is, when the current CU is an intra CU, the control unit 501 causes the intra prediction unit 507 to perform inter prediction to generate a prediction image (S109). By controlling the switch 510 according to the result of the determination made in step S106, the control unit 501 selects the prediction image to be outputted to the reconstruction unit 511 between the prediction image generated by the motion compensation unit 509 and the prediction image generated by the intra prediction unit 507.

The reconstruction unit 511 generates the decoded image by adding the obtained prediction image to the difference image outputted from the inverse frequency transformation unit 506 (S110). To be more specific, the reconstruction unit 511 performs the image reconstruction process (the process of reconstructing the image). Next, the deblocking filtering unit 512 performs deblocking filtering to reduce a block noise of the decoded image obtained by the image reconstruction process (S111). Then, the block-filtered decoded image is stored into the frame memory 503. Here, the decoding operation for one CU is completed.

Next, operations performed by the variable-length decoding unit 504, the reordering unit 601, and the inverse quantization unit 602 that characterize Embodiment 1 are described in detail, with reference to FIG. 6. Here, suppose that a coding unit having the size of 64×64 pixels is to be decoded.

The variable-length decoding unit 504 performs variable-length decoding on the received coded stream. As a result, the variable-length decoding unit 504 outputs the coding information (such as a CU type, an intra prediction mode, motion vector information, and a quantization parameter) and the coefficient information for each pixel data.

In the present example, a flow of processing the coefficient information is explained. The coefficient information outputted from the variable-length decoding unit 504 is transmitted to the reordering unit 601 via the memory 701. The reordering unit 601 changes the order (arrangement) of the coefficient information pieces included in the coded stream. Then, the reordered coefficient information pieces are outputted to the inverse quantization unit 602. The inverse quantization unit 602 performs inverse quantization on these coefficient information pieces.

Here, an operation performed by the reordering unit 601 is explained in detail with reference to FIG. 10 and FIG. 11.

It should be noted that, as shown in FIG. 1A, the size of the CU that is a unit in which the prediction method is switched between inter prediction and intra prediction is 64×64 pixels. Moreover, the size of the TU that is a frequency transform unit is 32×32 pixels.

Figure 10:
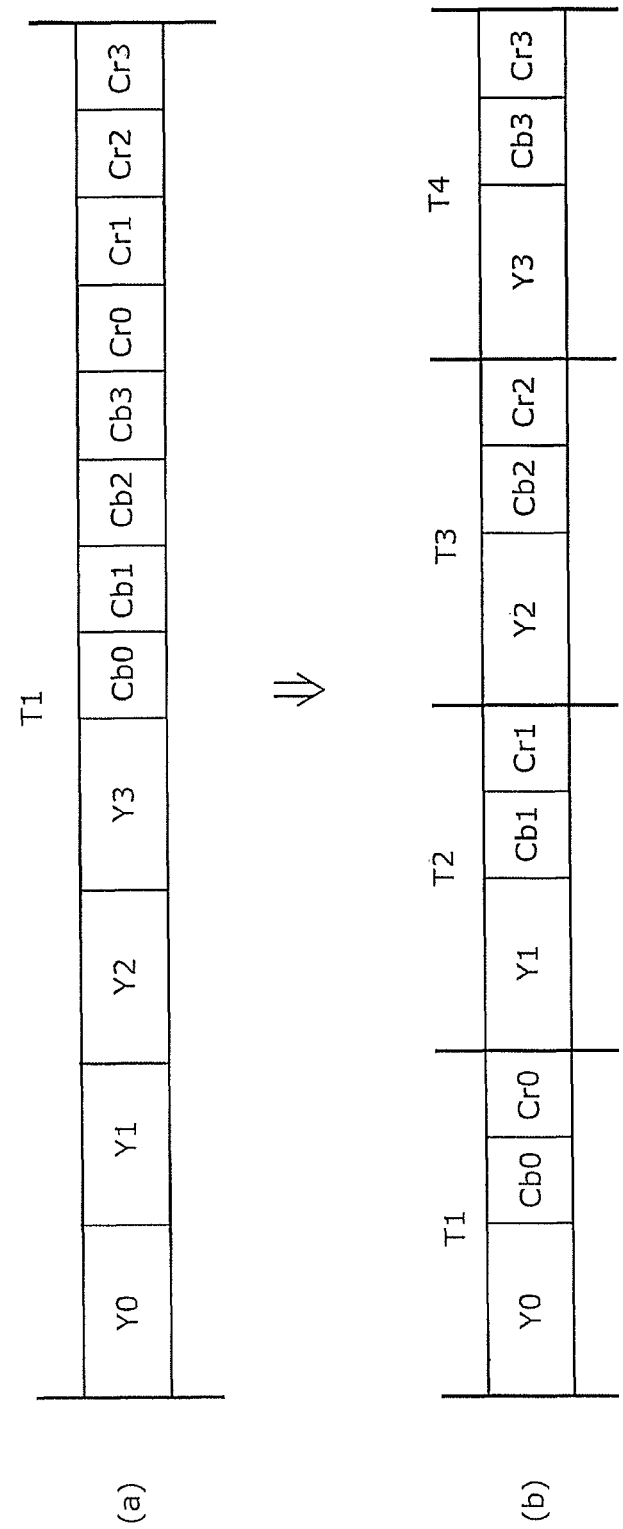
FIG. 10 is a diagram explaining reordering performed on pieces of coefficient information in Embodiment 1.

FIG. 10 is a diagram explaining reordering performed on the coefficient information pieces. FIG. 11 is a flowchart showing an operation performed by the reordering unit 601. With this reordering, the order of the coefficient information pieces outputted from the variable-length decoding unit 504 is changed.

The variable-length-decoded coefficient information pieces are stored or arranged into the memory 701 in the order shown in (a) of FIG. 10. According to the flow shown in FIG. 11, the reordering unit 601 firstly reads Y0 (32×32 pixels), Cb0 (16×16 pixels), and Cr0 (32×32 pixels) corresponding to the upper left TU0 of 32×32 pixels, and then outputs the corresponding coefficient information pieces (1536 pixels) to the inverse quantization unit 602 (S201). Next, the reordering unit 601 reads Y1 (32×32 pixels), Cb1 (16×16 pixels), and Cr1 (16×16 pixels) corresponding to the upper right TU1, and then outputs the corresponding coefficient information pieces (1536 pixels) to the inverse quantization unit 602 (S202). Following this, the reordering unit 601 reads Y2 (32×32 pixels), Cb2 (16×16 pixels), and Cr2 (16×16 pixels) corresponding to the lower left TU2, and then outputs the corresponding coefficient information pieces (1536 pixels) to the inverse quantization unit 602 (S203). Next, the reordering unit 601 reads Y3 (32×32 pixels), Cb3 (16×16 pixels), and Cr3 (16×16 pixels) corresponding to the lower right TU3, and then outputs the corresponding coefficient information pieces (1536 pixels) to the inverse quantization unit 602 (S204).

In this way, the reordering unit 601 reads and outputs sequentially, for each block (TU), the coefficient information pieces of luma and chroma corresponding to the same block (TU) at the same coordinates within the CU. By the repeated operations of such sequential reading and outputting, the order of the coefficient information pieces of luma Y, chroma Cb, and chroma Cr is changed as shown in FIG. 10. To be more specific, the order shown in (a) of FIG. 10 is changed into the order shown in (b) of FIG. 10. As a result, the inverse quantization unit 602 receives the coefficient information in a unit of 32×32 pixels (for each TU), and performs inverse quantization in this unit of pixels. Moreover, the processes subsequent to inverse quantization are performed in a unit of 32×32 pixels (for each TU) as well.

By the reordering performed on the coefficient information pieces as described above, a unit of 6144 pixels (a unit corresponding to the CU size) can be divided, for the purpose of outputting, into four sets each set being a unit of 1536 pixels (a unit corresponding to the TU size). The unit of 6144 pixels is the sum of Y (four sets of 32×32 pixels), Cb (four sets of 16×16 pixels), and Cr (four sets of 16×16 pixels).

Next, the inverse quantization unit 602 obtains, from the reordering unit 601, the coded stream in which the coefficient information pieces have been reordered. Then, the inverse quantization unit 602 performs inverse quantization on this coded stream for each set of 1536 pixels including Y (32×32 pixels), Cb (16×16 pixels), and Cr (16×16 pixels). After this, the inverse quantization unit 602 stores a plurality of frequency coefficients generated by this inverse quantization into the memory 702. The inverse frequency transformation unit 506 reads the frequency coefficients from the memory 702, and performs inverse frequency transform on the frequency coefficients for each unit of 1536 pixels described above. Then, the inverse frequency transformation unit 506 stores a difference image generated by the inverse frequency transform into the memory 703. The image reconstruction unit 603 reads the difference image from the memory 703, and performs a process, such as the image reconstruction process, on the difference image for each unit of 1536 pixels described above. Then, the image reconstruction unit 603 stores a decoded image generated by the process into the memory 704. The deblocking filtering unit 512 reads the decoded image from the memory 704, and performs deblocking filtering on the decoded image for each unit of 1536 pixels described above. It should be noted that each of the aforementioned "quantized value", "frequency coefficient", and "pixel" which are different in state refers to predetermined coefficient information or a predetermined component.

Embodiment 1 described thus far may be summarized as follows.

The image decoding apparatus 513 is an image processing apparatus that performs a predetermined process on a coded stream generated by coding an image. The image decoding apparatus 513 includes: a first processing unit which is, for example, the variable-length decoding unit 504; a reordering unit which is, for example, the reordering unit 601; and a second processing unit which is, for example, the inverse quantization unit 602.

The first processing unit performs a first process on the coded stream to sequentially output, for each first unit of processing, one or more components included the first unit of processing. For example, the first unit of processing is the CU. Moreover, for each first unit of processing (CU) that is variable in size according to the structure of the coded stream, the first unit of processing sequentially outputs one or components included in the first unit of processing.

The reordering unit reorders the components outputted from the first processing unit to sequentially output, for each second unit of processing different from the first unit of processing, one or more components included in the second unit of processing. For example, the second unit of processing is the TU or a unit of processing smaller than the TU. Moreover, for each second unit of processing that is variable in size according to the structure of the coded stream, the reordering unit sequentially outputs one or more components included in the second unit of processing. Furthermore, for each second unit of processing that is smaller than the first unit of processing, the reordering unit sequentially outputs one or more components included in the second unit of processing.

The first processing unit sequentially outputs color components as the components included in the first unit of processing. Here, the reordering unit reorders the color components outputted from the first processing unit to sequentially output color components included in the second unit of processing. The color components are, for example, luma-Y coefficient information, chroma-Cb coefficient information, and chroma-Cr coefficient information.

The first processing unit sequentially outputs the color components to sequentially store the color components into a storage unit. The storage unit is, for example, the memory 701. Here, as shown in FIG. 11, the reordering unit reorders the color components by sequentially reading the color components in the order different from the order in which the color components are stored in the storage unit.

Moreover, the second processing unit may perform, as a process included in the second process, a reconstruction process to reconstruct an image corresponding to the second unit of processing using color components included in the second unit of processing. To be more specific, the second processing unit may have a function as the image reconstruction unit 603 or the reconstruction unit 511. Furthermore, the first processing unit may perform variable-length decoding as the first process, and the second processing unit may perform inverse quantization as a process included in the second process.

It should be noted that the aforementioned component may refer to a color component or any other component (such as coding information).

1-4. Advantageous Effect

In Embodiment 1 as described thus far, the order of coefficient information pieces outputted and stored into the memory 701 by the variable-length decoding unit 504 is changed by the reordering unit 601 present before the inverse quantization unit 602. With this, each of the capacities of the memory 702, the memory 703, and the memory 704 present after the inverse quantization unit 602 can be reduced from the capacity corresponding to two sets of 64×64 pixels (12288 pixels that is the sum of the pixels of luma Y, chroma Cb, and chroma Cr) to the capacity corresponding to two sets of 32×32 pixels (3072 pixels that is the sum of the pixels of luma Y, chroma Cb, and chroma Cr). In other words, each of the capacities of the memories connecting the processing units present after the inverse quantization unit 602 can be reduced to a quarter of the original capacity. This can reduce the cost of memories, and thus can also reduce the power consumption.

[Proviso]

Embodiment 1 has described the case where the variable-length coding method is used. However, any other coding method may be used, such as Huffman coding, run-length coding, arithmetic coding, or fixed-length coding.

Moreover, each of the configurations of the processing units may be implemented, in whole or part, by a circuit configured with dedicated hardware, or may be implemented by a program on a processor.

Furthermore, each of the frame memory 503, the memory 701, the memory 702, the memory 703, and the memory 704 is described as a memory. However, each of these memories may be configured with a different storage element such as a flip-flop, as long as the storage element can store data. Alternatively, each of these memories may be configured to use a part of a memory area of a processor or a part of a cache memory.

Moreover, the size of the unit of processing (the second unit of processing) including luma Y, chroma Cb, and chroma Cr used by the reordering unit 601 is not limited to the size of 32×32 pixels (a total of 1536 pixels of luma Y, chroma Cb, and chroma Cr), and may be smaller or larger than this size. For example, the size may be 16×16 pixels (a total of 384 pixels of luma Y, chroma Cb, and chroma Cr). To be more specific, suppose that the unit of processing including luma Y, chroma Cb, and chroma Cr of the coded stream before reordering (the first unit of processing or the CU) is 32×32 pixels including luma Y (32×32 pixels), chroma Cb (16×16 pixels), and chroma Cr (16×16 pixels). In this case, the reordering unit 601 may change the order of the coefficient information pieces of the coded stream into the order based on a unit of 16×16 pixels.

Furthermore, the reordering unit 601 is positioned immediately before the inverse quantization unit 602 as an example. However, the example is not intended to be limiting. The reordering unit 601 may be positioned immediately before the inverse frequency transformation unit 506 or immediately before the image reconstruction unit 603.

Moreover, as an example, reordering is performed when the data is read from the memory. However, the example is not intended to be limiting. For example, the coefficient information pieces may be reordered when the data is written into the memory as shown in FIG. 13 according to the flow shown in FIG. 12. Then, when the data is to be read, the data may be read in order as shown in FIG. 13.

Figure 12:
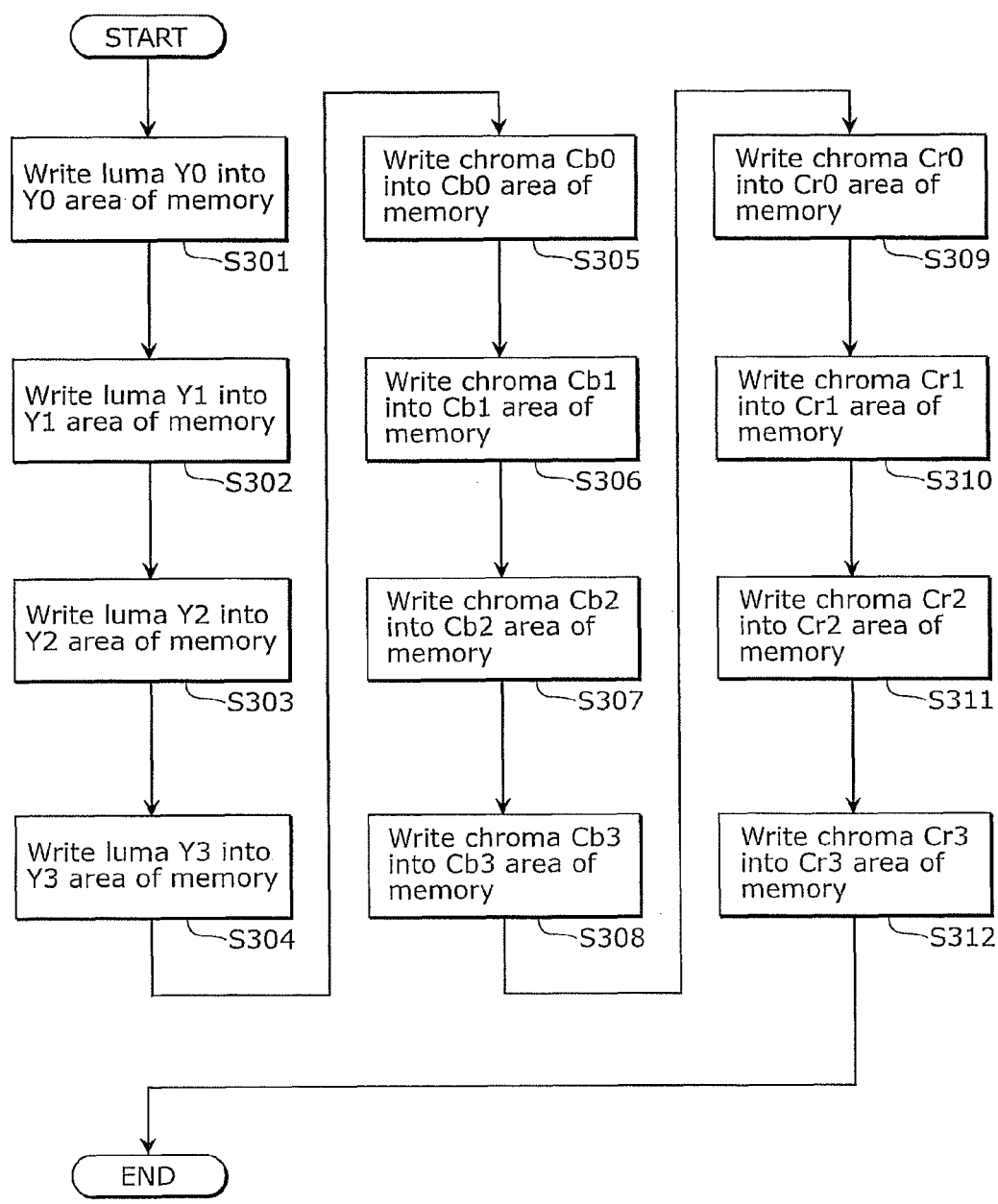
FIG. 12 is a flowchart showing an order in which pieces of coefficient information are written into a memory in Embodiment 1.

FIG. 12 is the flowchart showing an order in which the coefficient information pieces are written into the memory. FIG. 13 is a diagram showing an order in which the coefficient information pieces are written into the memory and an order in which the coefficient information pieces are read from the memory.

As shown in FIG. 12, when receiving the coefficient information pieces from the variable-length decoding unit 504, the reordering unit 601 writes luma Y0 into a Y0 area of the memory (S301), luma Y1 into a Y1 area of the memory (S302), luma Y2 into a Y2 area of the memory (S303), and luma Y3 into a Y3 area of the memory (S304). Moreover, the reordering unit 601 writes chroma Cb0 into a Cb0 area of the memory (S305), chroma Cb1 into a Cb1 area of the memory (S306), chroma Cb2 into a Cb2 area of the memory (S307), and chroma Cb3 into a Cb3 area of the memory (S308). Furthermore, the reordering unit 601 writes chroma Cr0 into a Cr0 area of the memory (S309), chroma Cr1 into a Cr1 area of the memory (S310), chroma Cr2 into a Cr2 area of the memory (S311), and chroma Cr3 into a Cr3 area of the memory (S312).

As a result, the coefficient information pieces are stored into the respective areas of the memory 701 as shown in FIG. 13. In this case, the inverse quantization unit 602 reads these coefficient information pieces in the order in which the coefficient information pieces are stored in the respective areas of the memory 701, and performs inverse quantization on the coefficient information pieces.

To be more specific, in Embodiment 1, the reordering unit (the reordering unit 601) may reorder the color components, by sequentially writing the color components into the storage unit (the memory 701) in the order different from the order in which the color components are outputted from the first processing unit (the variable-length decoding unit 504). The second processing unit (the inverse quantization unit 602) may sequentially read the color components in the order in which the color components are stored in the storage unit.

Moreover, the reordering unit 601 may be positioned immediately after the variable-length decoding unit 504, immediately after the inverse quantization unit 602, immediately after the inverse frequency transformation unit 506; or immediately after the image reconstruction unit 603. In other words, the reordering unit 601 may be positioned in one or more of the processing units where the coefficient information is passed.

Embodiment 2

2-1. Overview

Next, an overview of an image processing apparatus in Embodiment 2 is described. The image processing apparatus in Embodiment 1 is configured as the image decoding apparatus 513 and reorders the coefficient information pieces after the process performed by the variable-length decoding unit 504 shown in FIG. 6. On the other hand, the image processing apparatus in Embodiment 2 reorders coefficient information pieces included in a received coded stream, before decoding a CU. Then, the image processing apparatus performs decoding including a process of decoding the CU on the reordered coded stream generated as a result of the reordering.

2-2. Configuration

Next, a configuration of the image processing apparatus in Embodiment 2 is described.

Figure 14:
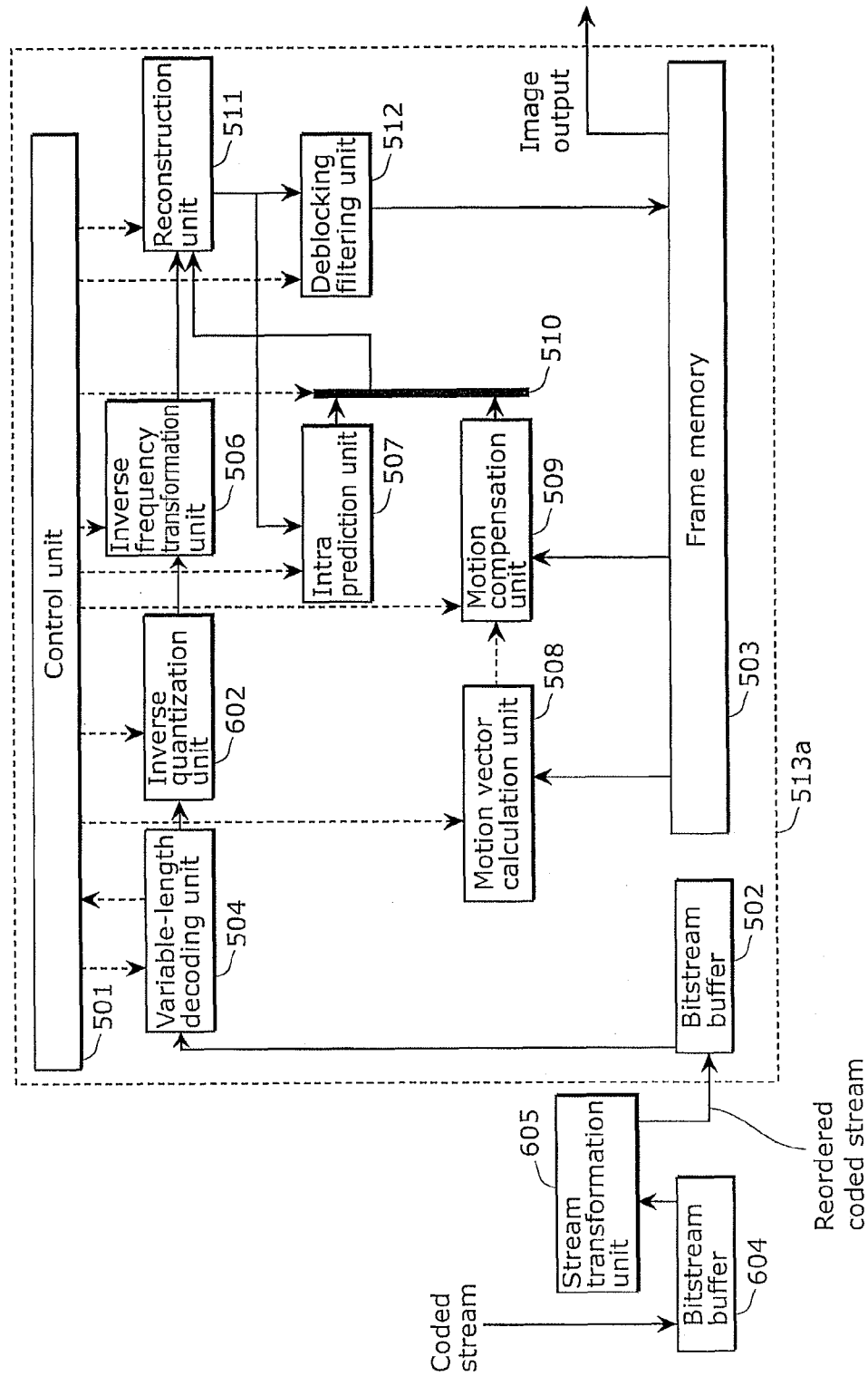
FIG. 14 is a block diagram showing a configuration of an image processing apparatus in Embodiment 2.

FIG. 14 is a block diagram showing a configuration of the image processing apparatus in Embodiment 2. The image processing apparatus in Embodiment 2 includes a bitstream buffer 604, a stream transformation unit 605, and an image decoding apparatus 513a. The bitstream buffer 604 is a memory for holding a coded stream. The stream transformation unit 605 generates a reordered coded stream by reading the coded stream from the bitstream buffer 604 and reordering coefficient information pieces included in the coded stream. Then, the stream transformation unit 605 outputs the reordered coded stream to a bitstream buffer 502 of the image decoding apparatus 513a. The image decoding apparatus 513 includes all the structural elements included in the image decoding apparatus 513 in Embodiment 1 except the reordering/inverse-quantization unit 505. The image decoding apparatus 513a includes an inverse quantization unit 602 in place of the reordering/inverse-quantization unit 505. It should be noted that structural elements of Embodiment 2 identical to those of Embodiment 1 are assigned the same reference signs as used in Embodiment 1 and that the detailed explanations of these structural elements are omitted here.

Figure 15:
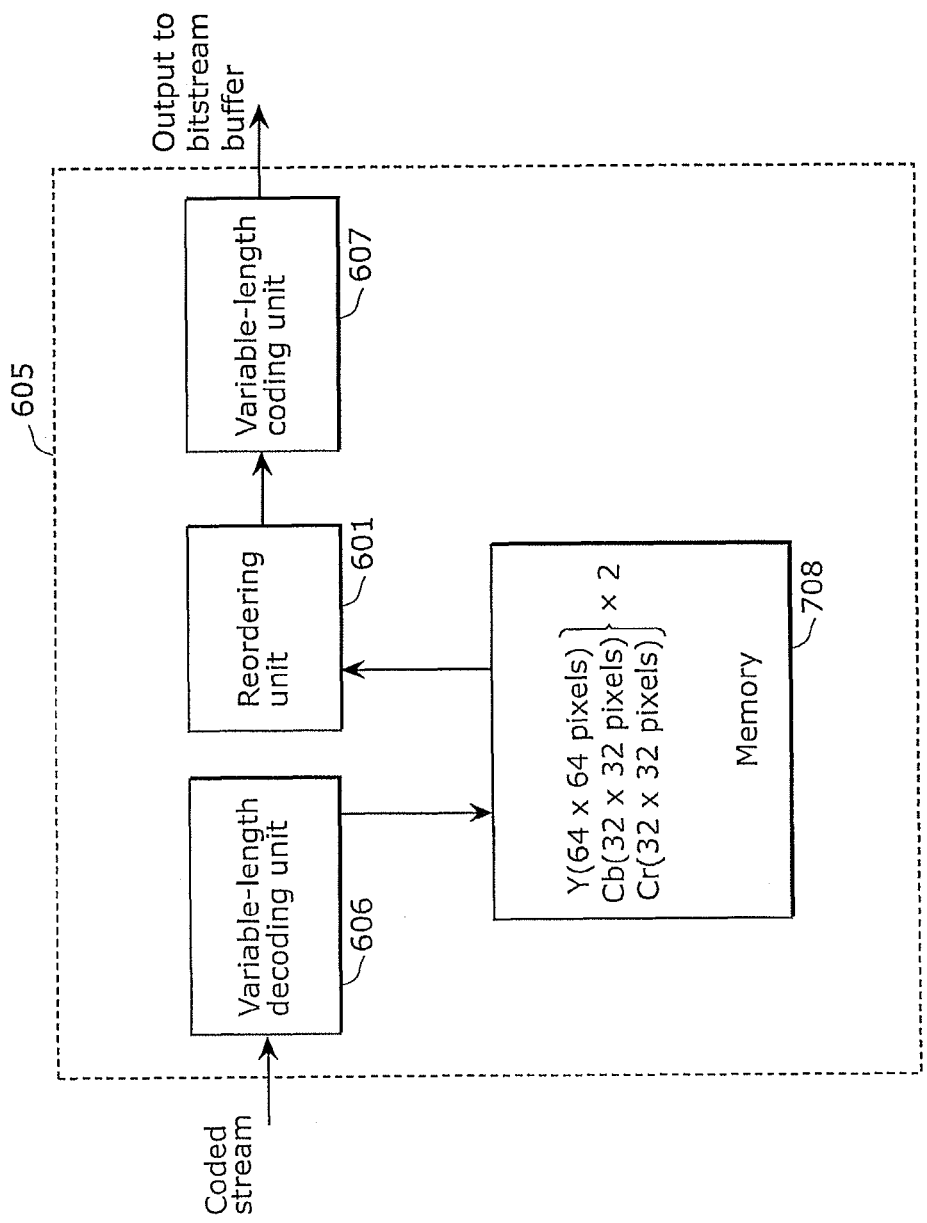
FIG. 15 is a block diagram showing a configuration of a stream transformation unit in Embodiment 2.

FIG. 15 is a block diagram showing a configuration of the stream transformation unit 605.

As shown in FIG. 15, the stream transformation unit 605 includes a variable-length decoding unit 606, a memory 708, a reordering unit 601, and a variable-length coding unit 607.

2-3. Operation

Next, an operation performed by the stream transformation unit 605 is described.

Figure 16:
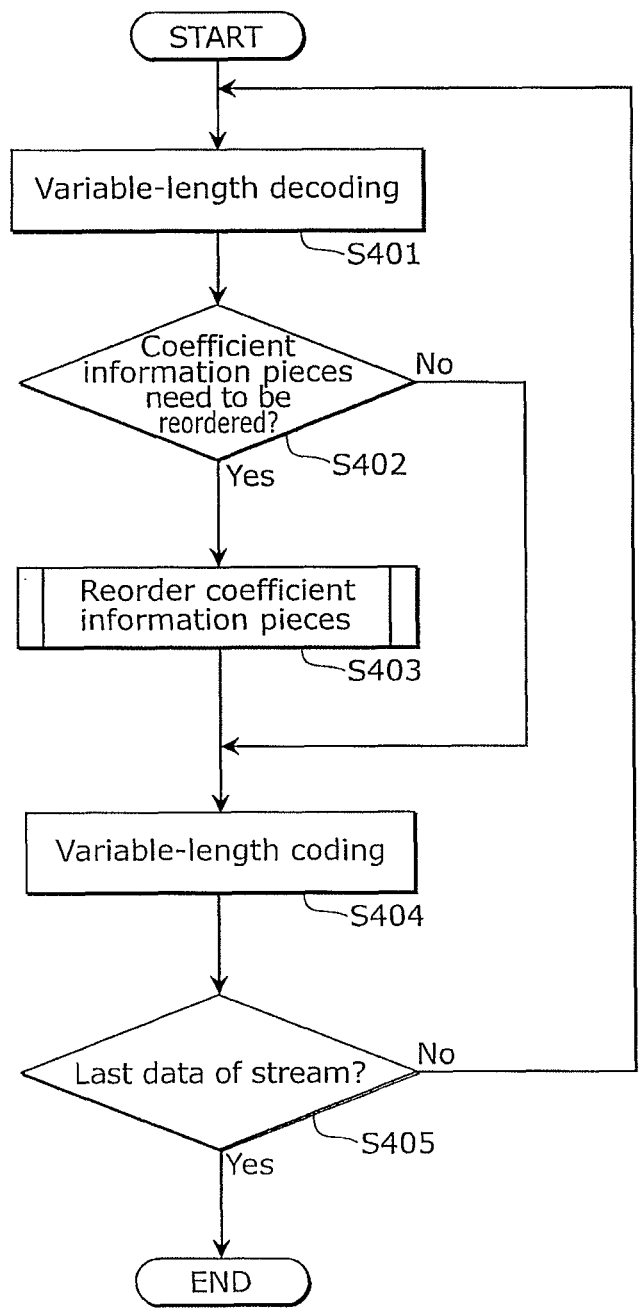
FIG. 16 is a flowchart showing an operation performed by the stream transformation unit in Embodiment 2.

FIG. 16 is a flowchart showing an operation performed by the stream transformation unit 605. The present case describes an example of reordering the coefficient information pieces as shown in FIG. 10.

The variable-length decoding unit 606 reads a coded stream from the bitstream buffer 604, and performs variable-length decoding on the coded stream (S401). After this, the variable-length decoding unit 606 stores the variable-length decoded coded stream as the variable-length decoded stream into the memory 708. The reordering unit 601 reads the variable-length decoded stream from the memory 708, and determines whether or not coefficient information pieces in the variable-length decoded stream need to be reordered (S402). To be more specific, the reordering unit 601 determines that reordering is necessary when the image data of 64×64 pixels included in the variable-length decoded stream includes a CU of 64×64 pixels and four TUs each having the size of 32×32 pixels. When determining that reordering is necessary (Yes in S402), the reordering unit 601 reorders the coefficient information pieces according to the flow shown in FIG. 11 (S403). The reordering unit 601 generates the reordered variable-length decoded stream by this reordering, and outputs the reordered variable-length decoded stream to the variable-length coding unit 607. The variable-length coding unit 607 performs variable-length coding on the reordered variable-length decoded stream (S404). The variable-length decoding unit 606 determines whether or not the current image data is the last image data of the coded stream (S405). When determining that the current image data is not the last image data of the coded stream (No in S405), the variable-length decoding unit 605 performs the process of S401 again.

By repeating the processes of S401 to S405, the stream transformation unit 605 generates the aforementioned reordered coded stream and outputs the reordered coded stream to the bitstream buffer 502 of the image decoding apparatus 513a. It should be noted that the reordering unit 601 does not perform reordering on information that is included in the variable-length decoded stream and that is not the coefficient information, i.e., on the coding information described above. Thus, the reordering unit 601 outputs the reordered variable-length decoded stream including the coding information.

Figure 17:
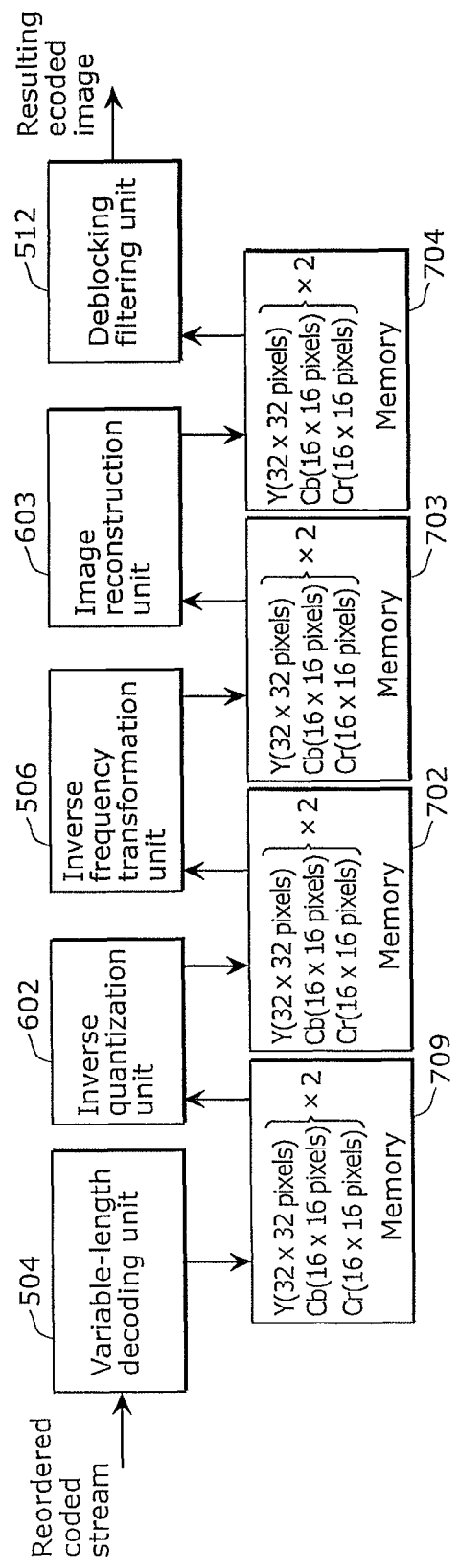
FIG. 17 is a block diagram showing a configuration of an image decoding apparatus in Embodiment 2.

FIG. 17 is a block diagram showing the configuration of the image decoding apparatus 513a from a different point of view. More specifically, the image decoding apparatus 513a includes a variable-length decoding unit 504, the inverse quantization unit 602, an inverse frequency transformation unit 506, an image reconstruction unit 603, a deblocking filtering unit 512, and four memories 702 to 704 and 709. Note that the image decoding apparatus 513a includes the memory 709 in place of the memory 701 of the image decoding apparatus 513 in Embodiment 1. The memory 709 stores data outputted from the variable-length decoding unit 504.

By the above-described process performed by the stream transformation unit 605, the coefficient information pieces of the coded stream received by the image decoding apparatus 513a have been reordered. On this account, as shown in FIG. 17, each of the capacities of the memories 702 to 704 and 709 required between the processing units in the image decoding apparatus 513a can be reduced.

Moreover, the variable-length coding unit 607 may perform variable-length coding on the reordered variable-length decoded stream according to a coding method different from the original coding method. For example, the original variable-length coding method, that is, the method for coding the coded stream, is context-based adaptive binary arithmetic coding (CABAC) described in Non Patent Literature 1 and Non Patent Literature 2. The processing by this coding method is complex although the coding efficiency is high as compared with context adaptive variable length coding (CAVLC) described in Non Patent Literature 1 and Non Patent Literature 2. Thus, by employing the coding method whereby the processing is easy (i.e., CAVLC) as the method for coding the reordered variable-length decoded stream, the variable-length coding unit 607 of the stream transformation unit 605 can reduce the processing load of variable-length decoding performed in the image decoding apparatus 513a.

Furthermore, when the above method is employed, the stream transformation unit 605 performs, at high speed, variable-length decoding and coding on the coded stream coded according to CABAC whereby the processing is complex. Then, the stream transformation unit 605 sufficiently stores the data on the reordered coded stream into the bitstream buffer 502. After this, the image decoding apparatus 513 performs decoding where the processing load is reduced. Accordingly, the performance of the image decoding apparatus can be easily ensured. It should be noted that the image decoding apparatus 513a is different from the image decoding apparatus 513 in Embodiment 1 in that the reordering unit 601 is not included in the image decoding apparatus 513a. On account of this, the image decoding apparatus 513a performs the same pipeline processing as the conventional processing and, therefore, the explanation of this processing is omitted here.

In Embodiment 2 as described thus far: a first processing unit is, for example, the variable-length decoding unit 606; a reordering unit is, for example, the reordering unit 601; and a second processing unit is, for example, the variable-length coding unit 607. To be more specific, in Embodiment 2, the first processing unit performs variable-length decoding as a first process and sequentially outputs one or more color components as components included in a first unit of processing. The reordering unit reorders the color components outputted from the first processing unit. The second processing unit performs variable-length coding as a process included in a second process. It should be noted that the stream transformation unit 605 in Embodiment 2 may be referred to as an image processing apparatus in an aspect according to the present invention.

Moreover, the image processing apparatus in Embodiment 2 includes a third processing unit which decodes a coded stream by performing a third process on the stream generated by the second process. The third processing unit is, for example, the image decoding apparatus 513a.

2-4. Advantageous Effect

As with Embodiment 1, Embodiment 2 can reduce each of the capacities of the memories 702 to 704 of the image decoding apparatus 513a by reordering the coefficient information pieces using the memory after variable-length decoding. Suppose that the coded stream is generated by the coding method including the complex variable-length coding process, such as CABAC. In this case, when the image decoding apparatus decodes the coded stream according to CABAC, a time period taken for decoding is longer and the performance of the image decoding apparatus may be decreased. However, in Embodiment 2, according to the state of the coded stream that has yet to be received by the image decoding apparatus 513a (i.e., the variable-length decoded stream), the coefficient information pieces are reordered and the coded stream is also transformed into the reordered coded stream according to the coding method whereby variable-length decoding is easier. With this, the performance of the image decoding apparatus 513a can be increased and, at the same time, each of the capacities of the memories (especially the memory 709) of the image decoding apparatus 513a can be reduced.

[Proviso]

Embodiment 2 has described the case where the variable-length coding method is used. However, any other coding method may be used, such as Huffman coding, run-length coding, arithmetic coding, or fixed-length coding.

Moreover, each of the configurations of the processing units may be implemented, in whole or part, by a circuit configured with dedicated hardware, or may be implemented by a program on a processor.

Furthermore, each of the frame memory 503, the memory 708, the memory 709, the memory 702, the memory 703, and the memory 704 is described as a memory. However, each of these memories may be configured with a different storage element such as a flip-flop, as long as the storage element can store data. Alternatively, each of these memories may be configured to use a part of a memory area of a processor or a part of a cache memory.

Moreover, the size of the unit of processing (the second unit of processing) including luma Y, chroma Cb, and chroma Cr used by the reordering unit 601 is not limited to the size of 32×32 pixels (a total of 1536 pixels of luma Y, chroma Cb, and chroma Cr), and may be smaller or larger than this size. For example, the size may be 16×16 pixels (a total of 384 pixels of luma Y, chroma Cb, and chroma Cr). To be more specific, suppose that the unit of processing including luma Y, chroma Cb, and chroma Cr of the coded stream before reordering (the first unit of processing or the CU) is 32×32 pixels including luma Y (32×32 pixels), chroma Cb (16×16 pixels), and chroma Cr (16×16 pixels). In this case, the reordering unit 601 may change the order of the coefficient information pieces of the coded stream into the order based on a unit of 16×16 pixels.

Moreover, as an example, reordering is performed when the data is read from the memory. However, the example is not intended to be limiting. For example, the coefficient information pieces may be reordered when the data is written into the memory as shown in FIG. 13 according to the flow shown in FIG. 12. Then, when the data is to be read, the data may be read in order as shown in FIG. 13.

Embodiment 3

3-1. Overview

Next, an overview of an image processing apparatus in Embodiment 3 is described. The image processing apparatus in Embodiment 2 reorders the coefficient information pieces included in the received coded stream before decoding the CU, and performs decoding including a process of decoding the CU on the reordered coded stream generated as a result of the reordering. Here, when generating the reordered coded stream, the image processing apparatus in Embodiment 2 serially performs variable-length coding for each of the reordered coefficient information pieces. In Embodiment 3, on the other hand, the image processing apparatus performs variable-length coding on the coefficient information pieces in parallel.

3-2. Configuration

Next, a configuration of the image processing apparatus in Embodiment 3 is described.

Figure 18:
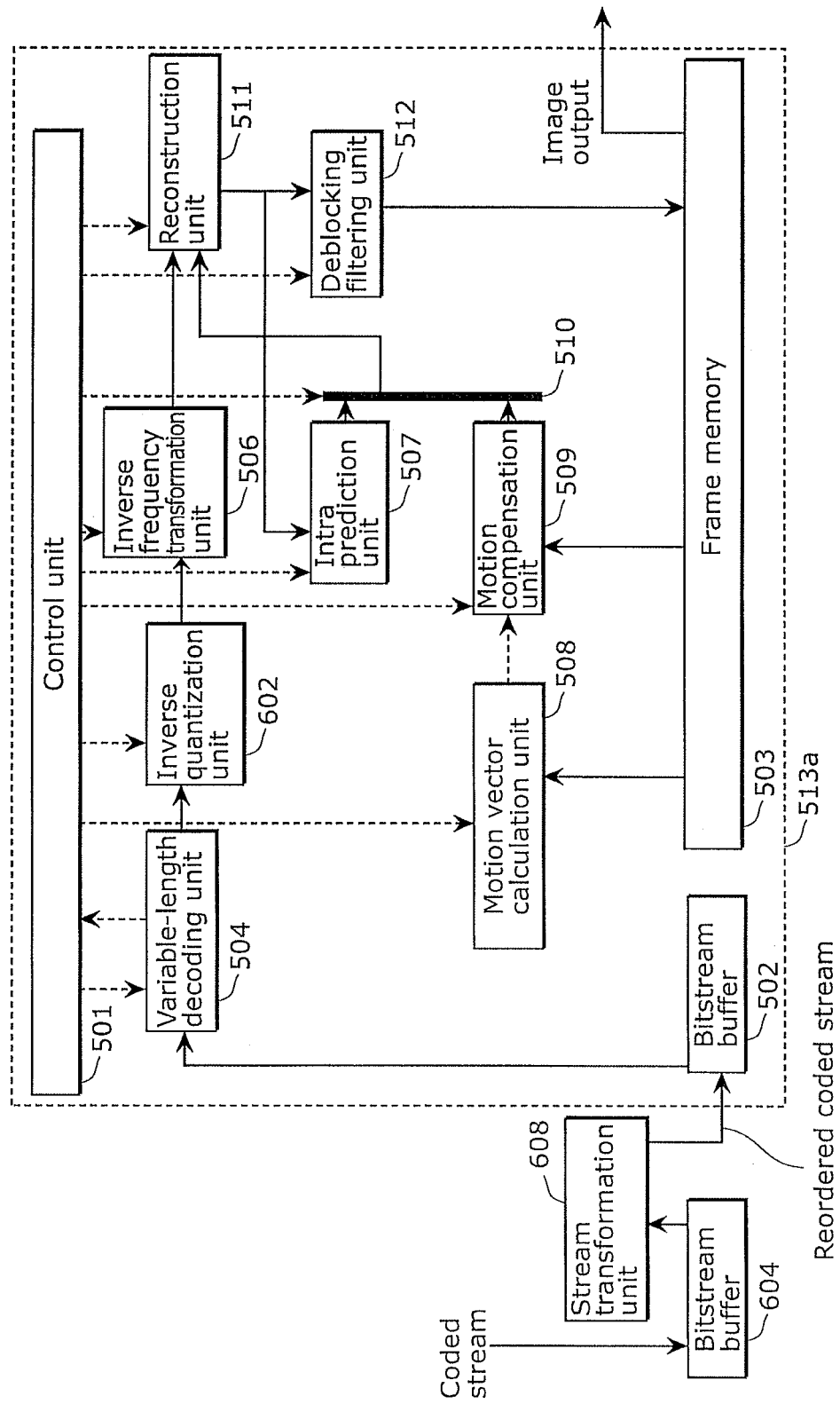
FIG. 18 is a block diagram showing a configuration of an image processing apparatus in Embodiment 3.

FIG. 18 is a block diagram showing a configuration of the image processing apparatus in Embodiment 3. The image processing apparatus in Embodiment 3 includes a bitstream buffer 604, a stream transformation unit 608, and an image decoding apparatus 513a. It should be noted that structural elements of Embodiment 3 identical to those of Embodiments 1 and 2 are assigned the same reference signs as used in Embodiments 1 and 2 and that the detailed explanations of these structural elements are omitted here.

To be more specific, the image processing apparatus in Embodiment 3 includes all the structural elements included in the image processing apparatus in Embodiment 2 except the stream transformation unit 605. The image processing apparatus in Embodiment 3 includes a different stream transformation unit 608 in place of the stream transformation unit 605. As with the stream transformation unit 605, the stream transformation unit 608 generates a reordered coded stream by reading the coded stream from the bitstream buffer 604 and reordering coefficient information pieces included in the coded stream. Then, the stream transformation unit 608 outputs the reordered coded stream to a bitstream buffer 502 of the image decoding apparatus 513a.

Figure 19:
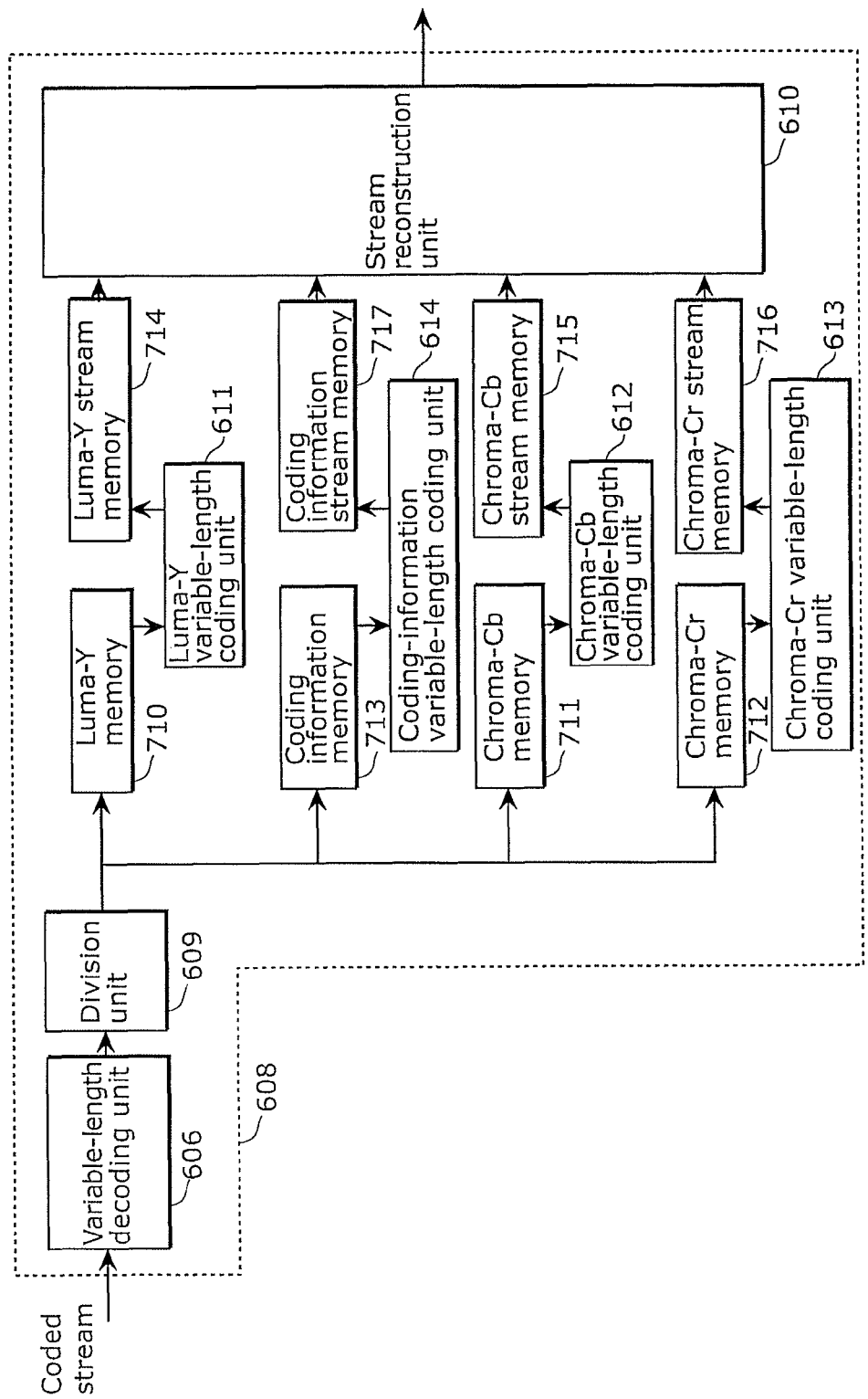
FIG. 19 is a block diagram showing a configuration of a stream transformation unit in Embodiment 3.

FIG. 19 is a block diagram showing a configuration of the stream transformation unit 608. As shown in FIG. 19, the stream transformation unit 608 includes a variable-length decoding unit 606, a division unit 609, a luma-Y memory 710, a chroma-Cb memory 711, a chroma-Cr memory 712, a coding information memory 713, a luma-Y variable-length coding unit 611, a chroma-Cb variable-length coding unit 612, a chroma-Cr variable-length coding unit 613, a coding-information variable-length coding unit 614, a luma-Y stream memory 714, a chroma-Cb stream memory 715, a chroma-Cr stream memory 716, a coding information stream memory 717, and a stream reconstruction unit 610.

3-3. Operation

Next, an operation performed by the stream transformation unit 608 is described.

The variable-length decoding unit 606 performs variable-length decoding on a received coded stream. Then, the division unit 609 divides the variable-length decoded stream generated as a result of the variable-length decoding into luma-Y coefficient information, chroma-Cb coefficient information, chroma-Cr coefficient information, and other coding information. The other coding information includes, for example, a CU type, an intra prediction mode, motion vector information, and a quantization parameter.

Figure 20:
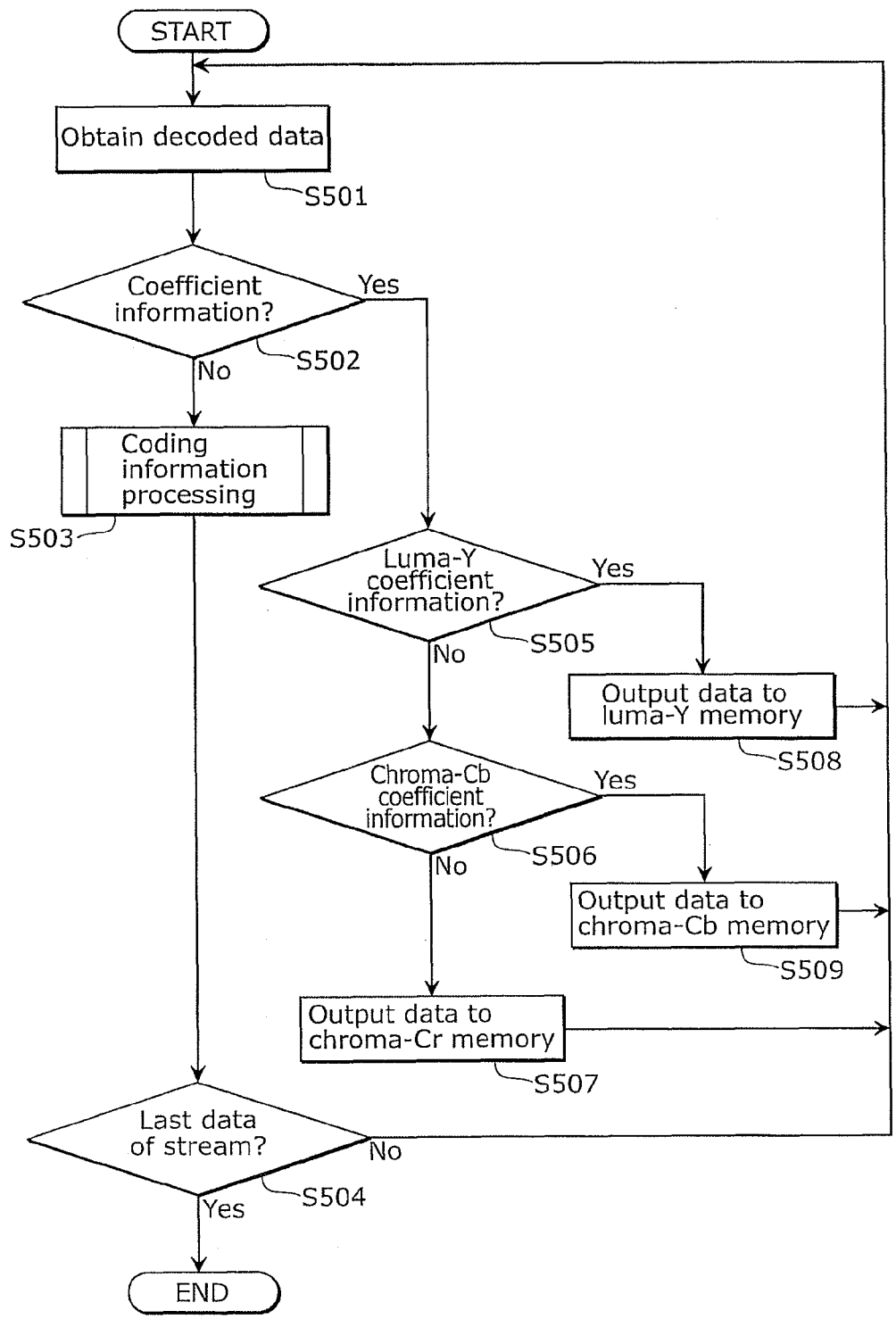
FIG. 20 is a flowchart showing an operation performed by a division unit in Embodiment 3.

FIG. 20 is a flowchart showing an operation performed by the division unit 609. The division unit 609 firstly obtains decoded data that is part of information included in the variable-length decoded stream (S501). Next, the division unit 609 determines whether or not the decoded data is coefficient information (S502). Here, when determining that the decoded data is not the coefficient information (No in S502), the division unit 609 performs coding information processing described later (S503). On the other hand, when determining that the decoded data is the coefficient information (Yes in S502), the division unit 609 further determines whether or not the coefficient information is luma-Y coefficient information (S505). Here, when determining that the coefficient information is the luma-Y coefficient information (Yes in S505), the division unit 609 outputs the decoded data that is the luma-Y coefficient information to the luma-Y memory 710 (S508). On the other hand, when determining that the coefficient information is not the luma-Y coefficient information (No in S505), the division unit 609 further determines whether or not the coefficient information is chroma-Cb coefficient information (S506).

When determining that the coefficient information is the chroma-Cb coefficient information (Yes in F506), the division unit 609 outputs the decoded data that is the chroma-Cb coefficient information to the chroma-Cb memory 711 (S509). On the other hand, when determining that the coefficient information is not the chroma-Cb coefficient information (No in S506), the division unit 609 determines that the coefficient information is chroma-Cr coefficient information and thus outputs the decoded data that is the chroma-Cr coefficient information to the chroma-Cr memory 712 (S507).

Moreover, after the process of S503, the division unit 609 determines whether or not the decoded data obtained in S501 is the last data of the variable-length decoded stream (S504). When it is determined that the decoded data is not the last data (No in S504) or when any one of the processes of S507 to S509 is performed, the division unit 609 performs the process of S501 again. To be more specific, the division unit 609 obtains a next piece of decoded data included in the variable-length decoded stream and performs the processes of S502 to S509 on the decoded data.

Next, an operation performed when the decoded data is not the coefficient information, that is, when the decoded data is coding information, is described with reference to the flowchart shown in FIG. 21.

Figure 21:
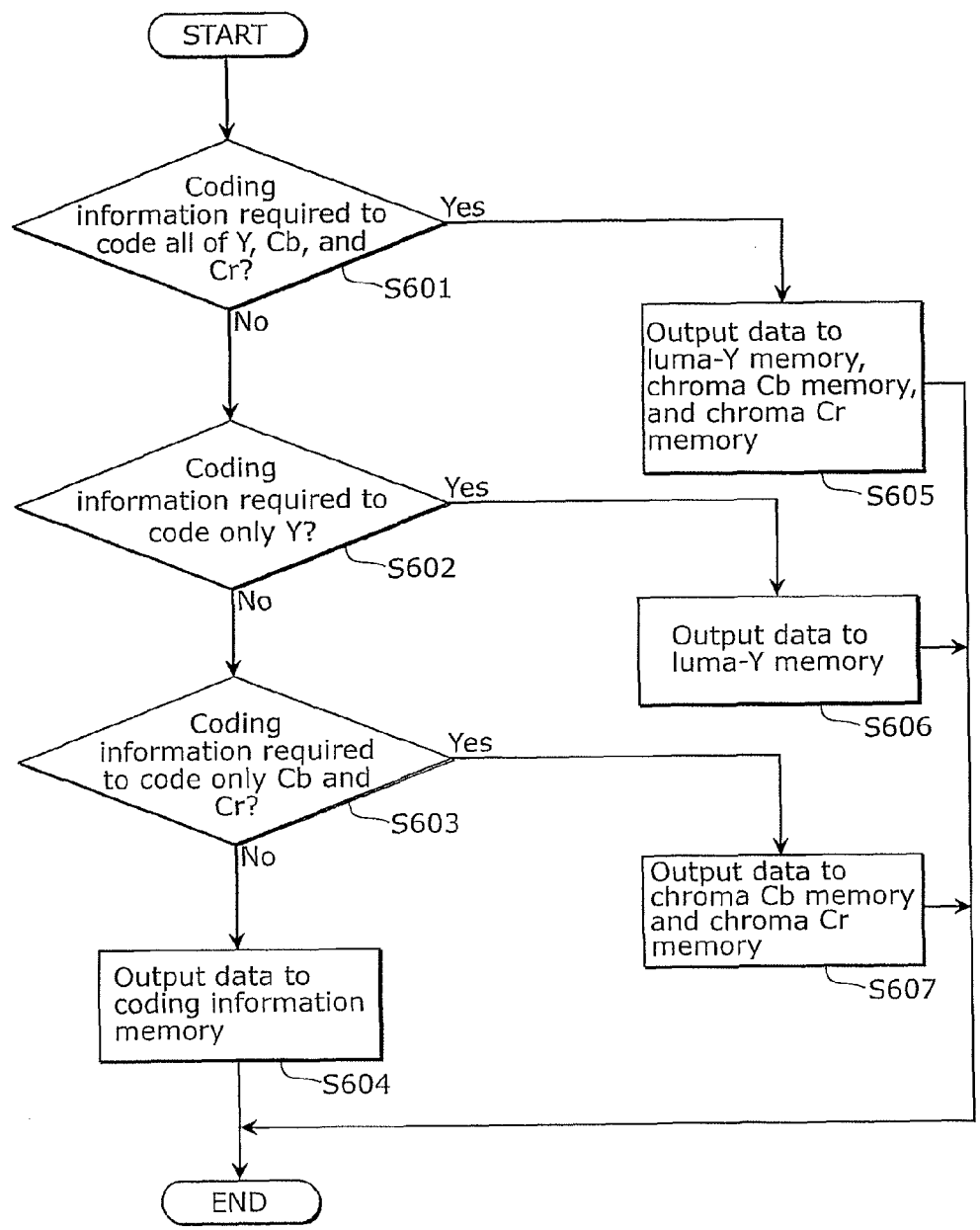
FIG. 21 is a flowchart showing coding information processing performed by the division unit in Embodiment 3.

FIG. 21 is a flowchart showing the coding information processing (S503) performed by the division unit 609. The coding information is classified into: information required to code at least one of luma Y, chroma Cb, and chroma Cr; and information required to perform decoding in and after inverse quantization. Thus, the division unit 609 firstly determines whether or not the aforementioned decoded data is the coding information required to code all of luma Y, chroma Cb, and chroma Cr (S601). Here, when determining that the decoded data is the coding information required to code all of luma Y, chroma Cb, and chroma Cr (Yes in S601), the division unit 609 outputs the respective decoded data pieces which are the coding information pieces to the luma-Y memory 710, the chroma-Cb memory 711, and the chroma-Cr memory 712 (S605).

On the other hand, when determining that the decoded data is not the coding information required to code all of luma Y, chroma Cb, and chroma Cr (No in S601), the division unit 609 further determines whether or not the aforementioned decoded data is the coding information required to code only luma Y (S602). Here, when determining that the decoded data is the coding information required to code only luma Y (Yes in S602), the division unit 609 outputs the decoded data which is the coding information to the luma-Y memory 710.

On the other hand, when determining that the decoded data is not the coding information required to code only luma Y (No in S602), the division unit 609 further determines whether or not the aforementioned decoded data is the coding information required to code only chroma Cb and chroma Cr (S603). Here, when determining that the aforementioned decoded data is the coding information required to code only chroma Cb and chroma Cr (Yes in S603), the division unit 609 outputs the respective decoded data pieces which are the coding information pieces to the chroma-Cb memory 711 and the chroma-Cr memory 712 (S607).

On the other hand, when determining that the decoded data is not the coding information required to code only chroma Cb and chroma Cr (No in S603), that is, when this coding information is required to perform decoding in and after inverse quantization, the division unit 609 outputs the decoded data which is the coding information to the coding information memory 713 (S604).

In this way, each of the decoded data pieces outputted from the division unit 609 is distributed to at least one of the luma-Y memory 710, the chroma-Cb memory 711, the chroma-Cr memory 712, and the coding information memory 713. In the subsequent processes, variable-length coding is performed using the information stored in the respective memories.

The luma-Y variable-length coding unit 611 generates a luma-Y stream by reading the decoded data from the luma-Y memory 710 and performing variable-length coding on the decoded data. The luma-Y variable-length coding unit 611 outputs the luma-Y stream to the luma-Y stream memory 714.

Moreover, the chroma-Cb variable-length coding unit 612 generates a chroma-Cb stream by reading the decoded data from the chroma-Cb memory 711 and performing variable-length coding on the decoded data. The chroma-Cb variable-length coding unit 612 outputs the chroma-Cb stream to the chroma-Cb stream memory 715.

Furthermore, the chroma-Cr variable-length coding unit 613 generates a chroma-Cr stream by reading the decoded data from the chroma-Cr memory 712 and performing variable-length coding on the decoded data. The chroma-Cr variable-length coding unit 613 outputs the chroma-Cr stream to the chroma-Cr stream memory 716.

The coding-information variable-length coding unit 614 generates a coding information stream by reading the decoded data from the coding information memory 713 and performing variable-length coding on the decoded data. The coding-information variable-length coding unit 614 outputs the coding information stream to the coding information stream memory 717.

The above-described processes for variable-length coding can be independently performed. More specifically, although the variable-length coding processes are performed serially in Embodiment 2, the stream transformation unit 608 in Embodiment 3 can perform the variable-length coding processes in parallel.

Figure 22:
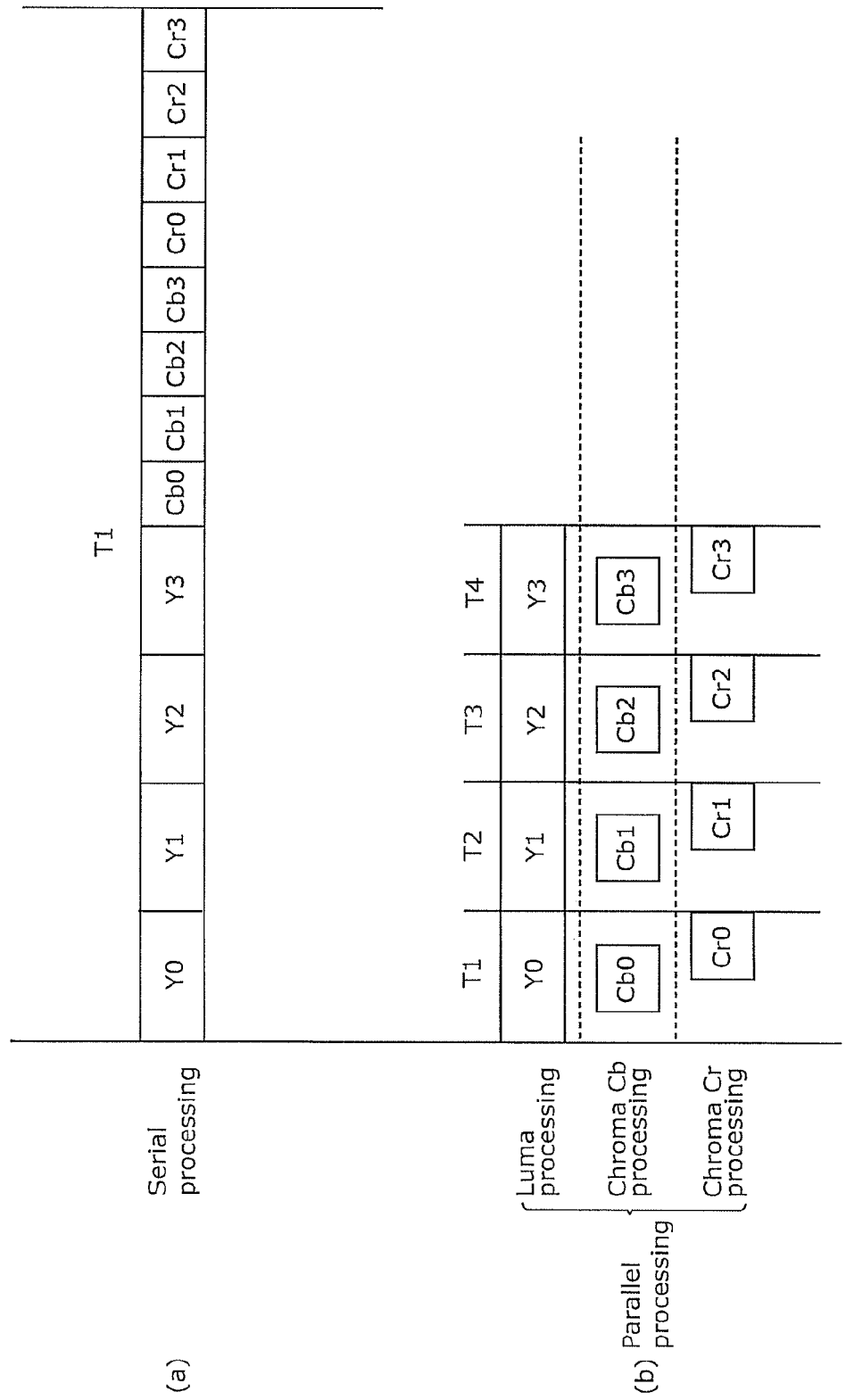
FIG. 22 is a timing diagram explaining parallel processes performed for variable-length coding in Embodiment 3.

FIG. 22 is a timing diagram explaining the parallel processes performed for variable-length coding. This timing diagram shows an operation performed after the color components luma Y, chroma Cb, chroma Cr, and the coding information required to code these color components are stored into the respective memories. As shown in (a) of FIG. 22, the stream transformation unit 605 in Embodiment 2 serially performs variable-length coding on the coefficient information pieces. To be more specific, in order to serially perform variable-length coding, the variable-length coding unit 607 of the stream transformation unit 605 reads the respective information pieces of luma Y, chroma Cb, and chroma Cr one by one from the memory 708 and then performs variable-length coding on these information pieces. On the other hand, as shown in (b) of FIG. 22, the stream transformation unit 608 in Embodiment 3 performs the variable-length coding processes on the coefficient information pieces in parallel. To be more specific, in Embodiment 3, each of the luma-Y variable-length coding unit 611, the chroma-Cb variable-length coding unit 612, and the chroma-Cr variable-length coding unit 613 independently performs variable-length coding to implement the parallel processing of variable-length coding. As a result, as compared with Embodiment 2 where the serial processing is performed, the total processing time taken for variable-length coding in Embodiment 3 can be substantially reduced as shown in (a) and (b) of FIG. 22.

The stream reconstruction unit 610 extracts the luma-Y stream, the chroma Cb stream, the chroma Cr stream, and the coding information stream from the luma-Y stream memory 714, the chroma-Cb stream memory 715, the chroma-Cr stream memory 716, and the coding information stream memory 717, respectively. Here, the luma-Y stream includes pieces of variable-length coded coefficient information on luma Y. The chroma Cb stream includes pieces of variable-length coded coefficient information on chroma Cb. The chroma Cr stream includes pieces of variable-length coded coefficient information on chroma Cr. The coding information stream includes pieces of variable-length coded coding information.

More specifically, when extracting the stream from the corresponding memory, the stream reconstruction unit 610 sequentially selects each piece of information (such as the coefficient information or the coding information) included in the stream. Then, whenever the information is extracted, the stream reconstruction unit 610 generates the reordered coded stream by connecting the extracted coefficient information or coding information to the most recently extracted coefficient information or coding information. Here, the stream reconstruction unit 610 extracts the coding information to allow the position of the coding information in the reordered coded stream to be the same as the position in the original coded stream. In other words, the stream reconstruction unit 610 extracts the coding information in the order of the original coded stream. Moreover, the stream reconstruction unit 610 extracts the coefficient information pieces included in each of the aforementioned streams according to the flow shown in FIG. 11. By employing this extraction method, the above-described reordered coded stream is generated.

In Embodiment 3 described thus far, a first processing unit is, for example, the variable-length decoding unit 606. Moreover, a reordering unit includes, for example, the structural elements of the stream transformation unit 608 except the variable-length decoding unit 606. To be more specific, the reordering unit includes, for example, the division unit 609, the variable-length coding units 611 to 614, the memories 710 to 717, and the stream reconstruction unit 610. A second processing unit is, for example, the image decoding apparatus 513a.

More specifically, the first processing unit performs variable-length decoding as a first process and sequentially outputs one or more color components as components included in a first unit of processing. The reordering unit includes the division unit 609, the variable-length coding unit, and the stream reconstruction unit 610. The division unit 609 classifies the color components outputted from the first processing unit according to color component types. The variable-length coding unit includes, for example, the aforementioned variable-length coding units 611 to 614. The variable-length coding unit performs, for each of the color component types, variable-length coding on the color components belonging to the type, and stores the stream generated as a result of the variable-length coding into a storage unit. The storage unit is, for example, the aforementioned memories 714 to 717. The stream reconstruction unit 610 generates the reordered coded stream in which the color components are reordered, by sequentially reading, in the order different from the order in which the color components are outputted from the first processing unit, the color components from the stream generated and stored in the storage unit for each of the color component types. Here, the aforementioned variable-length coding unit performs the variable-length coding processes for the different color component types in parallel. Moreover, the reordered coded stream includes a unit of coding having the same size as the second unit of processing.

3-4. Advantageous Effect

As with Embodiment 2, Embodiment 3 reorders the coefficient information pieces included in the coded stream that has yet to be received by the image decoding apparatus 513a, and generates the reordered coded stream by variable-length coding according to the coding method whereby decoding is easier than in the case of the original coding method. With this, the performance of the image decoding apparatus 513a can be increased and, at the same time, each of the capacities of the memories of the image decoding apparatus 513a can be reduced. Moreover, in Embodiment 3, since the variable-length coding processes are performed in parallel, the processing time taken to generate the reordered coded stream can be reduced.

[Proviso]

Embodiment 3 has described the case where the variable-length coding method is used. However, any other coding method may be used, such as Huffman coding, run-length coding, arithmetic coding, or fixed-length coding.

Moreover, each of the configurations of the processing units may be implemented, in whole or part, by a circuit configured with dedicated hardware, or may be implemented by a program on a processor.

Furthermore, each of the frame memory 503, the luma-Y memory 710, the chroma-Cb memory 711, the chroma-Cr memory 712, the coding information memory 713, the luma-Y stream memory 714, the chroma-Cb stream memory 715, the chroma-Cr stream memory 716, and the a coding information stream memory 717 is described as a memory. However, each of these memories may be configured with a different storage element such as a flip-flop, as long as the storage element can store data. Alternatively, each of these memories may be configured to use a part of a memory area of a processor or a part of a cache memory.

Moreover, the size of the unit of processing (the second unit of processing) including luma Y, chroma Cb, and chroma Cr used by the stream transformation unit 608 is not limited to the size of 32×32 pixels (a total of 1536 pixels of luma Y, chroma Cb, and chroma Cr), and may be smaller or larger than this size. For example, the size may be 16×16 pixels (a total of 384 pixels of luma Y, chroma Cb, and chroma Cr). To be more specific, suppose that the unit of processing including luma Y, chroma Cb, and chroma Cr of the coded stream before reordering (the first unit of processing or the CU) is 32×32 pixels including luma Y (32×32 pixels), chroma Cb (16×16 pixels), and chroma Cr (16×16 pixels). In this case, the stream transformation unit 608 may change the order of the coefficient information pieces of the coded stream into the order based on a unit of 16×16 pixels.

Furthermore, the operation performed by the division unit 609 is not limited to the processes shown in FIG. 20 and FIG. 21.

Moreover, the division unit 609 in Embodiment 3 stores each of the decoded data pieces into the corresponding one of the luma-Y memory 710, the chroma-Cb memory 711, the chroma-Cr memory 712, and the coding information memory 713. However, the present invention is not limited to this, and the decoded data pieces may be stored in a shared memory.

Furthermore, in Embodiment 3, instead of performing the three variable-length coding processes (i.e., the variable-length coding process for luma Y, the variable-length coding process for chroma Cb, and the variable-length coding process for chroma Cr) in parallel, the two variable-length coding processes (the variable-length coding process for luma Y and the variable-length coding process for chroma Cb and chroma Cr) may be performed in parallel. In this case, in place of the chroma-Cb memory 711 and the chroma-Cr memory 613, the stream transformation unit 608 includes one shared memory having the functions of these two memories. Then, the division unit 609 stores, among the decoded data pieces, each of the pieces of coefficient information on chroma Cb and chroma Cr into this single shared memory.

Moreover, in Embodiment 3, the coding information is classified into: information required to code at least one of luma Y, chroma Cb, and chroma Cr; and information required to perform decoding in and after inverse quantization. Then, according to the result of the classification, the coding information is outputted to the luma-Y memory 710, the chroma-Cb memory 711, or the chroma-Cr memory 712. However, the coding information may be outputted to all of the luma-Y memory 710, the chroma-Cb memory 711, and the chroma-Cr memory 712 without classification. In this case, each of the variable-length coding units 611 to 613 may select the necessary coding information from the memory and use the selected coding information in variable-length coding.

Furthermore, in Embodiment 3, the decoded data pieces for luma Y, chroma Cb, and Embodiment 4

4-1. Overview

Next, an overview of an image processing apparatus in Embodiment 4 is described. The division unit 609 of the image processing apparatus in Embodiment 3 divides the variable-length decoded stream into the luma-Y information, the chroma-Cb information, the chroma-Cr information, and the coding information, and then stores these decoded data pieces into the respective memories. In Embodiment 4, on the other hand, the variable-length decoded stream is not divided, and respective markers identifying the luma-Y information, the chroma-Cb information, the chroma-Cr information, and the coding information are added (inserted) into the variable-length decoded stream. With this, a memory can be easily shared.

4-2. Configuration

Next, a configuration of the image processing apparatus in Embodiment 4 is described.

Figure 23:
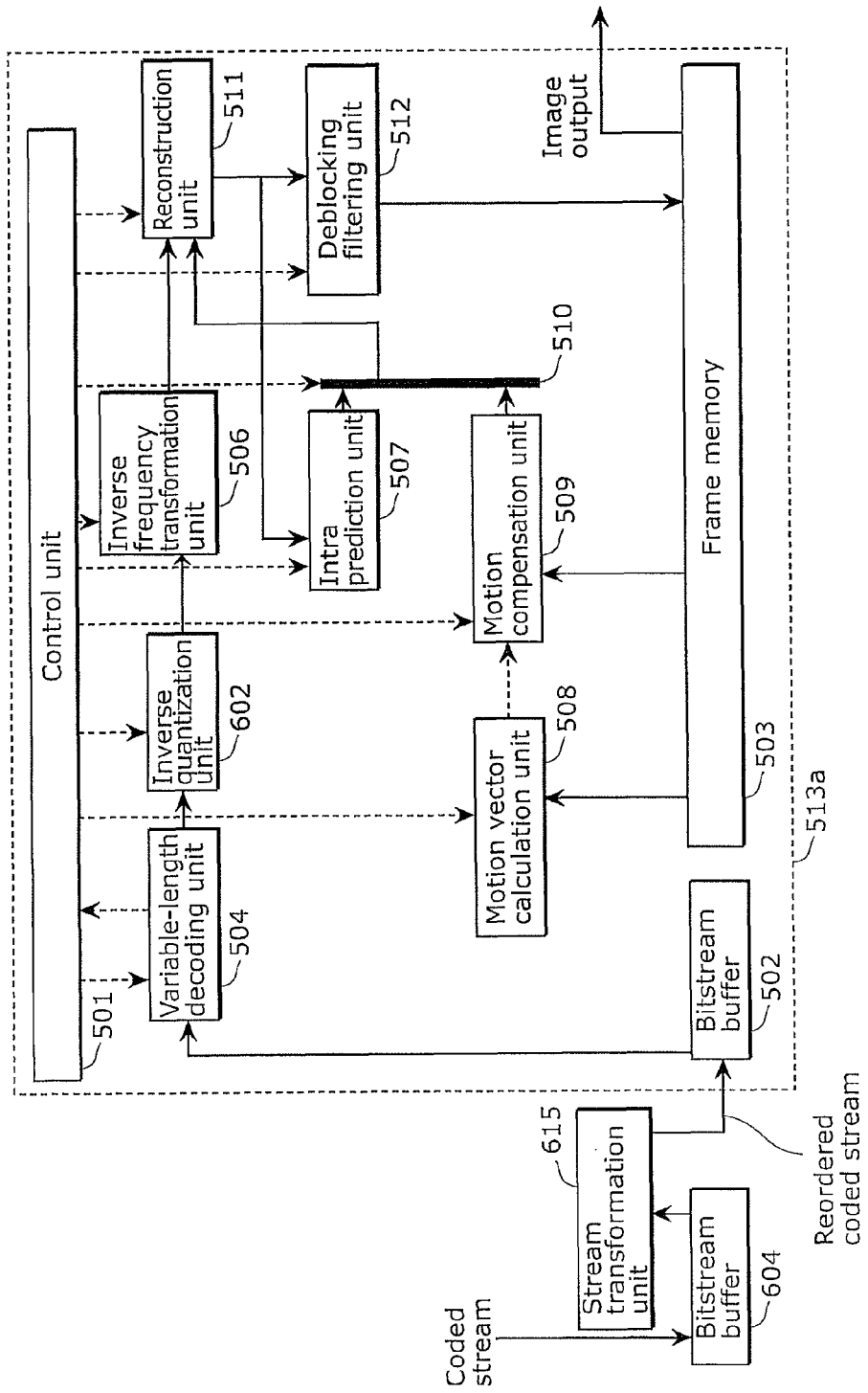
FIG. 23 is a block diagram showing a configuration of an image processing apparatus in Embodiment 4.

FIG. 23 is a block diagram showing a configuration of the image processing apparatus in Embodiment 4. The image processing apparatus in Embodiment 4 includes a bitstream buffer 604, a stream transformation unit 615, and an image decoding apparatus 513a. It should be noted that structural elements of Embodiment 4 identical to those of Embodiments 1, 2, and 3 are assigned the same reference signs as used in Embodiments 1, 2, and 3 and that the detailed explanations of these structural elements are omitted here.

To be more specific, the image processing apparatus in Embodiment 4 includes all the structural elements included in the image processing apparatus in Embodiment 3 except the stream transformation unit 608. The image processing apparatus in Embodiment 4 includes a different stream transformation unit 615 in place of the stream transformation unit 608. As with the stream transformation unit 608, the stream transformation unit 615 generates a reordered coded stream by reading the coded stream from the bitstream buffer 604 and reordering coefficient information pieces included in the coded stream. Then, the stream transformation unit 615 outputs the reordered coded stream to a bitstream buffer 502 of the image decoding apparatus 513a.

Figure 24:
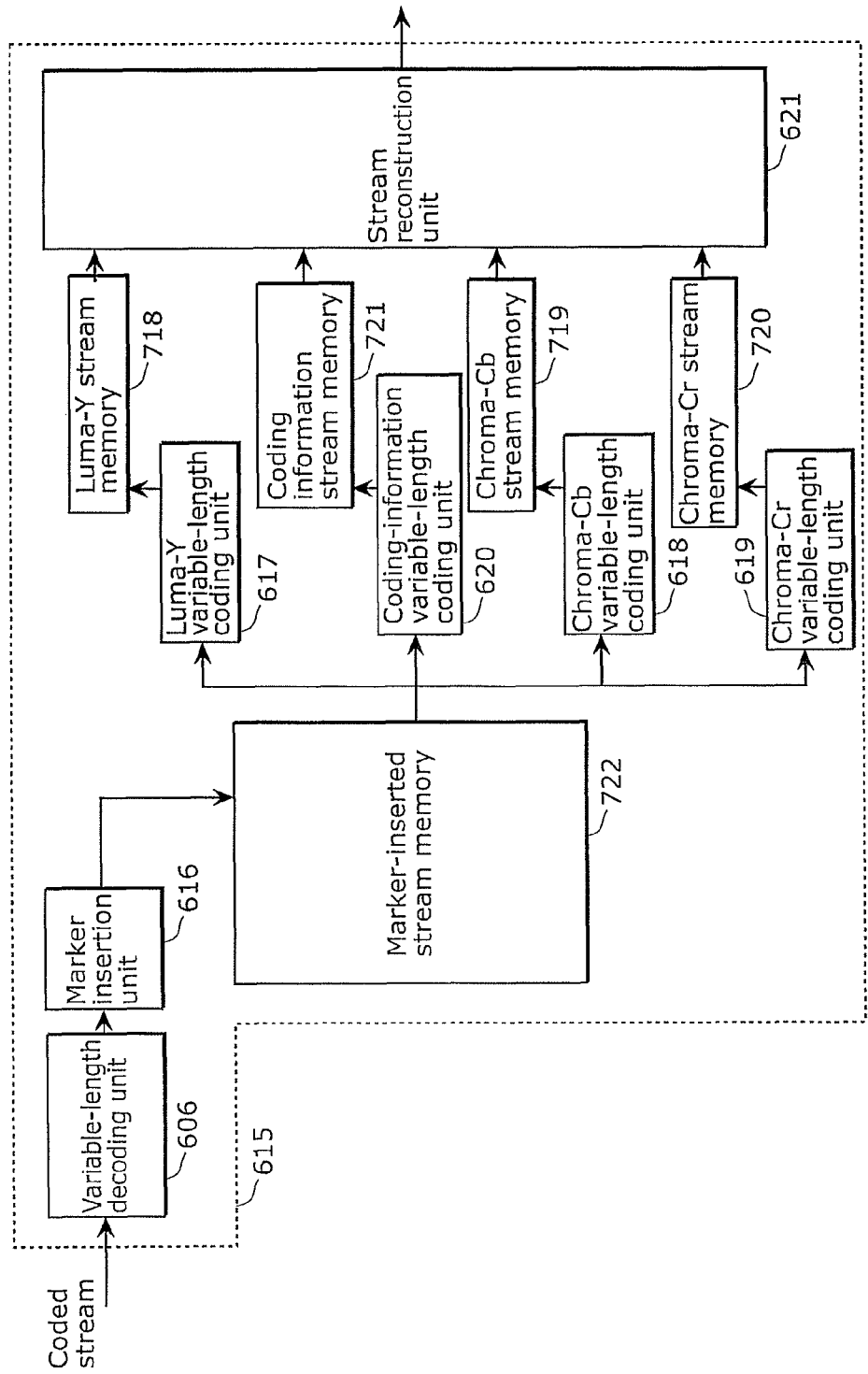
FIG. 24 is a block diagram showing a configuration of a stream transformation unit in Embodiment 4.

FIG. 24 is a block diagram showing a configuration of the stream transformation unit 615. As shown in FIG. 24, the stream transformation unit 615 includes a variable-length decoding unit 606, a marker insertion unit 616, a marker-inserted stream memory 722, a luma-Y variable-length coding unit 617, a chroma-Cb variable-length coding unit 618, a chroma-Cr variable-length coding unit 619, a coding-information variable-length coding unit 620, a luma-Y stream memory 718, a chroma-Cb stream memory 719, a chroma-Cr stream memory 720, a coding information stream memory 721, and a stream reconstruction unit 621.

4-3. Operation

Next, an operation performed by the stream transformation unit 615 is described.

The variable-length decoding unit 606 performs variable-length decoding on a received coded stream. Then, the marker insertion unit 616 identifies luma-Y coefficient information, chroma-Cb coefficient information, chroma-Cr coefficient information, and other coding information included in the variable-length decoded stream generated as a result of the variable-length decoding. The marker insertion unit 616 then inserts a marker for each of these identified information pieces.

Figure 25:
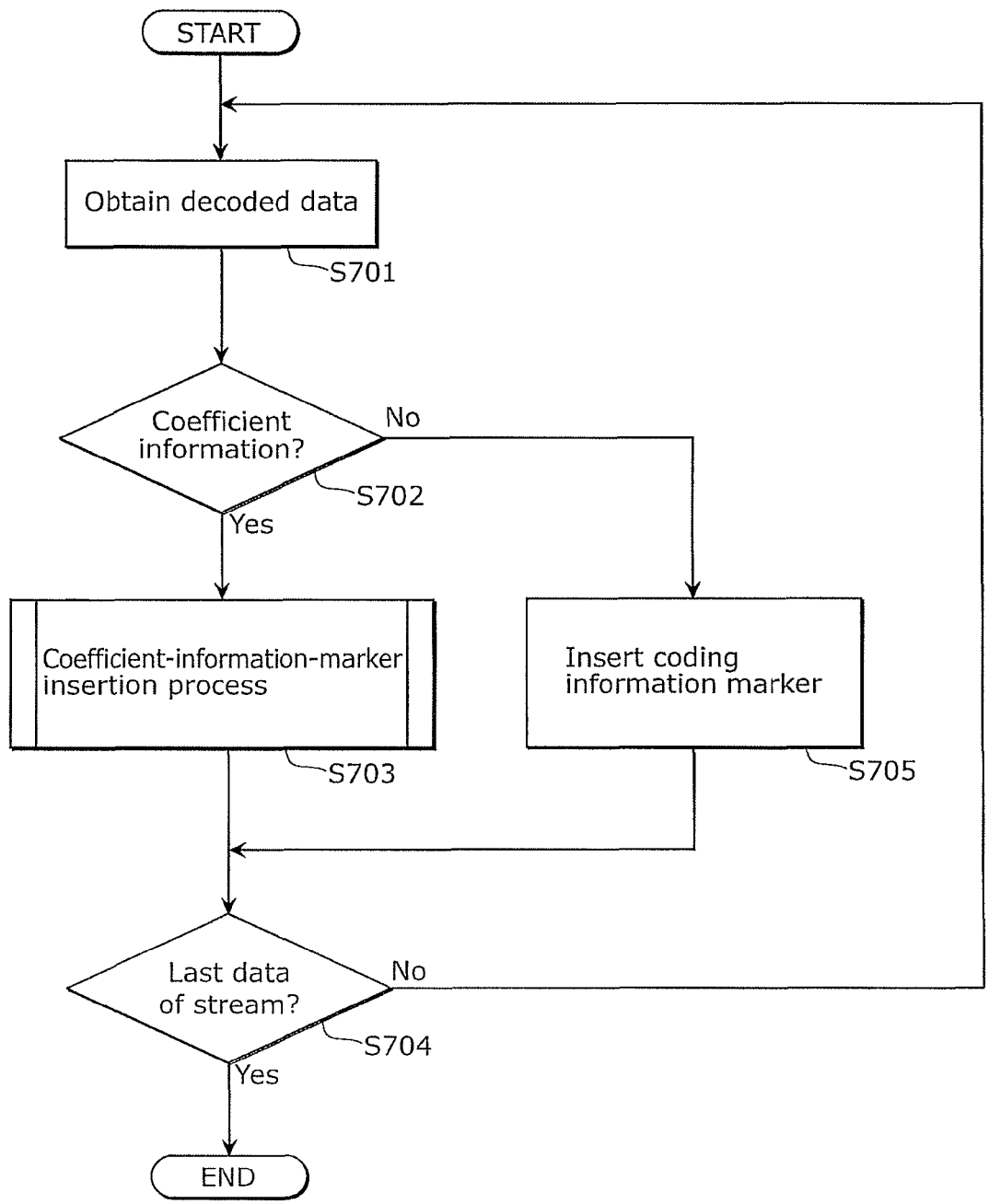
FIG. 25 is a flowchart showing an operation performed by a marker insertion unit in Embodiment 4.

FIG. 25 is a flowchart showing an operation performed by the marker insertion unit 616. The marker insertion unit 616 firstly obtains decoded data that is part of information included in the variable-length decoded stream (S701). Next, the marker insertion unit 606 determines whether or not the decoded data is coefficient information (S702). Here, when it is determined that the decoded data is not the coefficient information (No in S702), this means that the decoded data is the coding information. Therefore, the marker insertion unit 616 inserts a coding information marker immediately before this coding information in the variable-length decoded stream (S705). On the other hand, when determining that the decoded data is the coefficient information (Yes in S702), the marker insertion unit 616 performs a coefficient-information-marker insertion process described later (S703).

Moreover, after the process of S703 or S705, the marker insertion unit 616 determines whether or not the decoded data obtained in S701 is the last data of the variable-length decoded stream (S704). When determining that the decoded data is not the last data (No in S704), the marker insertion unit 616 performs the process of S701 again. To be more specific, the marker insertion unit 616 obtains a next piece of decoded data included in the variable-length decoded stream and performs the processes of S702 to S705 on the decoded data.

Figure 26:
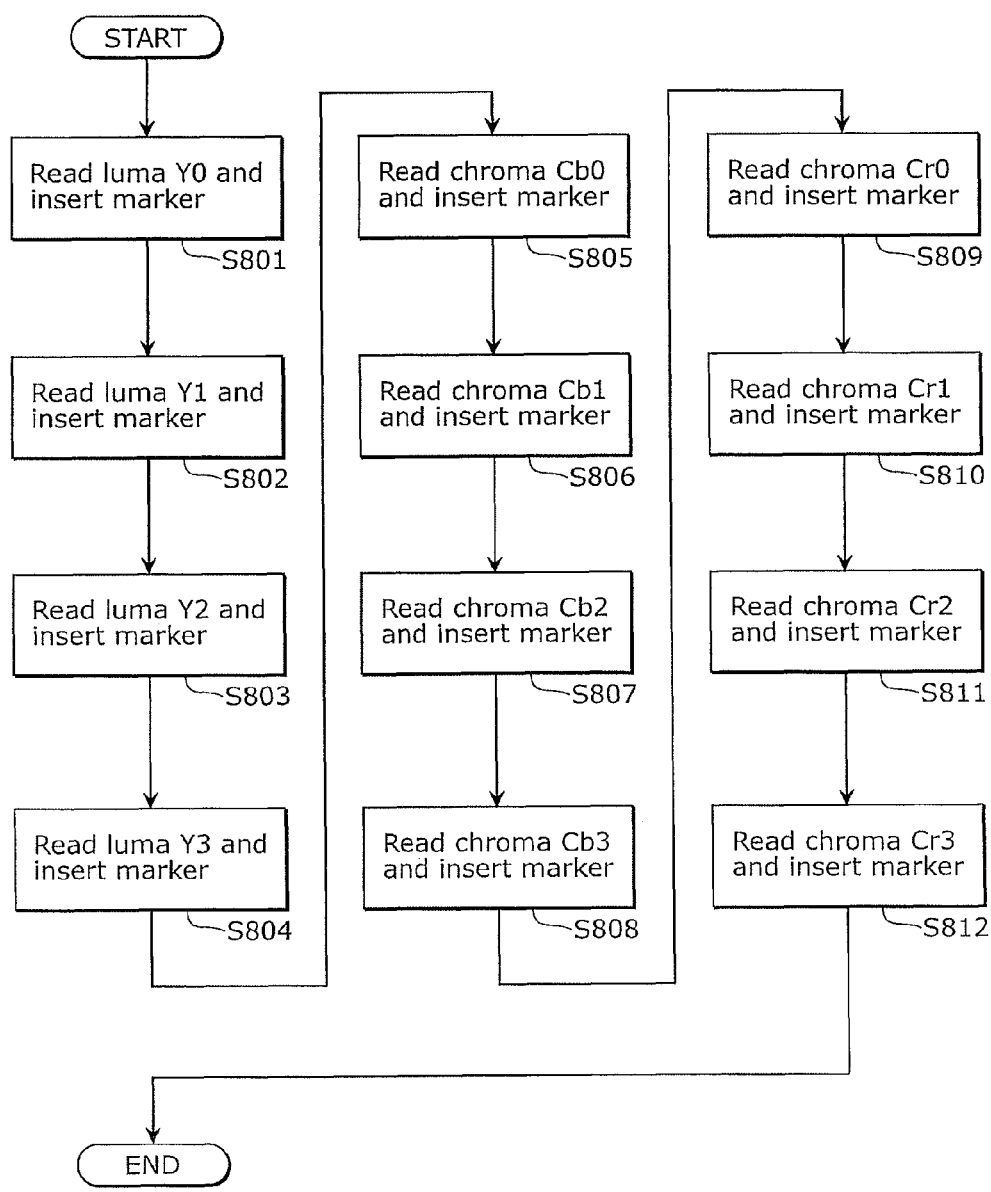
FIG. 26 is a flowchart showing a coefficient-information-marker insertion process performed by the marker insertion unit in Embodiment 4.

FIG. 26 is a flowchart showing the coefficient-information-marker insertion process (S703) performed by the marker insertion unit 616. As shown in (a) of FIG. 27, the pieces of coefficient information are arranged in the coded stream (the variable-length decoded stream) in the following order: luma Y0, luma Y1, luma Y2, luma Y3, chroma Cb0, chroma Cb1, chroma Cb1, chroma Cb3, chroma Cr0, chroma Cr1, chroma Cr2, and chroma Cr3.

The marker insertion unit 616 firstly reads the coefficient information on luma Y0 from the variable-length decoded stream, and inserts a marker indicating luma Y0 immediately before this coefficient information in the variable-length decoded stream (S801). Next, the marker insertion unit 616 reads the coefficient information on luma Y1 from the variable-length decoded stream, and inserts a marker indicating luma Y1 immediately before this coefficient information in the variable-length decoded stream (S802). Similarly, for each of the coefficient information pieces, the marker insertion unit 616 inserts a marker that can identify the corresponding coefficient information (S803 to S812).

Figure 27:
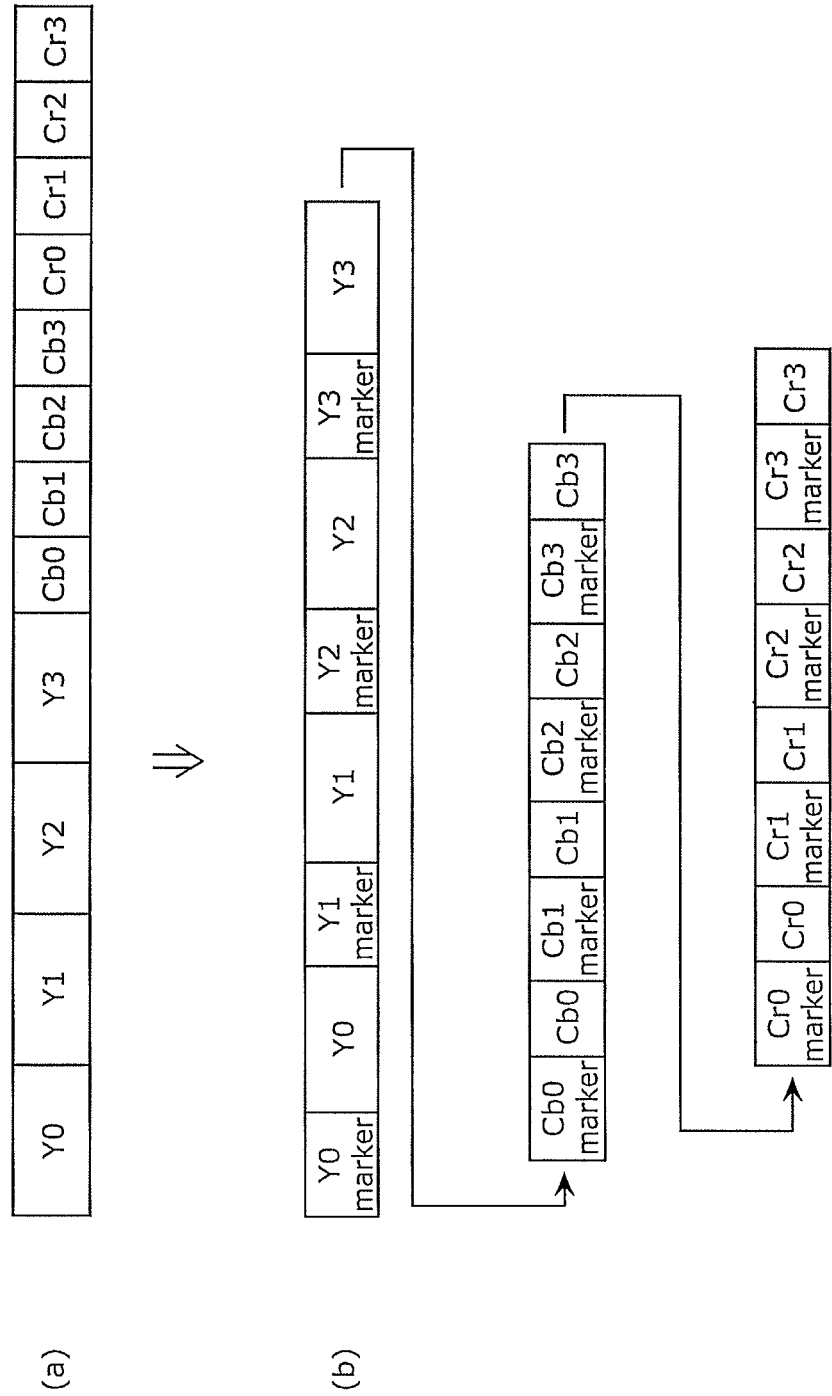
FIG. 27 is a diagram explaining marker insertion performed on a variable-length-decoded stream in Embodiment 4.

FIG. 27 is a diagram explaining marker insertion performed on the variable-length decoded stream.

The marker insertion unit 616 performs the aforementioned operation on the variable-length decoded stream shown in (a) of FIG. 27. As a result of this, the marker insertion unit 616 generates a marker-inserted stream which is a variable-length decoded stream including the markers as shown in (b) of FIG. 27. For each of the coefficient information pieces, the marker-inserted stream includes a marker identifying the coefficient information immediately before this coefficient information. Then, the marker insertion unit 616 stores the marker-inserted stream into the marker-inserted stream memory 722.

Next, the luma-Y variable-length coding unit 617 extracts the decoded data required to code luma Y from the marker-inserted stream according to the marker, and then performs variable-length coding on the extracted decoded data. By repeating such variable-length coding, the luma-Y variable-length coding unit 617 generates a luma-Y stream and outputs the luma-Y stream to the luma-Y stream memory 718.

Moreover, the chroma-Cb variable-length coding unit 618 extracts the decoded data required to code chroma Cb from the marker-inserted stream according to the marker, and then performs variable-length coding on the extracted decoded data. By repeating such variable-length coding, the chroma-Cb variable-length coding unit 618 generates a chroma-Cb stream and outputs the chroma-Cb stream to the chroma-Cb stream memory 719. Similarly, the chroma-Cr variable-length coding unit 619 extracts the decoded data required to code chroma Cr from the marker-inserted stream according to the marker, and then performs variable-length coding on the extracted decoded data. By repeating such variable-length coding, the chroma-Cr variable-length coding unit 619 generates a chroma-Cr stream and outputs the chroma-Cr stream to the chroma-Cr stream memory 720.

Furthermore, the coding-information variable-length coding unit 620 extracts the decoded data required to code the coding information from the marker-inserted stream according to the marker, and then performs variable-length coding on the extracted decoded data. By repeating such variable-length coding, the coding-information variable-length coding unit 620 generates a coding information stream and outputs the coding information stream to the coding information stream memory 721.

As is the case in Embodiment 3, each of the above-described processes for variable-length coding can be independently performed. However, note that each of the streams (the luma-Y stream, the chroma-Cb stream, the chroma-Cr stream, and the coding information stream) includes the markers in Embodiment 4.

Next, the stream reconstruction unit 621 extracts the luma-Y stream, the chroma-Cb stream, the chroma-Cr stream, and the coding information stream from the luma-Y stream memory 718, the chroma-Cb stream memory 719, the chroma-Cr stream memory 720, and the coding information stream memory 721, respectively, based on the markers. Here, the luma-Y stream includes the variable-length coded coefficient information pieces of luma Y and the respective markers. The chroma-Cb stream includes the variable-length coded coefficient information pieces of chroma Cb and the respective markers. The chroma-Cr stream includes the variable-length coded coefficient information pieces of chroma Cr and the respective markers. The coding information stream includes the variable-length coded coding information pieces and the respective markers.

To be more specific, when extracting the stream from the corresponding memory, the stream reconstruction unit 621 sequentially selects the information pieces (the coefficient information or the coding information) included in the stream according to the markers inserted corresponding to the information pieces. Then, whenever the information is extracted, the stream reconstruction unit 621 connects the extracted coefficient information or coding information to the most recently extracted coefficient information or coding information to generate a reordered coded stream. Here, the stream reconstruction unit 621 extracts the coding information to allow the position of the coding information in the reordered coded stream to be the same as the position in the original coded stream. In other words, the stream reconstruction unit 621 extracts the coding information in the order of the original coded stream. Moreover, the stream reconstruction unit 621 extracts the coefficient information pieces included in each of the aforementioned streams according to the flow shown in FIG. 11. By employing this extraction method, the above-described reordered coded stream is generated. In Embodiment 4, the markers are deleted here.

In Embodiment 3 described thus far, a first processing unit is, for example, the variable-length decoding unit 606. Moreover, a reordering unit includes, for example, the structural elements of the stream transformation unit 615 except the variable-length decoding unit 606. To be more specific, the reordering unit includes, for example, the marker insertion unit 616, the variable-length coding units 617 to 620, the memories 718 to 722, and the stream reconstruction unit 621. A second processing unit is, for example, the image decoding apparatus 513a.

More specifically, the first processing unit performs variable-length decoding as a first process and sequentially outputs one or more color components as components included in a first unit of processing. The reordering unit includes the marker insertion unit 616, the variable-length coding unit, and the stream reconstruction unit 621. The marker insertion unit 616 adds, for each of the color components outputted from the first processing unit, a marker identifying the type of the color component. The variable-length coding unit includes, for example, the aforementioned variable-length coding units 617 to 620. The variable-length coding unit: identifies, based on the marker added by the marker insertion unit 616, each of the color component types of the color components outputted from the first processing unit; performs, for each of the color component types, variable-length coding on the color components belonging to the type; and stores a stream generated as a result of the variable-length coding into a storage unit. The storage unit is, for example, the aforementioned memories 718 to 721. The stream reconstruction unit 621 generates the reordered coded stream in which the color components are reordered, by sequentially reading, in the order different from the order in which the color components are outputted from the first processing unit, the color components from the stream generated and stored in the storage unit for each of the color component types. Here, the aforementioned variable-length coding unit performs the variable-length coding processes for the different color component types in parallel.

4-4. Advantageous Effect

As with Embodiment 3, Embodiment 4 reorders the coefficient information pieces included in the coded stream that has yet to be received by the image decoding apparatus 513a, and generates the reordered coded stream by variable-length coding according to the coding method whereby decoding is easier than in the case of the original coding method. With this, the performance of the image decoding apparatus 513a can be increased and, at the same time, each of the capacities of the memories of the image decoding apparatus 513a can be reduced. Moreover, in Embodiment 4, since the variable-length coding processes are performed in parallel, the processing time taken to generate the reordered coded stream can be reduced.

Moreover, in Embodiment 4, the markers identifying the luma-Y information, the chroma-Cb information, the chroma-Cr information, and the coding information are inserted. Thus, these information pieces can be stored as a series of data into a memory. This also allows memory resources to be shared. With this, as compared with the case where the luma-Y information, the chroma-Cb information, the chroma-Cr information, and the coding information are separately stored into the memories, the management and control of the memories can be simplified and the performance of the parallel processing for variable-length coding can be increased. Accordingly, the processing time taken to generate the reordered coded stream can be reduced. Moreover, the performance of the image processing apparatus can be increased, and each of the capacities of the memories of the image processing apparatus can be reduced.

[Proviso]

Embodiment 4 has described the case where the variable-length coding method is used. However, any other coding method may be used, such as Huffman coding, run-length coding, arithmetic coding, or fixed-length coding.

Moreover, each of the configurations of the processing units may be implemented, in whole or part, by a circuit configured with dedicated hardware, or may be implemented by a program on a processor.

Furthermore, each of the frame memory 503, the luma-Y stream memory 718, the chroma-Cb stream memory 719, the chroma-Cr stream memory 720, the coding information memory 721, and the marker-inserted stream memory 722 is described as a memory. However, each of these memories may be configured with a different storage element such as a flip-flop, as long as the storage element can store data. Alternatively, each of these memories may be configured to use a part of a memory area of a processor or a part of a cache memory.

Moreover, the size of the unit of processing (the second unit of processing) including luma Y, chroma Cb, and chroma Cr used by the stream transformation unit 615 is not limited to the size of 32×32 pixels (a total of 1536 pixels of luma Y, chroma Cb, and chroma Cr), and may be smaller or larger than this size. For example, the size may be 16×16 pixels (a total of 384 pixels of luma Y, chroma Cb, and chroma Cr). To be more specific, suppose that the unit of processing including luma Y, chroma Cb, and chroma Cr of the coded stream before reordering (the first unit of processing or the CU) is 32×32 pixels including luma Y (32×32 pixels), chroma Cb (16×16 pixels), and chroma Cr (16×16 pixels). In this case, the stream transformation unit 615 may change the order of the coefficient information pieces of the coded stream into the order based on a unit of 16×16 pixels.

Furthermore, the operation performed by the marker insertion unit 616 is not limited to the processes shown in FIG. 25 and FIG. 26.

Moreover, the coding information may be divided into: information required to code at least one of luma Y, chroma Cb, and chroma Cr; and information required to perform decoding in and after inverse quantization. After this division, the markers may be inserted.

Furthermore, each of the aforementioned markers may be any kind of value as long as the information can be identified by the marker. For example, the marker may be a number sequence that is not used in the standard or a value indicating a bit width of the corresponding information.

Moreover, in Embodiment 4, instead of performing the three variable-length coding processes (i.e., the variable-length coding process for luma Y, the variable-length coding process for chroma Cb, and the variable-length coding process for chroma Cr) in parallel, the two variable-length coding processes (the variable-length coding process for luma Y and the variable-length coding process for chroma Cb and chroma Cr) may be performed in parallel. In this case, the marker insertion unit 616 may insert the same marker for each of the pieces of coefficient information (the decoded data) on chroma Cb and chroma Cr, among the decoded data pieces.

Embodiment 5

5-1. Overview

Next, an overview of an image processing apparatus in Embodiment 5 is described. In the image processing apparatus in Embodiment 4, the variable-length coding units operate in parallel according to the markers inserted by the marker insertion unit 616. Then, the stream reconstruction unit 621 deletes the markers, and the image decoding apparatus 513*a* serially performs decoding on the reordered coded stream including no markers. In Embodiment 5, on the other hand, a stream reconstruction unit does not delete markers, and an image decoding apparatus performs decoding in parallel on a reordered coded stream including the markers.

5-2. Configuration

Next, a configuration of the image processing apparatus in Embodiment 5 is described.

Figure 28:
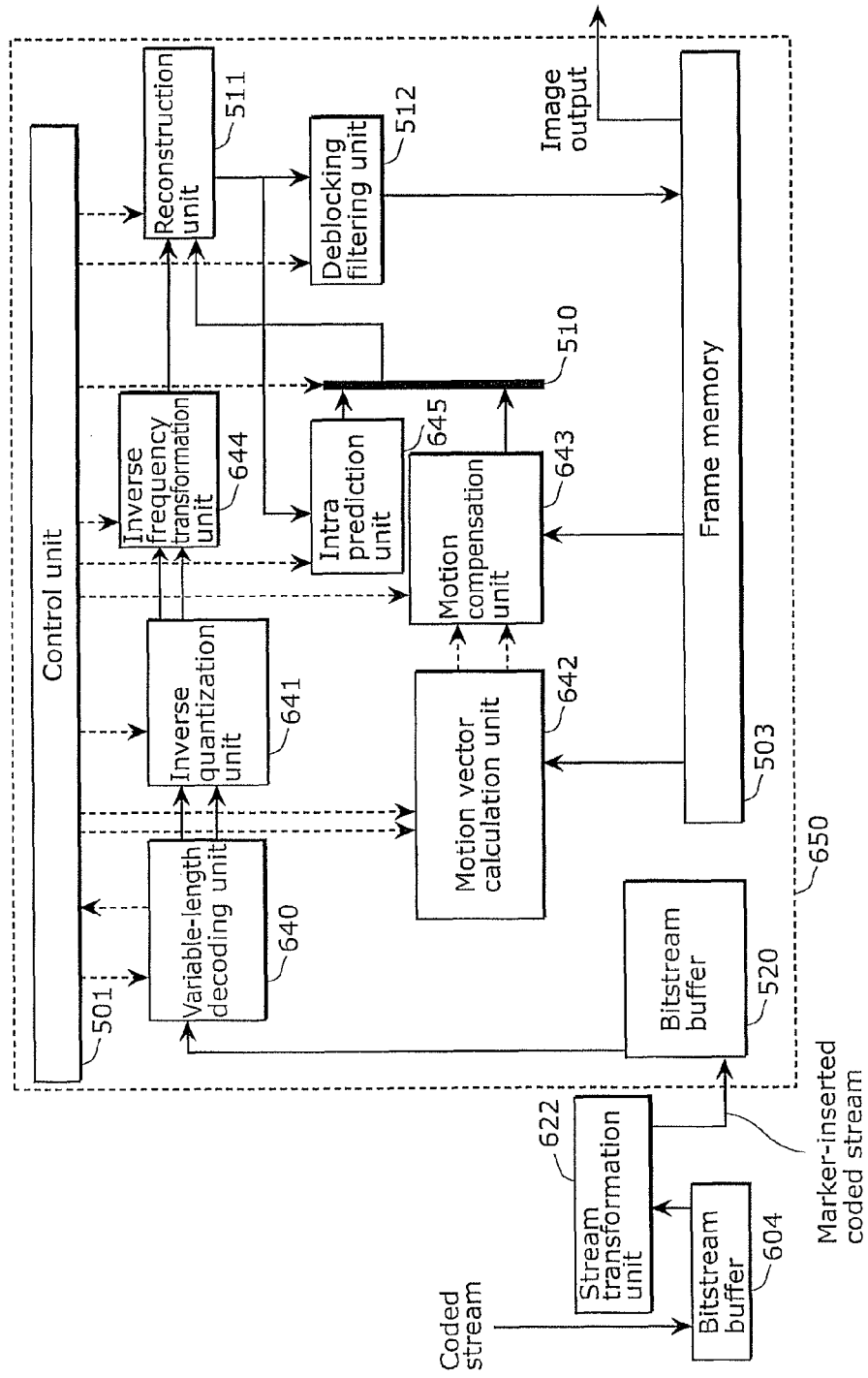
FIG. 28 is a block diagram showing a configuration of an image processing apparatus in Embodiment 5.

FIG. 28 is a block diagram showing a configuration of the image processing apparatus in Embodiment 5. The image processing apparatus in Embodiment 5 includes a bitstream buffer 604, a stream transformation unit 622, and an image decoding apparatus 650. The stream transformation unit 622 inserts markers identifying luma-Y information, chroma-Cb information, chroma-Cr information, and coding information, into a received coded stream. It should be noted that structural elements of Embodiment 5 identical to those of Embodiments 1 to 4 are assigned the same reference signs as used in Embodiments 1 to 4 and that the detailed explanations of these structural elements are omitted here.

Figure 29:
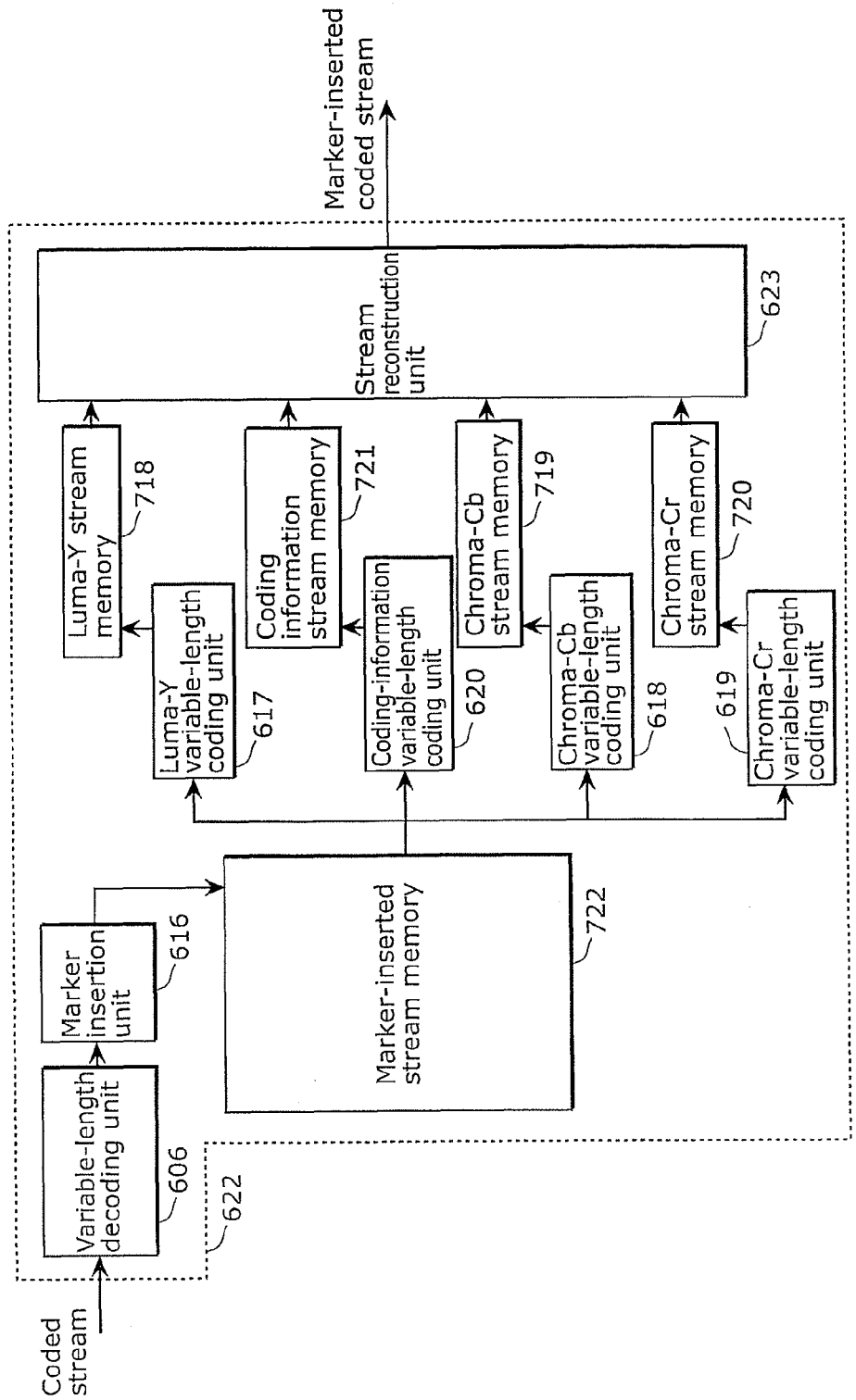
FIG. 29 is a block diagram showing a configuration of a stream transformation unit in Embodiment 5.

FIG. 29 is a block diagram showing a configuration of the stream transformation unit 622 in Embodiment 5. As shown in FIG. 29, the stream transformation unit 622 includes a variable-length decoding unit 606, a marker insertion unit 616, a marker-inserted stream memory 722, a luma-Y variable-length coding unit 617, a chroma-Cb variable-length coding unit 618, a chroma-Cr variable-length coding unit 619, a coding-information variable-length coding unit 620, a luma-Y stream memory 718, a chroma-Cb stream memory 719, a chroma-Cr stream memory 720, a coding information stream memory 721, and a stream reconstruction unit 623.

To be more specific, the stream transformation unit 622 in Embodiment 5 includes all the structural elements included in the stream transformation unit 615 in Embodiment 4 except the stream reconstruction unit 621. The stream transformation unit 622 in Embodiment 5 includes a different stream reconstruction unit 623 in place of the stream reconstruction unit 621. As with the stream reconstruction unit 621, the stream reconstruction unit 623 extracts information (coefficient information or coding information) from the memories 718 to 721. Here, the stream reconstruction unit 623 extracts not only the information, but a marker corresponding to the information as well. The stream reconstruction unit 623 generates a marker-inserted coded stream including markers and information pieces as shown in (b) of FIG. 27.

The image decoding apparatus 650 includes a bitstream buffer 520, a variable-length decoding unit 640, an inverse quantization unit 641, a motion vector calculation unit 642, a motion compensation unit 643, an inverse frequency transformation unit 644, an intra prediction unit 645, a control unit 501, a frame memory 503, a reconstruction unit 511, and a deblocking filtering unit 512.

The bitstream buffer 520 holds the marker-inserted coded stream outputted from the stream transformation unit 622. The variable-length decoding unit 640 reads the marker-inserted coded stream from the bitstream buffer 520, and performs variable-length decoding, in parallel, on the luma-Y information included in the marker-inserted coded stream and on the chroma-Cb and chroma-Cr information included in the marker-inserted coded stream. The inverse quantization unit 641 performs inverse quantization, in parallel: on the result (the quantized value) obtained by the variable-length decoding performed on the luma-Y information; and on the result of the variable-length decoding performed on the chroma-Cb and chroma-Cr information. The inverse frequency transformation unit 644 performs inverse frequency transform, in parallel: on the result (the frequency coefficient) obtained by the inverse quantization performed on the luma-Y information; and on the result of the inverse quantization performed on the chroma-Cb and chroma-Cr information.

The motion vector calculation unit 642 performs motion vector calculation, in parallel, on the luma-Y information included in the marker-inserted coded stream and on the chroma-Cb and chroma-Cr information included in the marker-inserted coded stream. The motion compensation unit 643 performs motion compensation, in parallel, on the luma-Y information and on the chroma-Cb and chroma-Cr information. The intra prediction unit 645 serially performs intra prediction on the luma-Y information and on the chroma-Cb and chroma-Cr information.

More specifically, the image decoding apparatus 650 in Embodiment 5 is different from the image decoding apparatuses 513*a* in Embodiments 2 to 4 in that each of the variable-length decoding unit 640, the inverse quantization unit 641, the inverse frequency transformation unit 644, the motion vector calculation unit 642, and the motion compensation unit 643 performs the corresponding processing on the luma-Y information and on the chroma-Cb and chroma-Cr information in parallel.

Figure 30:
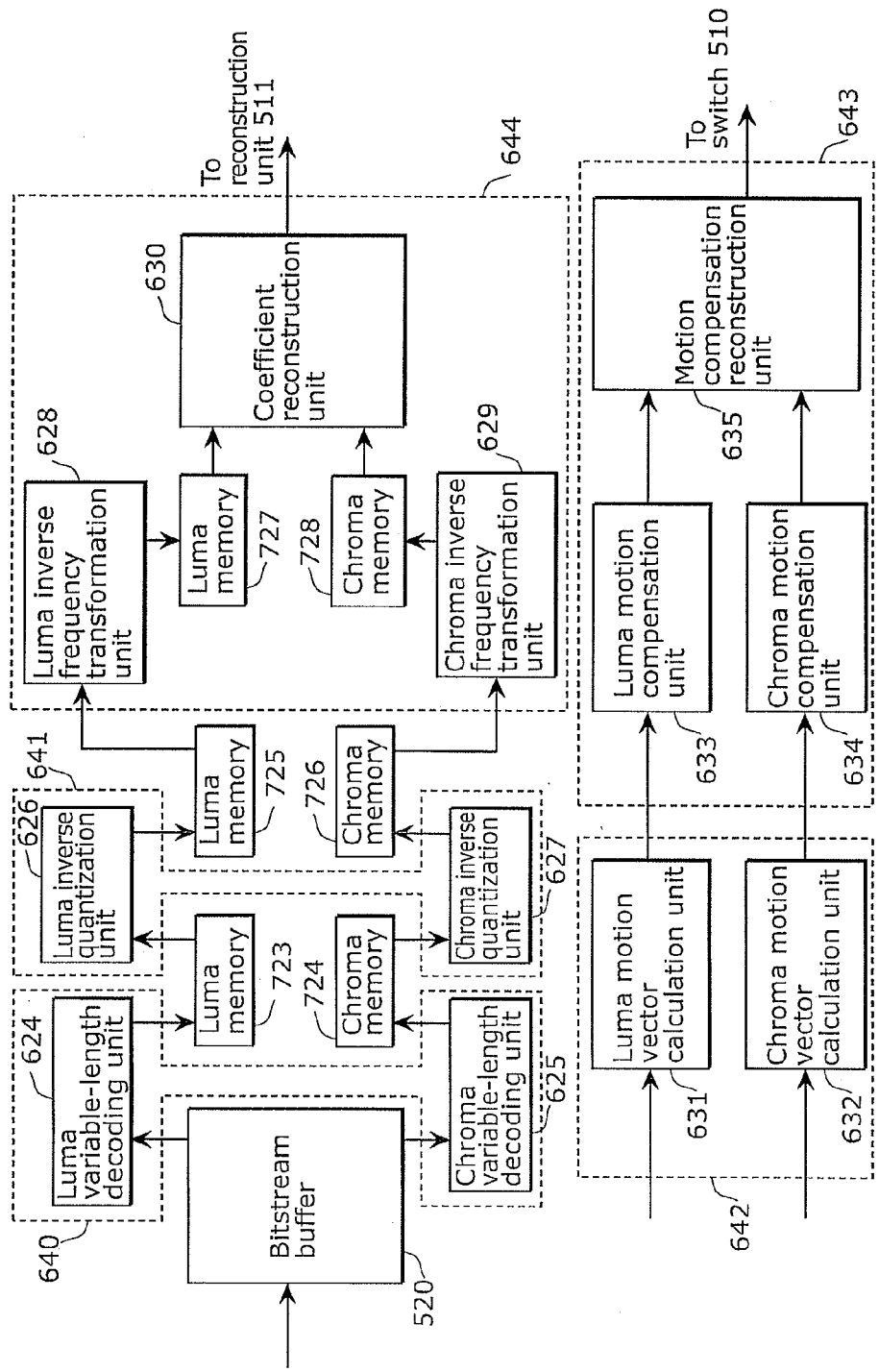
FIG. 30 is a block diagram showing configurations of a variable-length decoding unit, an inverse quantization unit, an inverse frequency transformation unit, a motion vector calculation unit, and a motion compensation unit in Embodiment 5.

FIG. 30 is a diagram showing configurations of the variable-length decoding unit 640, the inverse quantization unit 641, the inverse frequency transformation unit 644, the motion vector calculation unit 642, and the motion compensation unit 643 included in the image decoding apparatus 650. The variable-length decoding unit 640 includes a luma variable-length decoding unit 624 and a chroma variable-length decoding unit 625. The inverse quantization unit 641 includes a luma inverse quantization unit 626 and a chroma inverse quantization unit 627. The inverse frequency transformation unit 644 includes a luma inverse frequency transformation unit 628, a chroma inverse frequency transformation unit 629, a luma memory 727, a chroma memory 728, and a coefficient reconstruction unit 630. The motion vector calculation unit 642 includes a luma motion vector calculation unit 631 and a chroma motion vector calculation unit 632. The motion compensation unit 643 includes a luma motion compensation unit 633, a chroma motion compensation unit 634, and a motion compensation reconstruction unit 635.

Figure 31:
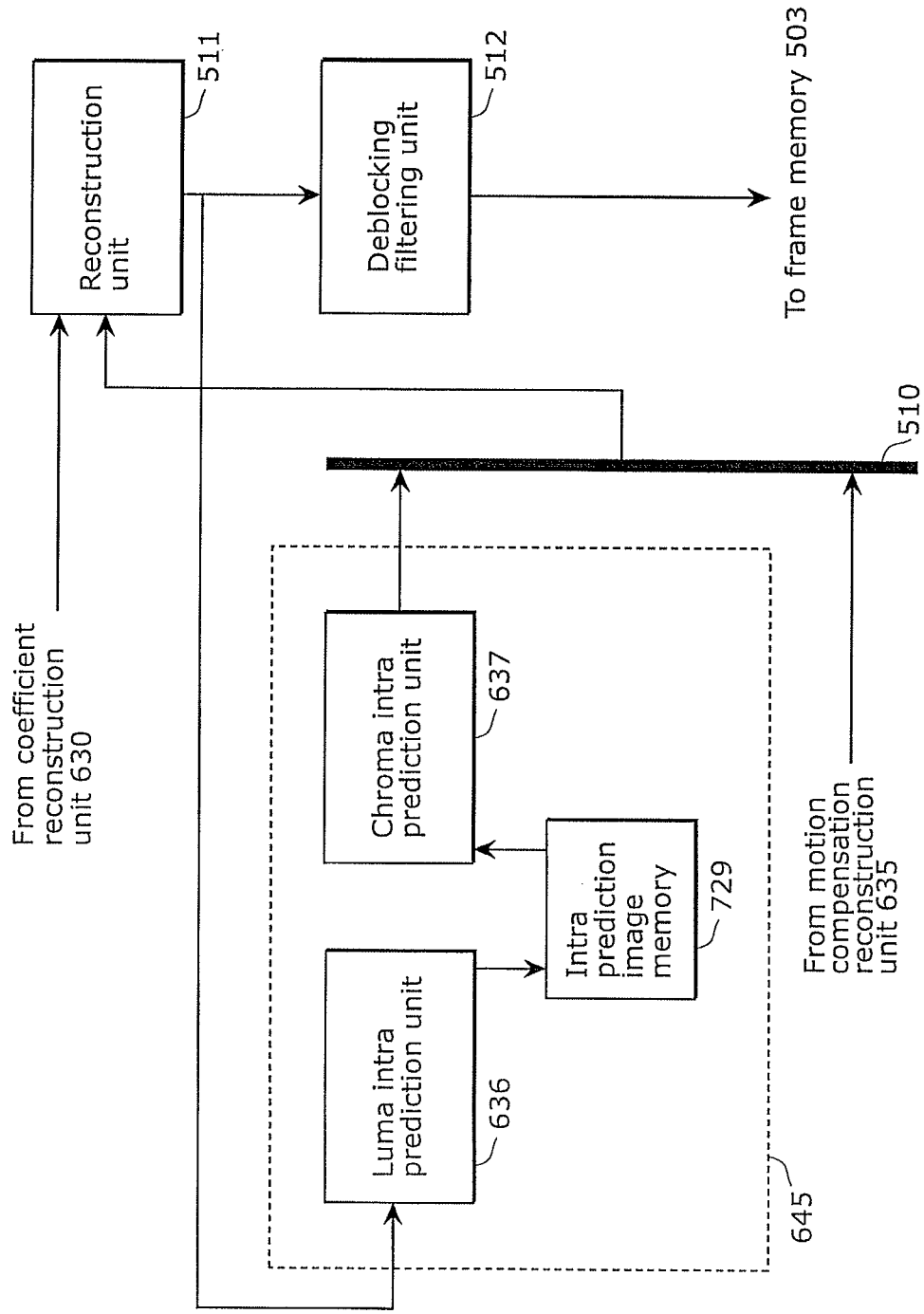
FIG. 31 is a block diagram showing a configuration of an intra prediction unit in an image decoding apparatus in Embodiment 5.

FIG. 31 is a diagram showing a configuration of the intra prediction unit 645 included in the image decoding apparatus 650. As shown in FIG. 31, the intra prediction unit 645 includes a luma intra prediction unit 636, an intra prediction image memory 729, and a chroma intra prediction unit 637.

It should be noted that the processing units are connected via memories. To be more specific, the variable-length decoding unit 640 and the inverse quantization unit 641 are connected via a luma memory 723 and a chroma memory 724. Moreover, the inverse quantization unit 641 and the inverse frequency transformation unit 644 are connected via a luma memory 725 and a chroma memory 726. Note that the memories 723 to 726 are included in the image decoding apparatus 650.

5-3. Operation

Next, an operation performed by the image processing apparatus shown in FIG. 28 is described. As shown in (a) of FIG. 27, the pieces of coefficient information are arranged in the coded stream (the variable-length decoded stream) in the following order: luma Y0, luma Y1, luma Y2, luma Y3, chroma Cb0, chroma Cb1, chroma Cb1, chroma Cb3, chroma Cr0, chroma Cr1, chroma Cr2, and chroma Cr3.

An operation performed by the stream transformation unit 622 is firstly described with reference to FIG. 29. As is the case in Embodiment 4, the marker insertion unit 616 of the stream transformation unit 622 identifies luma-Y coefficient information, chroma-Cb coefficient information, chroma-Cr coefficient information, and other coding information, and then inserts a marker for each of these information pieces. Moreover, each of the variable-length coding units 617 to 620 performs variable-length coding on the aforementioned respective information pieces in parallel. As a result, each of the streams generated by the variable-length coding performed on the corresponding information pieces is outputted to the corresponding one of the luma-Y stream memory 718, the chroma-Cb stream memory 719, the chroma-Cr stream memory 720, and the coding information stream memory 721.

Next, the stream reconstruction unit 623 extracts the luma-Y stream, the chroma-Cb stream, the chroma-Cr stream, and the coding information stream from the luma-Y stream memory 718, the chroma-Cb stream memory 719, the chroma-Cr stream memory 720, and the coding information stream memory 721, respectively, based on the markers. To be more specific, when extracting the stream from the corresponding memory, the stream reconstruction unit 623 sequentially selects the information pieces (the coefficient information or the coding information) included in the stream according to the markers inserted corresponding to the information pieces. Then, whenever the information is extracted, the stream reconstruction unit 621 connects the extracted coefficient information or coding information to the most recently extracted coefficient information or coding information to generate a marker-inserted coded stream. Here, the stream reconstruction unit 623 extracts the coding information to allow the position of the coding information in the marker-inserted coded stream to be the same as the position in the original coded stream. In other words, the stream reconstruction unit 623 extracts the coding information in the order of the original coded stream. Moreover, the stream reconstruction unit 623 extracts the coefficient information pieces included in each of the aforementioned streams according to the flow shown in FIG. 11. By employing this extraction method, the above-described marker-inserted coded stream is generated.

However, when extracting the information (the coefficient information or the coding information), the stream reconstruction unit 623 in Embodiment 5 also extracts the marker inserted corresponding to the information. More specifically, although no marker is included in the stream outputted from the stream reconstruction unit in Embodiment 4, the marker is present in Embodiment 5.

Thus, the markers and the coefficient information pieces are arranged in the marker-inserted coded stream in the following order: luma-Y0 marker, luma Y0, chroma-Cb0 marker, chroma-Cb0, chroma-Cr0 marker, chroma Cr0, luma-Y1 marker, luma Y1, chroma-Cb1 marker, chroma-Cb1, chroma-Cr1 marker, chroma Cr1, luma-Y2 marker, luma Y2, chroma-Cb2 marker, chroma-Cb2, chroma-Cr2 marker, chroma Cr2, luma-Y3 marker, luma Y3, chroma-Cb3 marker, chroma-Cb3, chroma-Cr3 marker, and chroma Cr3. Then, this marker-inserted coded stream is outputted to the bitstream buffer 520.

Next, an operation performed by the image decoding apparatus 650 is described. Operations performed by the variable-length decoding unit 640, the inverse quantization unit 641, the inverse frequency transformation unit 644, the motion vector calculation unit 642, and the motion compensation unit 643 are described with reference to FIG. 30. Each of the variable-length decoding unit 640, the inverse quantization unit 641, and the inverse frequency transformation unit 644 includes a processing unit for each of luma and chroma. The luma processing units perform variable-length decoding, inverse quantization, and inverse frequency transform described in Embodiment 1 on the luma information. The chroma processing units perform variable-length decoding, inverse quantization, and inverse frequency transform described in Embodiment 1 on the chroma information. Here, the luma processing unit and the chroma processing unit perform the processing in parallel.

To be more specific, the luma variable-length decoding unit 624 of the variable-length decoding unit 640 performs variable-length coding on the luma coefficient information included in the marker-inserted coded stream, and stores the variable-length coded coefficient information (the quantized luma value) into the luma memory 723. In parallel with the process performed by the luma variable-length decoding unit 624, the chroma variable-length decoding unit 625 performs variable-length coding on the chroma coefficient information included in the marker-inserted coded stream, and stores the variable-length coded coefficient information (the quantized chroma value) into the chroma memory 724.

The luma inverse quantization unit 626 of the inverse quantization unit 641 obtains, from the luma memory 723, the luma coefficient information which is the quantized luma value. Then, the luma inverse quantization unit 626 performs inverse quantization on the obtained luma coefficient information, and stores the inverse-quantized coefficient information (the luma frequency coefficient) into the luma memory 725. In parallel with the process performed by the luma inverse quantization unit 626, the chroma inverse quantization unit 627 obtains, from the chroma memory 724, the chroma coefficient information which is the quantized chroma value. Then, the chroma inverse quantization unit 627 performs inverse quantization on the obtained chroma coefficient information, and stores the inverse-quantized coefficient information (the chroma frequency coefficient) into the chroma memory 726.

The luma inverse frequency transformation unit 628 of the inverse frequency transformation unit 644 obtains, from the luma memory 725, the luma coefficient information which is the luma frequency coefficient. Then, the luma inverse frequency transformation unit 628 performs inverse frequency transform on the obtained luma coefficient information, and stores the inverse frequency-transformed coefficient information (the chroma pixel value) into the chroma memory 728.

Figure 11:
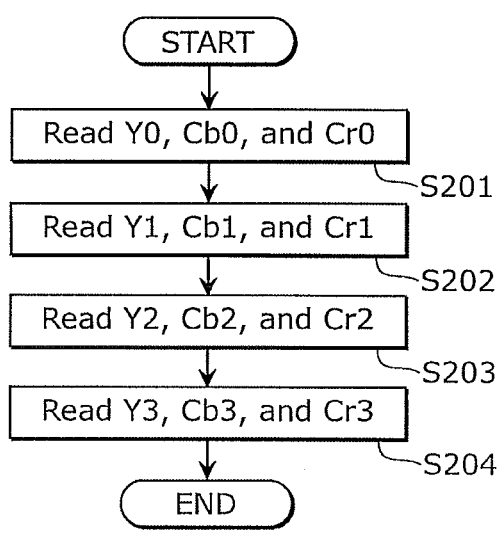
FIG. 11 is a flowchart showing an operation performed by a reordering unit in Embodiment 1.

Next, the coefficient reconstruction unit 630 extracts the luma and chroma coefficient information pieces which are the luma and chroma pixel values from the luma memory 727 and the chroma memory 728, according to the flow shown in FIG. 11. When doing so, the coefficient reconstruction unit 630 deletes the markers inserted by the stream transformation unit 622. Then, each subsequent process is performed in a unit shown in (b) of FIG. 10

The luma motion vector calculation unit 631 of the motion vector calculation unit 642 calculates a motion vector corresponding to the luma coefficient information as in Embodiment 1. In parallel with the process performed by the luma motion vector calculation unit 631, the chroma motion vector calculation unit 632 calculates a motion vector corresponding to the chroma coefficient information as in Embodiment 1.

The luma motion compensation unit 633 of the motion compensation unit 643 performs motion compensation on the luma coefficient information as in Embodiment 1. In parallel with the process performed by the luma motion compensation unit 633, the chroma motion compensation unit 634 performs motion compensation on the chroma coefficient information as in Embodiment 1. The motion compensation reconstruction unit 635 reorders the information pieces (the pieces of motion compensation information) generated by the luma motion compensation unit 633 and the chroma motion compensation unit 634 into the order corresponding to the order of the coefficient information pieces shown in (b) of FIG. 10.

Next, an operation performed by the intra prediction unit 645 is described with reference to FIG. 31. The luma intra prediction unit 636 performs intra prediction on a luma image using the decoded image outputted from the reconstruction unit 511 and a parameter necessary for intra prediction. Then, the luma intra prediction unit 636 outputs the resulting intra prediction image to the intra prediction image memory 729. Following this, the chroma intra prediction unit 637 performs intra prediction on a chroma image, with reference to the luma intra prediction image stored in the intra prediction image memory 729.

In Embodiment 5 described thus far, a first processing unit is, for example, the variable-length decoding unit 606. Moreover, a reordering unit includes, for example, the structural elements of the stream transformation unit 622 except the variable-length decoding unit 606. To be more specific, the reordering unit includes, for example, the marker insertion unit 616, the variable-length coding units 617 to 620, the memories 718 to 722, and the stream reconstruction unit 623. A second processing unit is, for example, the image decoding apparatus 650.

More specifically, the stream reconstruction unit 623 generates the reordered coded stream including the marker for each of the color components, by sequentially reading the color components together with the markers added to the color components. Then, the image decoding apparatus 636 serving as the second processing unit includes the variable-length decoding unit 640, the inverse quantization unit 641, the inverse frequency transformation unit, and a component reconstruction unit. The variable-length decoding unit 640 performs, for each of the color component types, variable-length decoding on the color components belonging to the type, based on the markers included in the reordered coded stream. The inverse quantization unit 641 performs, for each of the color component types, inverse quantization on the variable-length decoded color components belonging to the type. The inverse frequency transformation unit includes, for example, the luma inverse frequency transformation unit 628 and the chroma inverse frequency transformation unit 629. The inverse frequency transformation unit generates, for each of the color component types, color component data including markers, by performing inverse frequency transform on the inverse-quantized color components belonging to the type. The component reconstruction unit is, for example, the coefficient reconstruction unit 630. The component reconstruction unit identifies the color component data generated for each of the color component types, based on the markers included in the color component data. Then, the component reconstruction unit performs reconstruction to allow the inverse-frequency-transformed color components to be arranged in the order obtained as a result of the reordering by the reordering unit. Here, each of the variable-length decoding unit 640, the inverse quantization unit 641, and the inverse frequency transformation units 628 and 629 described above performs the corresponding process for the different color components types in parallel.

5-4. Advantageous Effect

As in Embodiment 4, the stream transformation unit in Embodiment 5 performs the processes for variable-length coding in parallel, according to the markers identifying the coding information, the luma-Y coefficient information, the chroma-Cb coefficient information, and the chroma-Cr coefficient information. Thus, the capacities of the memories can be reduced, and the performance of the stream transformation unit and the image processing apparatus can be increased as well. Moreover, in Embodiment 5, each of the processes for variable-length decoding, inverse quantization, inverse frequency transform, motion vector calculation, and motion compensation is performed in parallel for the luma information and the chroma information by the image decoding apparatus 650. Therefore, the processing efficiency and the performance can be increased. Furthermore, the luma coefficient information and the chroma coefficient information are synchronized before reaching the reconstruction unit 511. With this, the intra prediction where dependence is present between the processes for luma and chroma can be appropriately performed.

[Proviso]

Embodiment 5 has described the case where the variable-length coding method is used. However, any other coding method may be used, such as Huffman coding, run-length coding, arithmetic coding, or fixed-length coding.

Moreover, each of the frame memory 503, the luma-Y stream memory 718, the chroma-Cb stream memory 719, the chroma-Cr stream memory 720, the coding information memory 721, the marker-inserted stream memory 722, the luma memory 723, the chroma memory 724, the luma memory 725, the chroma memory 726, the luma memory 727, the chroma memory 728, and the intra prediction image memory 729 is described as a memory. However, each of these memories may be configured with a different storage element such as a flip-flop, as long as the storage element can store data. Alternatively, each of these memories may be configured to use a part of a memory area of a processor or a part of a cache memory.

Moreover, the size of the unit of processing (the second unit of processing) including luma Y, chroma Cb, and chroma Cr used by the stream transformation unit 622 is not limited to the size of 32×32 pixels (a total of 1536 pixels of luma Y, chroma Cb, and chroma Cr), and may be smaller or larger than this size. For example, the size may be 16×16 pixels (a total of 384 pixels of luma Y, chroma Cb, and chroma Cr). To be more specific, suppose that the unit of processing including luma Y, chroma Cb, and chroma Cr of the coded stream before reordering (the first unit of processing or the CU) is 32×32 pixels including luma Y (32×32 pixels), chroma Cb (16×16 pixels), and chroma Cr (16×16 pixels). In this case, the stream transformation unit 622 may change the order of the coefficient information pieces of the coded stream into the order based on a unit of 16×16 pixels.

Moreover, the coding information may be divided into: information required to code at least one of luma Y, chroma Cb, and chroma Cr; and information required to perform decoding in and after inverse quantization. After this division, the markers may be inserted.

Furthermore, each of the aforementioned markers may be any kind of value as long as the information can be identified by the marker. For example, the marker may be a number sequence that is not used in the standard or a value indicating a bit width of the corresponding information.

Moreover, the process for luma and the process for chroma are performed separately in parallel. However, the granularity is not limited to this. For example, the processes for luma Y, chroma Cb, and chroma Cr may be performed separately in parallel. Alternatively, the processes for luma Y0, luma Y1, luma Y2, luma Y3, chroma Cb0, chroma Cb1, chroma Cb1, chroma Cb3, chroma Cr0, chroma Cr1, chroma Cr2, and chroma Cr3 may be performed separately in parallel.

Moreover, in Embodiment 5, instead of performing the three variable-length coding processes (i.e., the variable-length coding process for luma Y, the variable-length coding process for chroma Cb, and the variable-length coding process for chroma Cr) in parallel, the two variable-length coding processes (the variable-length coding process for luma Y and the variable-length coding process for chroma Cb and chroma Cr) may be performed in parallel. In this case, the marker insertion unit 616 may insert the same marker for each of the pieces of coefficient information (the decoded data) on chroma Cb and chroma Cr, among the decoded data pieces.

In Embodiments 2 to 5, the apparatus including the image decoding apparatus, the stream transformation unit, and the bitstream buffer is referred to as the image processing apparatus. However, this image processing apparatus may be referred to as the image decoding apparatus.

Moreover, in Embodiments 1 to 5, the coefficient information reordering as described above is performed on the coded stream where four consecutive luma Y components each having the size of 32 by 32 pixels, four consecutive chroma Cb components each having the size of 16 by 16 pixels, and four consecutive chroma Cr components each having the size of 16 by 16 pixels are sequentially arranged in the CU having the size of 64×64 pixels as shown in FIG. 1A or (a) of FIG. 10. However, the structure of the coded stream on which reordering is to be performed is not limited to this. For example, the aforementioned coefficient information reordering may be performed on the coded stream where four units of processing (four TUs) each including luma Y having the size of 32×32 pixels, chroma Cb having the size of 16×16 pixels, and chroma Cr having the size of 16×16 pixels are sequentially arranged as shown in (b) of FIG. 10, even when the CU size is 64×64 pixels. In this case, reordering is performed on the coefficient information pieces included in the aforementioned unit of processing (TU). Such reordering is performed, for example, between the process by the inverse frequency transformation unit 506 and the process by the image reconstruction unit 603 shown in FIG. 6.

Embodiment 6

Furthermore, by recording a program, which realizes the image coding method and the image decoding method described in each of the embodiments, onto a recording medium, it is possible to easily perform the processing as described in each of the embodiments in an independent computer system. The recording medium may be a magnetic disc, an optical disc, a magnet-optical disc, an integrated circuit (IC) card, or a semiconductor memory, as far as the media can record the program.

Furthermore, applications of the image coding method and the image decoding method described in each of the above embodiments, and a system using such applications are described below.

Figure 32:
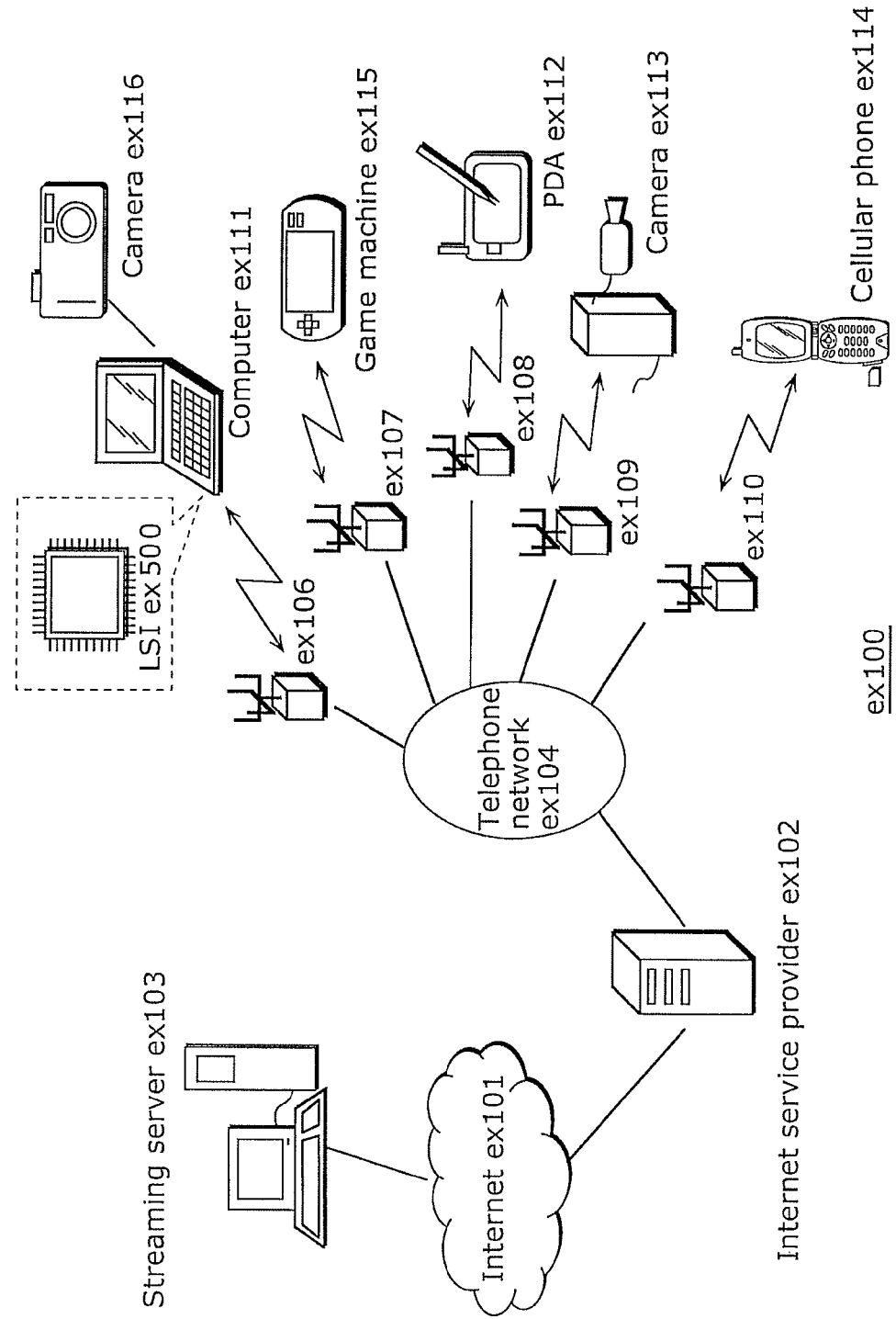
FIG. 32 is a structural diagram showing an overall configuration of a content providing system for implementing content distribution services.

FIG. 32 is a block diagram showing the overall configuration of a content providing system ex100 for realizing content distribution service. The area for providing communication service is divided into cells of a desired size, and base stations ex106 to ex110 which are fixed wireless stations are placed in the respective cells.

In this content providing system ex100, various devices such as a computer ex111, a Personal Digital Assistant (PDA) ex112, a camera ex113, and a mobile phone ex114 are connected to one another, via a telephone network ex104 and base stations ex106 to ex110. Furthermore, the various devices are connected to the Internet ex101 via an Internet service provider ex102.

However, the content providing system ex100 is not limited to the combination as shown in FIG. 32, and may include a combination of any of these devices which are connected to each other. In addition, each device may be connected directly to the telephone network ex104, not through the base stations ex106 to ex110 which are fixed wireless stations. Furthermore, the devices may be connected directly to one another via Near Field Communication (NFC) or the like.

The camera ex113 is a device such as a digital video camera capable of shooting moving images. The camera ex116 is a device such as a digital video camera capable of shooting still images and moving images. The mobile phone ex114 may be any of a mobile phone of a Global System for Mobile Communications (GSM, registered trademark) system, a Code Division Multiple Access (CDMA) system, a Wideband-Code Division Multiple Access (W-CDMA) system, a Long Term Evolution (LTE) system, a High Speed Packet Access (HSPA) system, a Personal Handy-phone System (PHS), and the like.

In the content providing system ex100, the camera ex113 is connected to a streaming server ex103 via the base station ex109 and the telephone network ex104, which realizes live distribution or the like. In the live distribution, the coding as described in the above embodiments is performed for a content (such as a video of a live music performance) shot by a user using the camera ex113, and the coded content is provided to the streaming server ex103. On the other hand, the streaming server ex103 makes steam distribution of the received content data to the clients at their requests. The clients include the computer ex111, the PDA ex112, the camera ex113, the mobile phone ex114, and the like, capable of decoding the above-mentioned coded data. Each device receiving the distributed data decodes the received data to be reproduced.

Here, the coding of the data shot by the camera may be performed by the camera ex113, the streaming server ex103 for transmitting the data, or the like. Likewise, either the client or the streaming server ex103 may decode the distributed data, or both of them may share the decoding. In addition, the still image and/or moving image data shot by the camera ex116 may be transmitted not only to the camera ex113 but also to the streaming server ex103 via the computer ex111. In this case, either the camera ex116, the computer ex111, or the streaming server ex103 may perform the coding, or all of them may share the coding.

It should be noted that the above-described coding and the decoding are performed by a Large Scale Integration (LSI) ex500 generally included in each of the computer ex111 and the devices. The LSI ex500 may be implemented as a single chip or a plurality of chips. It should be noted that software for encoding and decoding images may be integrated into any of various type of recording media (such as a CD-ROM, a flexible disc and a hard disk) that is readable by the computer ex111 or the like, so that the encoding and decoding are performed by using the software. Furthermore, if the mobile phone ex114 is a camera-equipped mobile phone, it may transmit generated moving image data. This moving image data is the data coded by the LSI ex500 included in the mobile phone ex114.

It should be noted that the streaming server ex103 may be implemented as a plurality of servers or a plurality of computers, so that data is divided into pieces to be processed, recorded, and distributed separately.

As described above, the content providing system ex100 enables the clients to receive and reproduce coded data. Thus, in the content providing system ex100, the clients can receive information transmitted by the user, then decode and reproduce it, so that the user without specific rights nor equipment can realize individual broadcasting.

Figure 33:
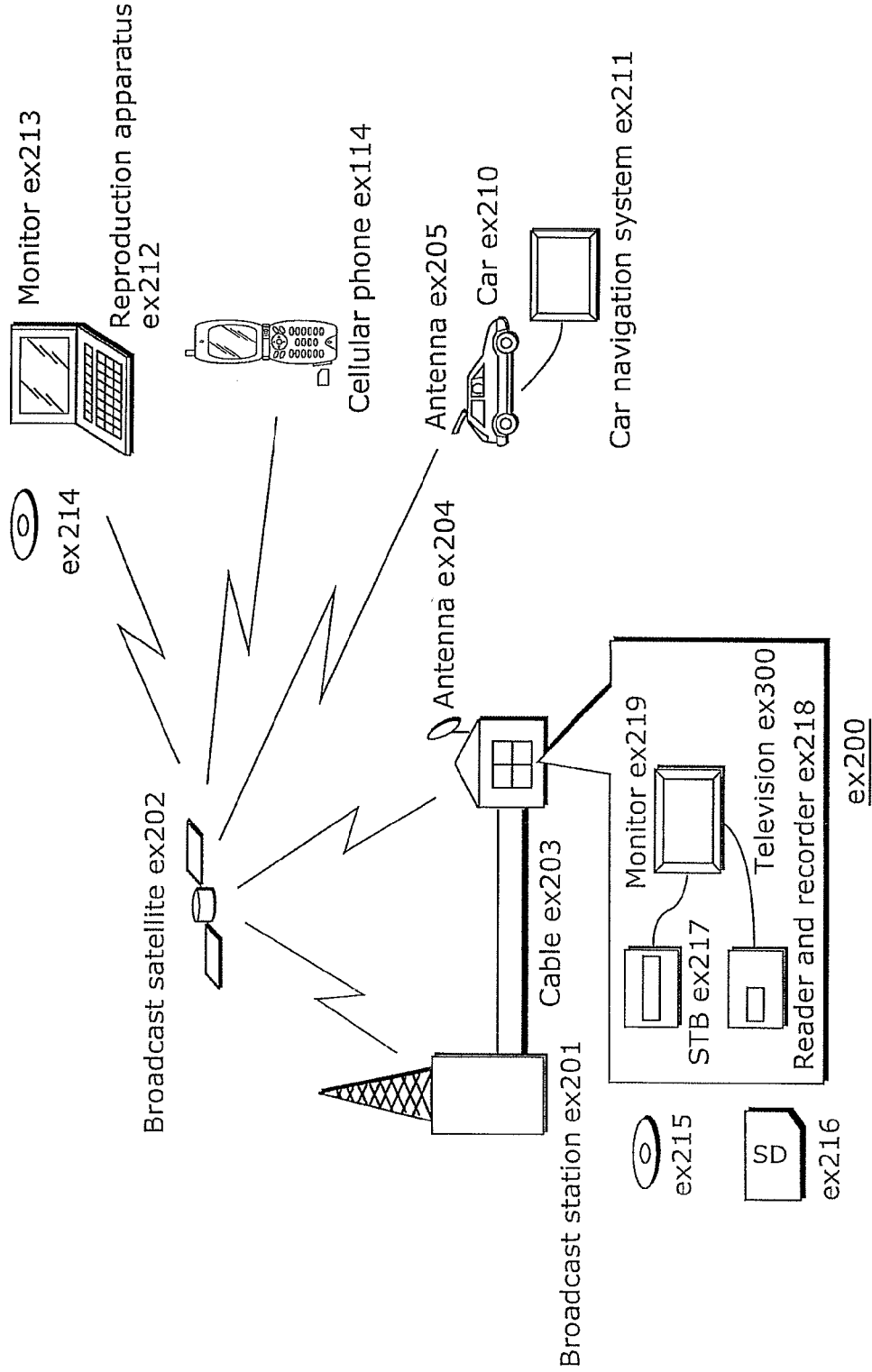
FIG. 33 is a structural diagram showing an overall configuration of a digital broadcasting system.

The present invention is not limited to the example of the content providing system ex100. An image processing apparatus in the above embodiments can be incorporated into the digital broadcast system ex200 as shown in FIG. 33. More specifically, a bit stream of video information is transmitted from a broadcast station ex201 to a communication or broadcast satellite ex202 via radio waves. The bitstream is a coded bitstream generated by the image coding method described in the above embodiments. Upon receipt of it, the broadcast satellite ex202 transmits radio waves for broadcasting, and a home antenna ex204 with a satellite broadcast reception function receives the radio waves. A device such as a television (receiver) ex300 or a Set Top Box (STB) ex217 decodes the coded bit stream for reproduction.

The image processing apparatus described in the above embodiments can be implemented in a reproduction device ex212 for reading and decoding a coded bit stream recorded on a recording medium ex214 such as a CD and DVD that is a recording medium. In this case, the reproduced video signals are displayed on a monitor ex213.

The image processing apparatus described in the above embodiments can be implemented in a reader/recorder ex218 for reading and decoding a coded bitstream recorded on a recording medium ex215 such as a DVD and a BD or for coding and writing video signals into the recording medium ex215. In this case, the reproduced video signals are displayed on a monitor ex219, and the recording medium ex215, on which the coded bitstream is recorded, allows a different device of system to reproduce the video signals. It is also conceived to implement the image processing apparatus in the set top box ex217 connected to a cable ex203 for cable television or the antenna ex204 for satellite and/or terrestrial broadcasting so as to reproduce them on a monitor ex219 of the television. The image processing apparatus may be incorporated into the television, not in the set top box.

Figure 34:
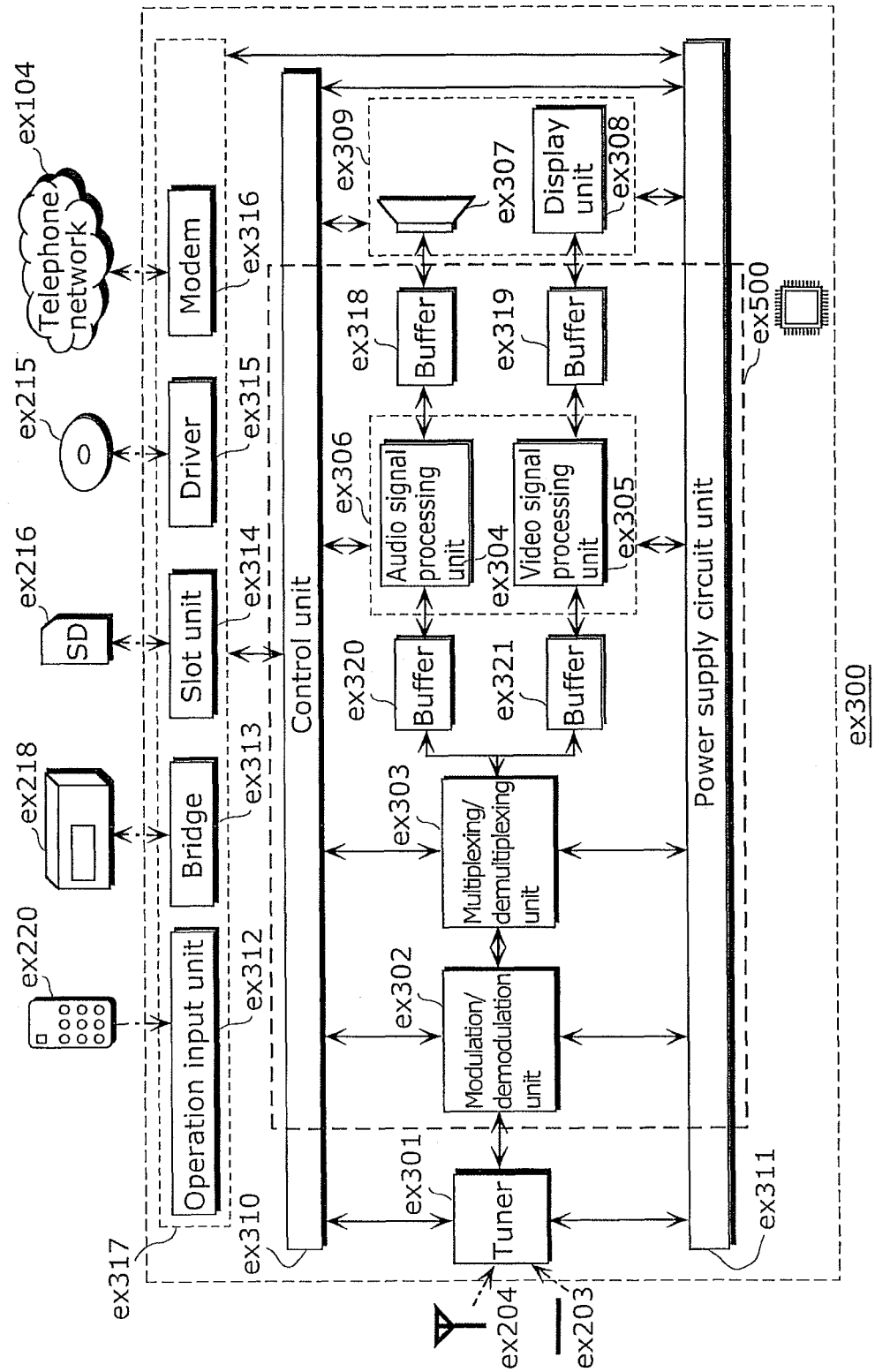
FIG. 34 is a block diagram showing an example of a configuration of a television.

FIG. 34 is a diagram showing a television (receiver) ex300 using the image decoding method described in the above embodiments. The television ex300 includes: a tuner ex301 that receives or outputs a bitstream of video information via the antenna ex204, the cable ex203, or the like that receives the above broadcasting; a modulating/demodulating unit ex302 that demodulates the received coded data or modulates generated coded data to be transmitted to the outside; and a multiplexing/demultiplexing unit ex303 that demultiplexes the modulated video data from the modulated audio data or multiplexes the coded video data and the coded audio data.

In addition, the television ex300 includes: a signal processing unit ex306 having (a) an audio signal processing unit ex304 that decodes or codes audio data and (b) a video signal processing unit ex305 that decodes or encodes video data; and an output unit ex309 having (c) a speaker ex307 that outputs the decoded audio signal and (d) a display unit ex308, such as a display, that displays the decoded video signal. Furthermore, the television ex300 includes an interface unit ex317 having an operation input unit ex312 that receives inputs of user operations, and the like. Moreover, the television ex300 includes: a control unit ex310 for the overall controlling of the respective units; and a power supply circuit unit ex311 that supplies the respective units with power.

In addition to the operation input unit ex312, the interface unit ex317 may include: a bridge ex313 connected to external devices such as the reader/recorder ex218; a slot unit ex314 enabling the recording medium ex216 such as an SD card to be attached to the interface unit ex317; a driver ex315 for connecting to an external recording medium such as a hard disk; a modem ex316 connected to a telephone network; and the like. It should be noted that the recording medium ex216 enables information to be electrically recorded on a stored nonvolatile/volatile semiconductor memory device.

The units in the television ex300 are connected to one another via a synchronous bus.

First, the description is given for the structure by which the television ex300 decodes and reproduces data received from the outside via the antenna ex204 or the like. The television ex300 receives a user operation from a remote controller ex220 or the like. Then, under control of the control unit ex310 having a CPU and the like, the television ex300 demodulates video data and audio data at the modulating/demodulating unit ex302, and demultiplexes the demodulated video data from the demodulated audio data at the multiplexing/demultiplexing unit ex303. In addition, the television ex300 decodes the demultiplexed audio data at the audio signal processing unit ex304, and decodes the demultiplexed video data at the video signal processing unit ex305 using the decoding method described in the above embodiments. The decoded audio signal and the decoded video signal are separately outputted from the output unit ex309 to the outside. When outputting the signals, the signals may be temporarily stored in, for example, buffers ex318 and ex319, so that the audio signal and the video signal are reproduced in synchronization with each other. Furthermore, the television ex300 may read the coded bitstream, not from broadcasting or the like but from the recording media ex215 and ex216 such as a magnetic/optical disc and a SD card.

Next, the description is given for the structure by which the television ex300 codes audio signal and video signal, and transmits the coded signals to the outside or writes them onto a recording medium or the like. The television ex300 receives a user operation from the remote controller ex220 or the like, and then, under control of the control unit ex310, codes audio signal at the audio signal processing unit ex304, and codes video data at the video signal processing unit ex305 using the coding method described in the above embodiments. The coded audio signal and the coded video signal are multiplexed at the multiplexing/demultiplexing unit ex303 and then outputted to the outside. When multiplexing the signals, the signals may be temporarily accumulated in, for example, buffers ex320 and ex321, so that the audio signal and the video signal are in synchronization with each other. It should be noted that the buffers ex318 to ex321 may be implemented as a plurality of buffers as shown, or may share one or more buffers. It should also be noted that, besides the shown structure, it is possible to include a buffer, for example, between the modulating/demodulating unit ex302 and the multiplexing/demultiplexing unit ex303, so that the buffer serves as a buffer preventing system overflow and underflow, and thereby accumulate data in the buffer.

It should also be noted that, in addition to the structure for receiving audio data and video data from broadcasting, recording media, and the like, the television ex300 may also have a structure for receiving audio inputs from a microphone and a camera, so that the coding is preformed for the received data. Here, although it has been described that the television ex300 can perform the above-described coding, multiplexing, and providing to the outside, it is also possible that the television ex300 cannot perform all of them but can perform one of the coding, multiplexing, and providing to the outside.

It should be noted that, when the reader/recorder ex218 is to read or write a coded bitstream from/into a recording medium, either the television ex300 or the reader/recorder ex218 may perform the above-described decoding or encoding, or the television ex300 and the reader/recorder ex218 may share the above-described decoding or encoding.

Figure 35:
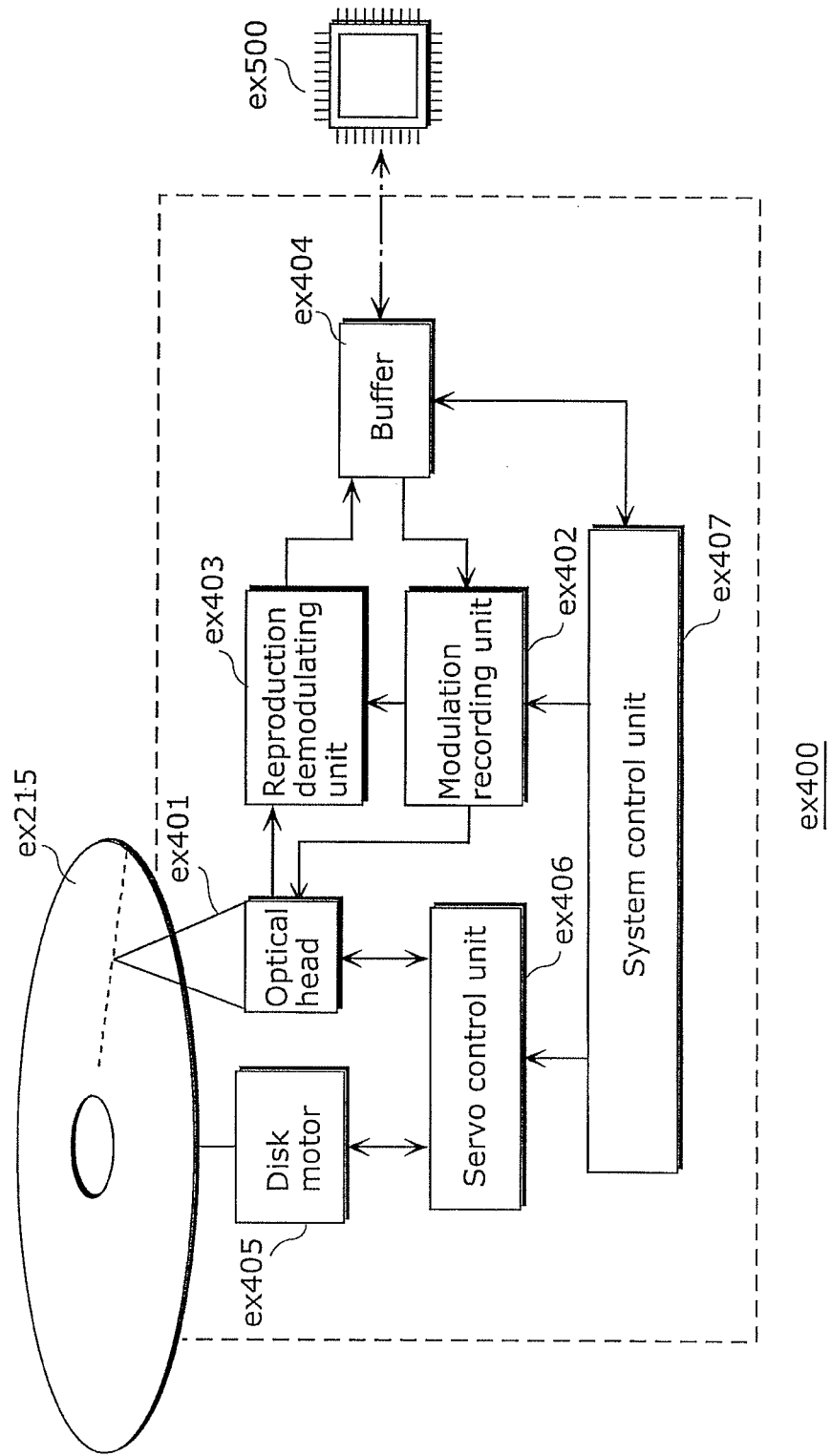
FIG. 35 is a block diagram illustrating an example of a configuration of an information reproducing/recording unit that reads and writes information from and on a recording medium that is an optical disc.

As an example, FIG. 35 shows a structure of an information reproducing/recording unit ex400 in the case where data is read from or written into an optical disc. The information reproducing/recording unit ex400 includes the following units ex401 to ex407. The optical head ex401 writes information into the recording medium ex215 as an optical disc by irradiating laser spot on a recording surface of the recording medium ex215, and reads information from the recording medium ex215 by detecting light reflected on the recording surface of the recording medium ex215. The modulation recording unit ex402 electrically drives a semiconductor laser included in the optical head ex401, and thereby modulates laser light according to recorded data. A reproduction demodulating unit ex403 amplifies reproduction signal that is obtained by electrically detecting light reflected on the recording surface by a photo detector included in the optical head ex401, then demultiplexes and demodulates signal components recorded on the recording medium ex215, and reproduces necessary information. A buffer ex404 temporarily stores the information to be recorded onto the recording medium ex215, and the information reproduced from the recording medium ex215. A disc motor ex405 rotates the recording medium ex215. A servo control unit ex406 moves the optical head ex401 to a predetermined information track while controlling rotation driving of the disc motor ex405, thereby performing tracking processing of the laser spot.

The system control unit ex407 controls the overall information reproducing/recording unit ex400. The above-described reading and writing are realized when the system control unit ex407 records and reproduces information via the optical head ex401 while cooperating the modulation recording unit ex402, the reproduction demodulating unit ex403, and the servo control unit ex406, by using various information stored in the buffer ex404 and new information generated and added as needed. The system control unit ex407 includes, for example, a microprocessor, and performs the above processing by executing a reading/writing program.

Although it has been described above that the optical head ex401 irradiates laser spot, the optical head ex401 may perform higher-density recording by using near-field light.

Figure 36:
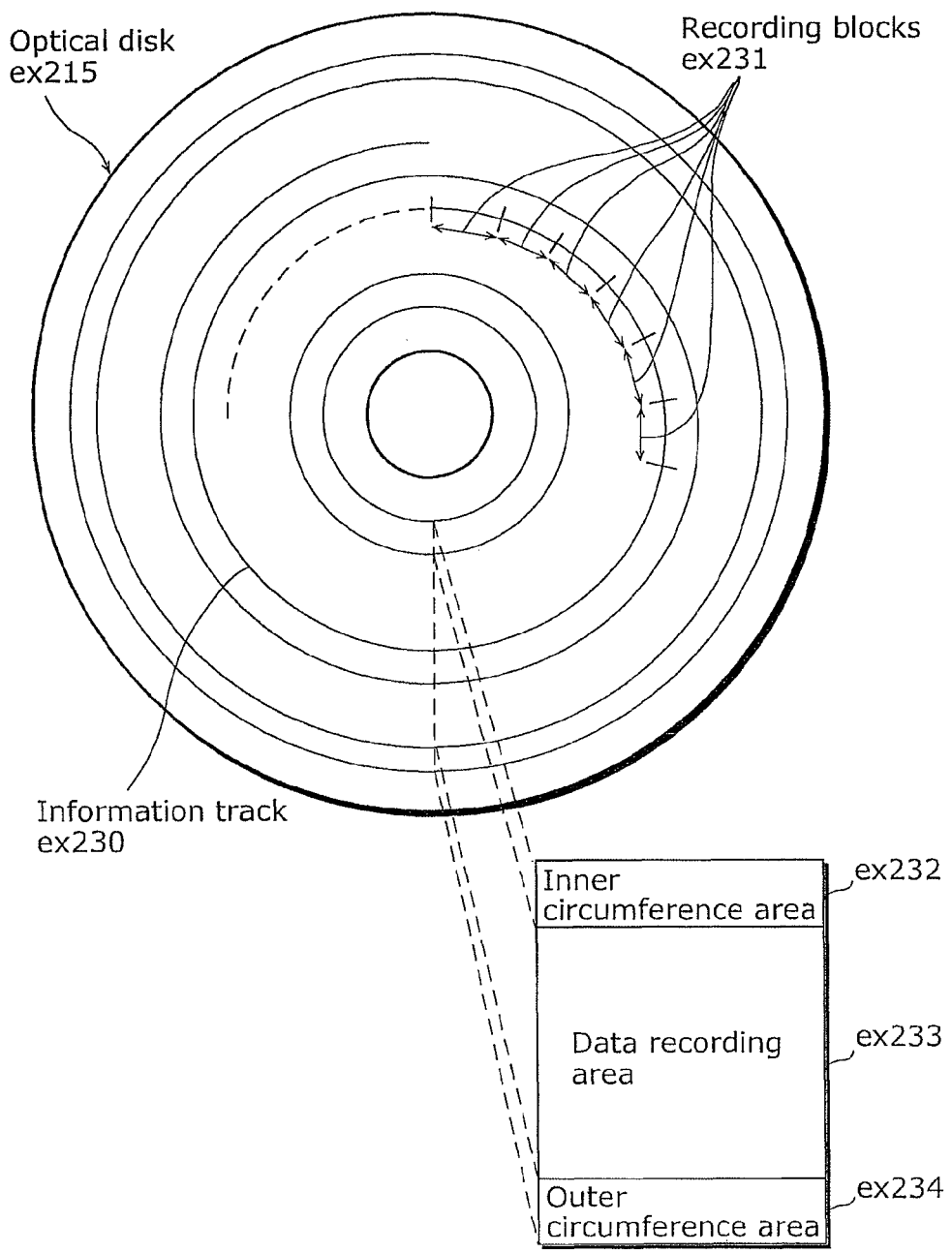
FIG. 36 is a diagram showing an example of a configuration of a recording medium that is an optical disc.

FIG. 36 shows a schematic diagram of the recording medium ex215 that is an optical disc. On the recording surface of the recording medium ex215, guide grooves are formed in a spiral shape, and on an information track ex230, address information indicating an absolute position on the disc is previously recorded using a change of the groove shape. The address information includes information for identifying a position of a recording block ex231 that is a unit for recording data, and a devise performing recording and reproduction is capable of specifying the recording block by reproducing the information track ex230 to read the address information. Moreover, the recording medium ex215 includes a data recording region ex233, an inner peripheral region ex232, and an outer peripheral region ex234. The data recording region ex233 is a region on which user data is recorded. The inner peripheral region ex232 and the outer peripheral region ex234 which are provided in the inner periphery and the outer periphery, respectively, of the data recording region ex233 are for specific uses except the user data recording.

The information reproducing/recording unit ex400 reads/writes coded audio data and video data or coded data generated by multiplexing them, from/into such data recording region ex233 of the recording medium ex215.

Although the above has been described giving the example of a one-layer optical disc such as a DVD or a BD, the optical disc is not limited to the above but may be a multi-layer optical disc so that data can be recorded onto other regions in addition to the surface. Furthermore, the optical disc may have a structure for multidimensional recording/reproducing, such as data recording using color lights having various different wavelengths on the same position of the disc, or recording of layers of different pieces of information from various angles.

It should also be noted that it is possible in the digital broadcasting system ex200 that the car ex210 having the antenna ex205 receives data from the satellite ex202 or the like, and reproduces moving images on the display device such as the car navigation system ex211 or the like in the car ex210. As for the configuration of the car navigation system ex211, a configuration added with a GPS receiving unit to the units as shown in FIG. 34, is conceivable. The same applies to the computer ex111, the mobile phone ex114 and others. Moreover, likewise the television ex300, three types of implementations can be conceived for a terminal such as the above-mentioned mobile phone ex114: a communication terminal equipped with both an encoder and a decoder; a sending terminal equipped with an encoder only; and a receiving terminal equipped with a decoder only.

Thus, the image coding method and the image decoding method described in the above embodiments can be used in any of the above-described devices and systems, and thereby the effects described in the above embodiments can be obtained.

It should be noted that the present invention is not limited to the above embodiments but various variations and modifications are possible in the embodiments without departing from the scope of the present invention.

Embodiment 7

Figure 37:
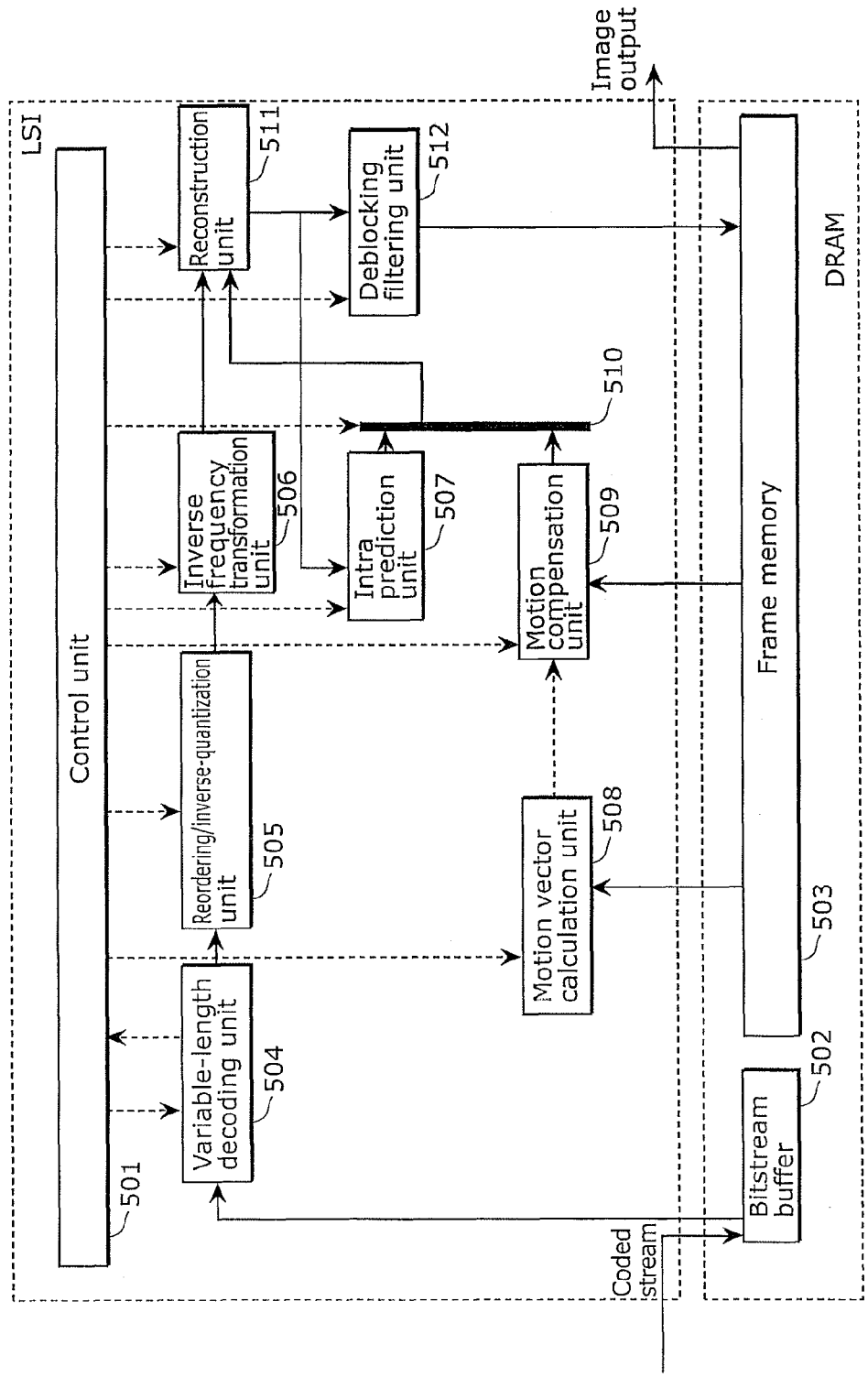
FIG. 37 is a structural diagram showing a configuration example of an integrated circuit which realizes image decoding and image coding.
Figure 38:
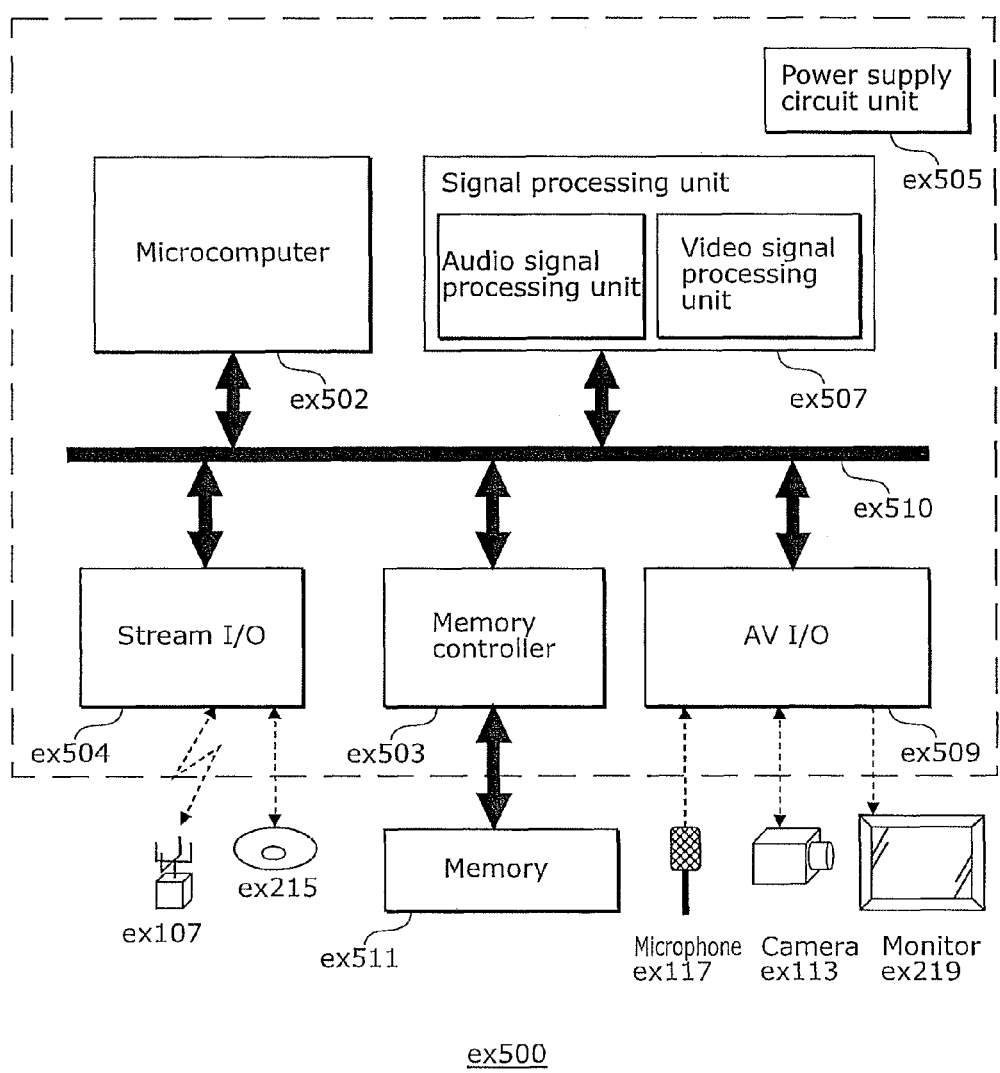
FIG. 38 is a structural diagram showing a configuration example of an integrated circuit which realizes image coding and image decoding.

In this embodiment, the image processing device according to Embodiment 1 is typically implemented into a Large Scale Integration (LSI) which is an integrated circuit. FIG. 37 shows this embodiment. A frame memory 502 is implemented into a DRAM and the other circuits and memories are implemented into the LSI. A stream buffer for storing a bitstream may be realized on the DRAM.

These structural elements may be integrated separately, or a part or all of them may be integrated into a single chip. Here, the integrated circuit is referred to as an LSI, but the integrated circuit can be called an IC, a system LSI, a super LSI or an ultra LSI depending on their degrees of integration.

The technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, when a circuit integration technology for replacing LSIs with new circuits appears in the future with advancement in semiconductor technology and derivative other technologies, the circuit integration technology may be naturally used to integrate the structural elements included in the image processing apparatus. Application of biotechnology is one such possibility.

Moreover, the semiconductor chip on which the image processing device according to the embodiments is combined with a display for drawing images to form an image drawing device depending on various applications. The present invention can thereby be used as an information drawing means for a mobile phone, a television set, a digital video recorder, digital camcorder, a vehicle navigation device, and the like. The display in the combination may be a cathode-ray tube (CRT), a flat display such as a liquid crystal display, a plasma display panel (PDP), or an organic light emitting display (OLED), a projection display represented by a projector, or the like.

It should also be noted that the LSI according to this embodiment may perform encoding and decoding in cooperation with a bitstream buffer on which coded streams are accumulated and a Dynamic Random Access Memory (DRAM) including a frame memory on which images are accumulated. The LSI according to this embodiment may be cooperated not with a DRAM, but with a different storage device such as an embedded DRAM (eDRAM), a Static Random Access Memory (SRAM), or a hard disk.

Embodiment 8

In this embodiment, the image coding device, the image decoding device, the image processing apparatus, the image coding method, and the image decoding method, and the image processing method which have been described in the above embodiments are typically implemented into a Large Scale Integration (LSI) which is an integrated circuit. As an example, FIG. 35 shows a structure of an LSI ex500 on which they are integrated into a single chip. The LSI ex500 includes the following units ex502 to ex509 which are connected to one another via a bus ex510. When a power source is ON, a power supply circuit unit ex505 supplies power to each of the units to activate them to be capable of operating.

For example, in the case of coding, the LSI ex500 receives input audio/visual (AV) signals from an AV I/O ex509 via the microphone ex117, the camera ex113, or the like. The input AV signals are temporarily stored in an external memory ex511 such as an SDRAM. The accumulated data is, for example, divided into a plurality of times depending on a processing amount and a processing speed, and eventually provided to a signal processing unit ex507. The signal processing unit ex507 performs coding of audio signal and/or coding of video signal. Here, the coding of video signal is the coding described in the above embodiments. Furthermore, the signal processing unit ex507 performs multiplexing of the coded audio data and the coded video data and other processing as needed, and provides the resulting data from a stream I/O ex504 to the outside. The output bitstream is transmitted to the base station ex107, or written to the recording medium ex215.

Moreover, for example, in the case of decoding, under the control of the microcomputer ex502, the LSI ex500 temporarily accumulates, to a memory ex511 or the like, coded data that is obtained using the stream I/O ex504 via the base station ex107, or coded data that is obtained by reading it from the recording medium ex215. Under control of the microcomputer ex502, the accumulated data is, for example, divided into a plurality of times depending on a processing amount and a processing speed, and eventually provided to the signal processing unit ex507. The signal processing unit ex507 performs decoding of audio signal and/or decoding of video signal. Here, the decoding of a video signal is the decoding described in the above embodiments. It is preferable that the decoded audio signal and the decoded video signal are temporarily stored in the memory ex511 or the like as needed, so that they can be reproduced in synchronization with each other. The decoded output signal is outputted from the AV I/O ex509 to the monitor ex219 or the like appropriately via the memory ex511 or the like. The access to the memory ex511 is actually performed via the memory controller ex503.

Although it has been described above that the memory ex511 is outside the LSI ex500, the memory ex511 may be included in the LSI ex500. It is possible that the LSI ex500 may be integrated into a single chip, or may be integrated separately.

Here, the integrated circuit is referred to as an LSI, but the integrated circuit can be called an IC, a system LSI, a super LSI or an ultra LSI depending on their degrees of integration.

Moreover, ways to achieve integration are not limited to the LSI, and a special circuit or a general purpose processor and so forth can also achieve the integration. It is also possible to use a Field Programmable Gate Array (FPGA) that can be programmed after manufacturing the LSI, or a reconfigurable processor in which connection and setting of circuit cells inside the LSI can be reconfigured.

Furthermore, when a circuit integration technology for replacing LSIs with new circuits appears in the future with advancement in semiconductor technology and derivative other technologies, the circuit integration technology may be naturally used to integrate the structural elements included in the image processing apparatus. Application of biotechnology is one such possibility.

The image processing apparatus in an aspect according to the present invention has been described in Embodiments above. However, the image processing apparatus is not limited to Embodiments described above.

Figure 39A:
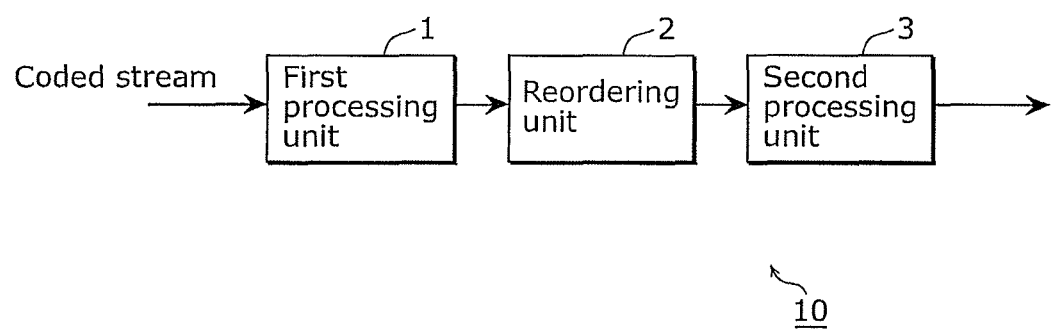
FIG. 39A is a block diagram showing a configuration of an image processing apparatus.

FIG. 39A is a block diagram showing a configuration of an image processing apparatus in an aspect according to the present invention.

More specifically, an image processing apparatus 10 in an aspect according to the present invention is an image processing apparatus which performs a predetermined process on a coded stream generated by coding an image, the image processing apparatus including: a first processing unit which sequentially outputs, for each first unit of processing, one or more components included in the first unit of processing, by performing a first process on the coded stream; a reordering unit which sequentially outputs, for each second unit of processing different from the first unit of processing, one or more components included in the second unit of processing, by reordering the components outputted from the first processing unit; and a second processing unit which performs a second process on the components outputted from the reordering unit, for each second unit of processing.

Figure 39B:
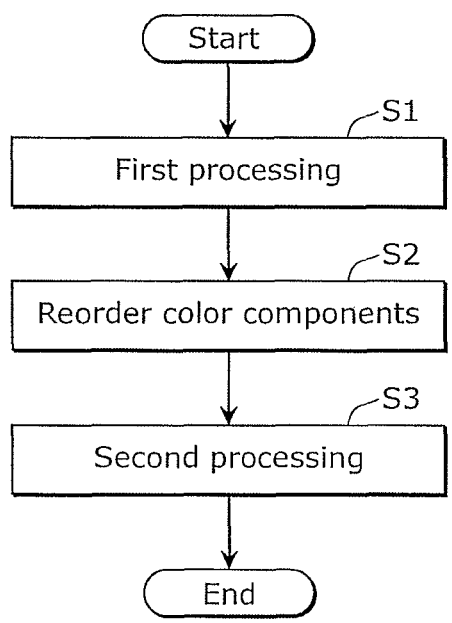
FIG. 39B is a flowchart showing an image processing method.

FIG. 39B is a flowchart showing an image processing method executed by the image processing apparatus 10.

An image processing method of performing a predetermined process on a coded stream generated by coding an image includes: performing a first process on the coded stream to sequentially output, for each first unit of processing, one or more components included in the first unit of processing (S1); reordering the components outputted in the performing a first process (S1), to sequentially output, for each second unit of processing different from the first unit of processing, one or more components included in the second unit of processing (S2); and performing a second process on the components outputted in the reordering (S2), for each second unit of processing (S3).

Even with this configuration or procedure, the components are reordered. Hence, the same advantageous effect as in each of Embodiments above can be achieved.

Each of the structural elements in each of Embodiments above may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the image decoding apparatus according to each of Embodiments above is a program described below.

More specifically, the program causes a computer to execute: performing a first process on the coded stream to sequentially output, for each first unit of processing, one or more components included in the first unit of processing (S1); reordering the components outputted in the performing a first process (S1), to sequentially output, for each second unit of processing different from the first unit of processing, one or more components included in the second unit of processing (S2); and performing a second process on the components outputted in the reordering (S2), for each second unit of processing (S3).

INDUSTRIAL APPLICABILITY

The image processing apparatus according to the present invention has an advantageous effect of reducing a capacity of a storage element. For example, the image decoding apparatus is applicable to a high-resolution information display device or a high-resolution image pickup device, such as a television, a digital video recorder, a car navigation system, a cellular mobile phone, a digital camera, and a digital video camera, and is thus highly useful.

REFERENCE SIGNS LIST

1 First processing unit
2 Reordering unit
3 Second processing unit
10 Image processing unit
501 Control unit
502, 520, 604 Bitstream buffer
503 Frame memory
504, 606, 640 Variable-length decoding unit
505 Reordering/inverse-quantization unit
506, 644 Inverse frequency transformation unit
507, 645 Intra prediction unit
508, 642 Motion vector calculation unit
509, 643 Motion compensation unit
510 Switch
511 Reconstruction unit
512 Deblocking filtering unit
513, 513a, 650 Image decoding apparatus
601 Reordering unit
602, 641 Inverse quantization unit
603 Image reconstruction unit
605, 608, 615, 622 Stream transformation unit
607 Variable-length coding unit
609 Division unit
610, 621, 623 Stream reconstruction unit
611, 617 Luma-Y variable-length coding unit
612, 618 Chroma-Cb variable-length coding unit
613, 619 Chroma-Cr variable-length coding unit
614, 620 Coding information variable-length coding unit
616 Marker insertion unit
624 Luma variable-length decoding unit
625 Chroma variable-length decoding unit
626 Luma inverse quantization unit
627 Chroma inverse quantization unit
628 Luma inverse frequency transformation unit
629 Chroma inverse frequency transformation unit
630 Coefficient reconstruction unit
631 Luma motion vector calculation unit
632 Chroma motion vector calculation unit
633 Luma motion compensation unit
634 Chroma motion compensation unit
635 Motion compensation reconstruction unit
636 Luma intra prediction unit
637 Chroma intra prediction unit
701 to 709 Memory
710 Luma-Y memory
711 Chroma-Cb memory
712 Chroma-Cr memory
713 Coding information memory
714, 718 Luma-Y stream memory
715, 719 Chroma-Cb stream memory
716, 720 Chroma-Cr stream memory
717, 721 Coding information stream memory
722 Marker-inserted stream memory
723, 725, 727 Luma memory
724, 726, 728 Chroma memory
729 Intra prediction image memory
730 to 737 Memory
ex100 Content providing system
ex101 Internet
ex102 Internet service provider
ex103 Streaming server ex104 Telephone network
ex107, ex108, ex109, ex110 Base station
ex111 Computer
ex112 Personal Digital Assistant (PDA)
ex113, ex116 Camera
ex114 Mobile phone
ex117 Microphone
ex200 Digital broadcasting system
ex201 Broadcast station
ex202 Broadcast satellite (satellite)
ex203 Cable
ex204, ex205 Antenna
ex210 Car
ex211 Car navigation system
ex212 Reproduction device
ex213, ex219 Monitor
ex215, ex216 Recording medium
ex217 Set Top Box (STB)
ex218 Reader/recorder
ex220 Remote controller
ex230 Information track
ex231 Recording block
ex232 Inner peripheral region
ex233 Data recording region
ex234 Outer peripheral region
ex300 Television (receiver)
ex301 Tuner
ex302 Modulating/demodulating unit
ex303 Mulitplexing/demultiplexing unit
ex304 Audio signal processing unit
ex305 Video signal processing unit
ex306, ex507 Signal processing unit
ex307 Speaker
ex308 Display unit
ex309 Output unit
ex310 Control unit
ex311, ex505 Power supply circuit unit
ex312 Operation input unit
ex313 Bridge
ex314 Slot unit
ex315 Driver
ex316 Modem
ex317 Interface unit
ex318, ex319, ex320, ex321 Buffer
ex400 Information reproducing/recording unit
ex401 Optical head
ex402 Modulation recording unit
ex403 Reproduction demodulating unit
ex404 Buffer
ex405 Disc motor
ex406 Servo control unit
ex407 System control unit
ex500 LSI
ex502 Microcomputer
ex503 Memory controller
ex504 Stream I/O
ex509 AV I/O
ex510 Bus
ex511 Memory

The invention claimed is:

1. An image processing apparatus which performs a predetermined process on a coded stream generated by coding an image, the image processing apparatus comprising:
  a variable-length decoding unit configured to sequentially output, in a first order, luma and chroma components that are color components for each of at least one coding unit, by performing a first process on the coded stream;
  a reordering unit configured to sequentially output, in a second order different from the first order, luma and chroma components that are color components for each of at least one transform unit different from each of the at least one coding unit, by reordering the luma and the chroma components that are the color components outputted in the first order from the variable-length decoding unit; and
  a second processing unit including at least one of an inverse quantization unit, an inverse frequency transformation unit, a variable-length coding unit, and a reconstruction unit, configured to perform a second process on the luma and the chroma components that are the color components outputted in the second order from the reordering unit, for each of the at least one transform unit, wherein
  in the first order, the luma and the chroma components included in each of the at least one transform unit are non-sequentially arranged in each of the at least one coding unit,
  in the second order, the luma and the chroma components included in each of the at least one transform unit are sequentially arranged,
  the reordering changes the non-sequentially arranged luma and chroma components of the first order into the sequentially arranged luma and chroma components of the second order, and
  a size of the luma and chroma components in the first order for each of the at least one coding unit is larger than a size of the luma and chroma components in the second order for each of the at least one transform unit different from each of the at least one coding unit.

2. The image processing apparatus according to claim 1, wherein each of the at least one coding unit is used for coding the image.

3. The image processing apparatus according to claim 2, wherein each of the at least one transform unit is one of (i) a frequency transform unit used for frequency transform performed for the coding unit and (ii) a unit of processing smaller than the frequency transform unit.

4. The image processing apparatus according to claim 1, wherein the variable-length decoding unit is configured to sequentially output, in the first order, the luma and the chroma components that are the color components for each of the at least one coding unit that is variable in size according to a structure of the coded stream.

5. The image processing apparatus according to claim 1, wherein the reordering unit is configured to sequentially output, in the second order, the luma and the chroma components that are the color components for each of the at least one transform unit that is variable in size according to a structure of the coded stream.

6. The image processing apparatus according to claim 1, wherein the reordering unit is configured to sequentially output, in the second order, the luma and the chroma components that are the color components for each of the at least one transform unit that is smaller than each of the at least one coding unit.

7. The image processing apparatus according to claim 1, further comprising
  a third processing unit configured to perform a third process on a stream generated by the second process, to decode the coded stream.

8. The image processing apparatus according to claim 1, wherein each of the at least one coding unit is a smallest unit in which a prediction method used for coding the image is allowed to be switched between an intra prediction method and an inter prediction method.

9. The image processing apparatus according to claim 1, wherein the variable-length decoding unit is configured to sequentially store the luma and the chroma components that are the color components for each of the at least one coding unit into a storage unit by sequentially outputting the luma and the chroma components that are the color components for each of the at least one coding unit, and
the reordering unit is configured to reorder the luma and the chroma components that are the color components outputted from the variable-length decoding unit by sequentially reading the luma and the chroma components that are the color components outputted from the variable-length decoding unit in the second order different from the first order in which the luma and the chroma components that are the color components for each of the at least one coding unit are stored in the storage unit.

10. The image processing apparatus according to claim 1, wherein the reordering unit is configured to reorder the luma and the chroma components that are the color components outputted from the variable-length decoding unit by sequentially writing the luma and the chroma components that are the color components outputted from the variable-length decoding unit into a storage unit in the second order different from the first order in which the luma and chroma components that are the color components for each of the at least one coding unit are outputted from the variable-length decoding processing unit, and
the second processing unit is configured to sequentially read the luma and the chroma components that are the color components outputted from the reordering unit in the second order in which the luma and the chroma components that are the color components outputted from the reordering unit are stored in the storage unit.

11. The image processing apparatus according to claim 1, wherein the reconstruction unit is configured to reconstruct, as a process included in the second process, an image corresponding to each of the at least one transform unit using the luma and the chroma components that are the color components for each of the at least one transform unit.

12. The image processing apparatus according to claim 11,
wherein the variable-length decoding unit is configured to perform variable-length decoding as the first process, and
the inverse quantization unit is configured to perform inverse quantization as a process included in the second process.

13. The image processing apparatus according to claim 1, wherein the variable-length decoding unit is configured to perform variable-length decoding as the first process, and
the variable-length coding unit is configured to perform variable-length coding as a process included in the second process.

14. The image processing apparatus according to claim 1, wherein the variable-length decoding unit is configured to perform variable-length decoding as the first process, the reordering unit includes:
a division unit configured to classify each of the luma and the chroma components that are the color components outputted from the variable-length decoding unit according to a color component type;
a variable-length coding unit configured to perform, for each of the color component types, variable-length coding on the luma and the chroma components that are the color components belonging to the color component type, and store a stream generated by the variable-length coding into a storage unit; and
a stream reconstruction unit configured to generate a reordered coded stream in which the luma and the chroma components that are the color components outputted from the variable-length decoding unit are reordered, by sequentially reading, in the second order different from the first order in which the luma and the chroma components that are the color components are outputted from the variable-length decoding unit, the luma and the chroma components that are the color components from the stream generated and stored in the storage unit for each of the color component types,
the variable-length coding unit is configured to perform variable-length coding for the color component types in parallel, and
the reordered coded stream includes a coding unit having a same size as each of the at least one transform unit.

15. The image processing apparatus according to claim 1, wherein the variable-length decoding unit is configured to perform variable-length decoding as the first process, the reordering unit includes:
a marker insertion unit configured to add a marker identifying a color component type for each of the luma and the chroma components that are the color components outputted from the variable-length decoding unit;
a variable-length coding unit configured to (i) identify, based on the marker added by the marker insertion unit, each of the color component types of the luma and the chroma components that are the color components outputted from the variable-length decoding unit, (ii) perform, for each of the color component types, variable-length coding on the luma and the chroma components that are the color components belonging to the color component type, and (iii) store a stream generated by the variable-length coding into a storage unit; and
a stream reconstruction unit configured to generate a reordered coded stream in which the luma and the chroma components that are the color components outputted from the variable-length decoding unit are reordered, by sequentially reading, in the second order different from the first order in which the luma and the chroma components that are the color components are outputted from the variable-length decoding unit, the luma and the chroma components that are the color components from the stream generated and stored in the storage unit for each of the color component types, and
the variable-length coding unit is configured to perform variable-length coding for the color component types in parallel.

16. The image processing apparatus according to claim 15,
wherein the second processing unit includes each of:
the inverse quantization unit;
the inverse frequency transformation unit; and
a color component reconstruction unit,
the color component reconstruction unit is configured to (i) identify the color component data generated for each of the color component types, based on the markers included in the color component data and (ii) perform reconstruction to allow the inverse-frequency-transformed luma and chroma components that are color components to be arranged in the second order obtained as a result of the reordering by the reordering unit, the stream reconstruction unit is configured to generate the reordered coded stream including the marker for each of the luma and the chroma components that are the color components together with the markers, by sequentially reading the luma and the chroma components that are the color components together with the markers added to the luma and the chroma components that are the color components outputted from the variable-length decoding unit, the variable-length decoding unit is configured to perform, for each of the color component types, variable-length decoding on the luma and the chroma components that are the color components belonging to the color component type, based on the markers included in the reordered coded stream, the inverse quantization unit is configured to perform, for each of the color component types, inverse quantization on the variable-length decoded luma and chroma components that are color components belonging to the color component type, the inverse frequency transformation unit is configured to generate color component data including the markers by performing, for each of the color component types, inverse frequency transform on the inverse-quantized luma and chroma components that are color components belonging to the color component type, and each of the variable-length decoding unit, the inverse quantization unit, and the inverse frequency transform unit is configured to perform the corresponding process for the color component types in parallel.

17. The image processing apparatus according to claim 1, wherein the luma and chroma components in the second order include a plurality of luma Y components, a plurality of chroma Cb components, and a plurality of chroma Cr components, the reordering unit is configured to sequentially output the plurality of luma Y components, the plurality of chroma Cb components, and the plurality of chroma Cr components in a plurality of groups by repeated operations of the reordering unit, and each group of the plurality of groups includes a respective luma Y component of the plurality of luma Y components, a respective chroma Cb component of the plurality of chroma Cb components, and a respective chroma Cr component of the plurality of chroma Cr components, in that order.

18. An image processing method of performing a predetermined process on a coded stream generated by coding an image, the image processing method comprising:

performing a variable-length decoding process on the coded stream to sequentially output, in a first order, luma and chroma components that are color components for each of at least one coding unit;

reordering the luma and the chroma components that are the color components outputted in the first order from the performing a variable-length decoding process, to sequentially output, in a second order different from the first order, luma and chroma components that are color components for each of at least one transform unit different from each of the at least one coding unit; and performing a second process, including, as a process included in the second process, at least one of an inverse quantization process, an inverse frequency transformation process, a variable-length coding process, and a reconstruction process, on the luma and the chroma components that are the color components outputted in the second order in the reordering, for each of the at least one transform unit, wherein in the first order, the luma and the chroma components included in each of the at least one transform unit are non-sequentially arranged in each of the at least one coding unit, in the second order, the luma and the chroma components included in each of the at least one transform unit are sequentially arranged, the reordering changes the non-sequentially arranged luma and chroma components of the first order into the sequentially arranged luma and chroma components of the second order, and a size of the luma and chroma components in the first order for each of the at least one coding unit is larger than a size of the luma and chroma components in the second order for each of the at least one transform unit different from each of the at least one coding unit.

19. A non-transitory computer-readable recording medium for use in a computer, the recording medium having a computer program recorded thereon for causing the computer to perform a predetermined process on a coded stream generated by coding an image, the computer program causing the computer to execute:

performing a variable-length decoding process on the coded stream to sequentially output, in a first order, luma and chroma components that are color components for each of at least one coding unit;

reordering the luma and the chroma components that are the color components outputted in the first order from the performing a variable-length decoding process, to sequentially output, in a second order different from the first order, luma and chroma components that are color components for each of at least one transform unit different from each of the at least one coding unit; and performing a second process, including, as a process included in the second process, at least one of an inverse quantization process, an inverse frequency transformation process, a variable-length coding process, and a reconstruction process, on the luma and the chroma components that are color components outputted in the second order from the reordering, for each of the at least one transform unit, wherein in the first order, the luma and the chroma components included in each of the at least one transform unit are non-sequentially arranged in each of the at least one coding unit, in the second order, the luma and the chroma components included in each of the at least one transform unit are sequentially arranged, the reordering changes the non-sequentially arranged luma and chroma components of the first order into the sequentially arranged luma and chroma components of the second order, and a size of the luma and chroma components in the first order for each of the at least one coding unit is larger than a size of the luma and chroma components in the second order for each of the at least one transform unit different from each of the at least one coding unit.

20. An integrated circuit which performs a predetermined process on a coded stream generated by coding an image, the integrated circuit comprising:

a variable-length decoding unit configured to sequentially output, in a first order, luma and chroma components that are color components for each of at least one coding unit, by performing a first process on the coded stream;

a reordering unit configured to sequentially output, in a second order different from the first order, luma and chroma components that are color components for each of at least one transform unit different from each of the at least one coding unit, by reordering the luma and the chroma components that are the color components outputted in the first order from the variable-length decoding unit; and a second processing unit including at least one of an inverse quantization unit, an inverse frequency transformation unit, a variable-length coding unit, and a reconstruction unit, configured to perform a second process on the luma and the chroma components that are the color components outputted in the second order from the reordering unit, for each of the at least one transform unit, wherein in the first order, the luma and the chroma components included in each of the at least one transform unit are non-sequentially arranged in each of the at least one coding unit, in the second order, the luma and the chroma components included in each of the at least one transform unit are sequentially arranged, the reordering changes the non-sequentially arranged luma and chroma components of the first order into the sequentially arranged luma and chroma components of the second order, and a size of the luma and chroma components in the first order for each of the at least one coding unit is larger than a size of the luma and chroma components in the second order for each of the at least one transform unit different from each of the at least one coding unit.

* * * * *